(12) United States Patent
Ulrich et al.

(10) Patent No.: US 7,054,927 B2
(45) Date of Patent: May 30, 2006

(54) FILE SYSTEM METADATA DESCRIBING SERVER DIRECTORY INFORMATION

(75) Inventors: Thomas R. Ulrich, Rancho Santa Margarita, CA (US); James R. Schweitzer, Huntington Beach, CA (US); Gregory D. Bolstad, Tustin, CA (US); Jay G. Randall, Newport Beach, CA (US); John R. Staub, Newport Beach, CA (US); George W. Priester, Westminister, CA (US)

(73) Assignee: Adaptec, Inc., Milpitas, CA (US)

( * ) Notice: Subject to any disclaimer, the term of this patent is extended or adjusted under 35 U.S.C. 154(b) by 776 days.

(21) Appl. No.: 10/060,920

(22) Filed: Jan. 29, 2002

(65) Prior Publication Data

US 2002/0156840 A1      Oct. 24, 2002

Related U.S. Application Data

(60) Provisional application No. 60/302,424, filed on Jun. 29, 2001, provisional application No. 60/264,668, filed on Jan. 29, 2001, provisional application No. 60/264,669, filed on Jan. 29, 2001, provisional application No. 60/264,670, filed on Jan. 29, 2001, provisional application No. 60/264,671, filed on Jan. 29, 2001, provisional application No. 60/264,672, filed on Jan. 29, 2001, provisional application No. 60/264,673, filed on Jan. 29, 2001, provisional application No. 60/264,694, filed on Jan. 29, 2001.

(51) Int. Cl.
*G06F 15/14* (2006.01)
*G06F 12/00* (2006.01)

(52) U.S. Cl. ............... 709/223; 709/224; 709/203; 711/209; 707/102

(58) Field of Classification Search ........... 709/201, 709/203, 218, 219, 220, 223, 224, 230; 707/102, 707/200; 711/205, 207, 208, 209, 221, 4, 711/114, 156, 170
See application file for complete search history.

(56) References Cited

U.S. PATENT DOCUMENTS 4,837,680 A    6/1989  Crockett et al.

(Continued)

FOREIGN PATENT DOCUMENTS

EP    1039380 A2  *  9/2000

(Continued)

OTHER PUBLICATIONS

Microsoft Knowledge Base Article -222189; Description of Disk Groups in Windows Disk Management, pp. 1-5.

(Continued)

*Primary Examiner*—B. James Peikari
(74) *Attorney, Agent, or Firm*—Knobbe, Martens, Olson & Bear LLP

(57) ABSTRACT

A computer network file system is described. The computer network file system includes first metadata, which is managed primarily by a first file server that is operably connected to a network fabric. The first metadata includes first file location information, and the first file location information includes at least one server id. The computer network file system also includes second metadata, which is managed primarily by a second file server that is operably connected to a network fabric. The second metadata includes second file location information, and the second file location information includes at least one server id. The first metadata and the second metadata are configured to allow a requester to locate files that are stored by the first file server and files that are stored by the second file server in a directory structure that spans the first file server and the second file server.

30 Claims, 46 Drawing Sheets

| PCI MAP | BLOCK SIZE | OPCODE | SPARE | PARITY INDEX | SPARE | RAM ADR |
|---|---|---|---|---|---|---|

63..........62,61..............59,58..................56,55................51,50...............35,34,.32, 31........................0

4400

U.S. PATENT DOCUMENTS

| | | |
|---|---|---|
| 4,887,204 A | 12/1989 | Johnson et al. |
| 4,914,656 A | 4/1990 | Dunphy, Jr. et al. |
| 5,124,987 A | 6/1992 | Milligan et al. |
| 5,157,663 A | 10/1992 | Major et al. |
| 5,257,362 A | 10/1993 | Menon |
| 5,258,984 A | 11/1993 | Menon et al. |
| 5,301,297 A | 4/1994 | Menon et al. |
| 5,355,453 A | 10/1994 | Row et al. |
| 5,375,128 A | 12/1994 | Menon et al. |
| 5,388,231 A | 2/1995 | Starr |
| 5,394,526 A | 2/1995 | Crouse et al. |
| 5,398,253 A | 3/1995 | Gordon et al. |
| 5,416,915 A | 5/1995 | Mattson et al. |
| 5,442,752 A | 8/1995 | Styczinski |
| 5,459,853 A | 10/1995 | Best et al. |
| 5,485,579 A | 1/1996 | Hitz et al. |
| 5,488,701 A | 1/1996 | Brady et al. |
| 5,490,248 A | 2/1996 | Dan et al. |
| 5,497,457 A | 3/1996 | Ford |
| 5,513,314 A | 4/1996 | Kandasamy et al. |
| 5,517,632 A | 5/1996 | Matsumoto et al. |
| 5,522,032 A | 5/1996 | Franaszek et al. |
| 5,537,534 A | 7/1996 | Voigt et al. |
| 5,537,645 A | 7/1996 | Henson et al. |
| 5,542,065 A | 7/1996 | Burkes et al. |
| 5,566,331 A | 10/1996 | Irwin, Jr. et al. |
| 5,568,629 A | 10/1996 | Gentry et al. |
| 5,574,882 A | 11/1996 | Menon et al. |
| 5,586,291 A | 12/1996 | Lasker et al. |
| 5,617,425 A | 4/1997 | Anderson |
| 5,649,194 A | 7/1997 | Miller et al. |
| 5,650,969 A | 7/1997 | Niijima et al. |
| 5,657,468 A | 8/1997 | Stallmo et al. |
| 5,675,787 A | 10/1997 | Mille et al. |
| 5,689,700 A | 11/1997 | Miller et al. |
| 5,701,462 A | 12/1997 | Whitney et al. |
| 5,701,516 A | 12/1997 | Cheng et al. |
| 5,754,756 A | 5/1998 | Watanabe et al. |
| 5,799,140 A | 8/1998 | Niijima et al. |
| 5,802,366 A | 9/1998 | Row et al. |
| 5,812,754 A | 9/1998 | Lui et al. |
| 5,819,292 A | 10/1998 | Hitz et al. |
| 5,832,198 A | 11/1998 | Lucht |
| 5,842,214 A | 11/1998 | Whitney et al. |
| 5,845,319 A | 12/1998 | Yorimitsu |
| 5,862,312 A | 1/1999 | Mann et al. |
| 5,862,313 A | 1/1999 | Johnson et al. |
| 5,862,348 A | 1/1999 | Pedersen |
| 5,864,655 A | 1/1999 | Dewey et al. |
| 5,867,665 A | 2/1999 | Butman et al. |
| 5,875,459 A | 2/1999 | Taoda |
| 5,892,915 A | 4/1999 | Duso et al. |
| 5,901,280 A | 5/1999 | Mizuno et al. |
| 5,905,998 A | 5/1999 | Ebrahim et al. |
| 5,907,672 A | 5/1999 | Matze et al. |
| 5,909,540 A | 6/1999 | Carter et al. |
| 5,931,947 A | 8/1999 | Burns et al. |
| 5,941,969 A | 8/1999 | Ram et al. |
| 5,948,110 A | 9/1999 | Hitz et al. |
| 5,950,225 A | 9/1999 | Kleiman |
| 5,951,691 A | 9/1999 | Ng et al. |
| 5,963,962 A | 10/1999 | Hitz et al. |
| 5,974,503 A | 10/1999 | Venkatesh et al. |
| 5,975,738 A | 11/1999 | DeKoning et al. |
| 5,978,565 A | 11/1999 | Ohran et al. |
| 5,996,089 A | 11/1999 | Mann et al. |
| 6,000,020 A | 12/1999 | Chin et al. |
| 6,029,168 A | 2/2000 | Frey |
| 6,038,570 A | 3/2000 | Hitz et al. |
| 6,041,423 A | 3/2000 | Tsukerman |
| 6,055,228 A | 4/2000 | DeKoning et al. |
| 6,065,037 A | 5/2000 | Hitz et al. |
| 6,065,096 A | 5/2000 | Day et al. |
| 6,070,249 A | 5/2000 | Lee |
| 6,081,883 A | 6/2000 | Popelka et al. |
| 6,081,898 A | 6/2000 | Miller et al. |
| 6,112,243 A | 8/2000 | Downs et al. |
| 6,119,244 A | 9/2000 | Schoenthal et al. |
| 6,122,754 A | 9/2000 | Litwin et al. |
| 6,148,414 A | 11/2000 | Brown et al. |
| 6,158,019 A | 12/2000 | Squibb |
| 6,192,408 B1 | 2/2001 | Vahalia et al. |
| 6,219,693 B1 | 4/2001 | Napolitano et al. |
| 6,219,751 B1 | 4/2001 | Hodges |
| 6,240,416 B1 | 5/2001 | Immon et al. |
| 6,263,358 B1 | 7/2001 | Lee et al. |
| 6,279,138 B1 | 8/2001 | Jadav et al. |
| 6,295,575 B1 | 9/2001 | Blumenau et al. |
| 6,321,358 B1 | 11/2001 | Anderson |
| 6,324,581 B1 | 11/2001 | Xu et al. |
| 6,324,582 B1 * | 11/2001 | Sridhar et al. ............... 709/230 |
| 6,351,838 B1 | 2/2002 | Amelia |
| 6,366,954 B1 * | 4/2002 | Traversat et al. ........... 709/220 |
| 6,389,459 B1 | 5/2002 | McDowell |
| 6,438,595 B1 | 8/2002 | Blumenau et al. |
| 6,487,561 B1 | 11/2002 | Ofek et al. |
| 6,499,039 B1 | 12/2002 | Venkatesh et al. |
| 6,516,350 B1 | 2/2003 | Lumelsky et al. |
| 6,560,617 B1 | 5/2003 | Winger et al. |
| 6,564,228 B1 | 5/2003 | O'Connor |
| 6,584,582 B1 | 6/2003 | O'Connor |
| 6,601,101 B1 | 7/2003 | Lee et al. |
| 6,606,629 B1 | 8/2003 | DeKoning et al. |
| 6,625,750 B1 | 9/2003 | Duso et al. |
| 6,658,478 B1 | 12/2003 | Singhai et al. |
| 6,671,705 B1 | 12/2003 | Duprey et al. |
| 6,697,846 B1 | 2/2004 | Soltis |
| 6,725,392 B1 | 4/2004 | Frey et al. |
| 6,745,284 B1 | 6/2004 | Lee et al. |
| 6,745,285 B1 | 6/2004 | Howard et al. |
| 6,745,286 B1 | 6/2004 | Staub et al. |
| 6,754,696 B1 | 6/2004 | Kamath et al. |
| 6,754,773 B1 | 6/2004 | Ulrich et al. |
| 6,766,348 B1 | 7/2004 | Combs et al. |
| 6,775,679 B1 | 8/2004 | Gupta |
| 6,775,792 B1 | 8/2004 | Ulrich et al. |
| 6,820,171 B1 | 11/2004 | Weber et al. |
| 6,826,711 B1 | 11/2004 | Moulton et al. |
| 6,862,692 B1 | 3/2005 | Ulrich et al. |
| 6,871,295 B1 | 3/2005 | Ulrich et al. |
| 6,922,688 B1 | 7/2005 | Frey, Jr. |
| 2001/0002480 A1 | 5/2001 | DeKoning et al. |
| 2001/0037371 A1 | 11/2001 | Ohran |
| 2001/0047421 A1 * | 11/2001 | Sridhar et al. ............... 709/230 |
| 2002/0010762 A1 | 1/2002 | Kodama |
| 2002/0078315 A1 | 6/2002 | Howard et al. |
| 2002/0091897 A1 | 7/2002 | Chiu et al. |
| 2002/0129246 A1 | 9/2002 | Blumenau et al. |
| 2002/0166079 A1 | 11/2002 | Ulrich et al. |
| 2002/0196744 A1 | 12/2002 | O'Connor |
| 2003/0061402 A1 | 3/2003 | Yadav |

FOREIGN PATENT DOCUMENTS

| | | |
|---|---|---|
| EP | 1152337 A1 | 11/2001 |
| JP | 11232193 A * | 8/1999 |

OTHER PUBLICATIONS

The Network Appliance Enterprise Storage Architecture: System and Data Availability TR 3065 by Michael J. Marchi & Andy Watson, Network Appliance, Inc., pp. 1-10.

SnapMirror and SnapRestore: Advances in Snapshot Technology by Keith Brown, Jeff Katcher, Rex Walters & Andy Watson, Network Appliance, Inc., pp. 1-15.

SecureShare™: Guaranteed Multiprotocol File Locking by Keith Brown & Andrea Borr, Network Appliance, Inc., pp. 1-17.

File System Security: Secure Network Data Sharing for NT and UNIX by Bridget Allison, Robert Hawley, Andrea Borr, Mark Muhlestein & David Hitz, Network Appliance, Inc., pp. 1-12.

Data Protection Strategies for Network Appliance Filers by Jay Desai, Grant Melvin, David Yu, Mike Federwisch, Network Appliance, Inc., pp. 1-32.

Multiple Volumes and Multiple RAID Groups on NetApp Filers by Karl L. Swartz, Network Appliance, Inc., pp. 1-9.

Windows® 2000 and NetApp® Filers: An Overview TR 3113 by John Phillips, Network Appliance, Inc., pp. 1-6.

Integrating NetApp® Filers with the Microsoft® Active Directory TR 3124 by John Phillips, Network Appliance, Inc., pp. 1-10.

CIFS Authentication and Security TR3020 by bridget Allison, Network Appliance, Inc., pp. 1-7.

High Availability Storage Appliance TR 3127 by Jim Helfrich, Network Appliance Inc., pp. 1-8.

SnapMirror and SnapRestore: Advances in Snapshot Technology TR 3043 by Keith Brown, Jeff Katcher, Rex Walters & Andy Watson, Network Appliance, Inc., pp. 1-14.

Merging NT and UNIX Filesystem Permissions TR 1005 by Bridget Allison, Robert Hawley, Andrea Borr, Mark Muhlestein & David Hitz, Network Appliance, Inc., pp. 1-13.

File System Design for an NFS File Server Appliance TR3002 by Dave Hitz, James Lau, & Michael Malcolm, Network Appliance, Inc., pp. 1-10.

SecureShare™[1] Safe UNIX/Windows File Sharing through Multiprotocol Locking by Andrea Borr, pp. 1-16.

Soft Updates: A Solution to the Metadata Update Problem in File Systems by Gregory R. Ganger, Marshall Kirk McKusick, Craig A. N. Soules and Yale N. Patt, pp. 1-27.

Soft Updates: A Technique for Eliminating Most Synchronous Writes in the Fast Filesystem by Marshall Kirk McKusick and Gregory R. Ganger, pp. 1-18.

Journaling Versus Soft Updates: Asynchronous Meta-Data Protection In File Systems by Margo I. Seltzer, Gregory R. Ganger, M. Kirk McKusick, Keith A. Smith, Craig A. N. Soules, and Christopher A. Stein, pp. 1-15.

Exploring SMB by Andrew Tridgell, May 8, 2000, pp. 1-6.

Transactions and Recovery File Systems & Databases; Anupam Bhide, CalSoft Private Limited, 22 Gaurishankar, Shivaji Housing Society, Off Senapti Bapat Road PUNE, pp. 1-24.

Storage Resource Management Requirements for Disk Storage by John Tyrrell, Mich Dutch and Steve Terwilliger, pp. 1-26.

IBM StorageTank™, A Distributed Storage System by D.A. Pease, R.M. Rees, W.C. Hineman, D.L. Plantenberg, R.A. Becker-Szendy, R. Ananthanarayanan, M. Sivan-Zimet, C.J. Sullivan: IBM Almaden Research Center; R.C. Burns: Johns Hopkins University; D.D.E. Long: University of California, Santa Cruz, Jan. 23, 2002, pp. 1-7.

Storage Tank, Randal Burns; Storage Systems and Servers, IBM Almaden Research Center by Robert Rees, David Pease, Wayne Hineman, Michael Penner and Darrell Long, pp. 1-44.

Storage Tank, IBM Almaden Research Center by Bob Rees, David Pease, Randal Burns and Jai Menon, pp. 1-7.

Semi-Preemptible Locks for a Distributed File System by Randal C. Burns, Robert M. Rees and Darrell D. E. Long, pp. 1-8.

Scalable Session Locking for a Distributed File System by Randal C. Burns, Robert M. Rees, Larry J. Stockmeyer and Darrell D. E. Long, pp. 1-25.

Consistency and Locking for Distributing Updates to Web Servers Using a File System by Randal C. Burns, Robert M. Rees and Darrell D. E. Long, pp. 1-7.

Efficiently Distributing Data in a Web Server Farm by Randal C. Burns, Robert M. Rees and Darrell D. E. Long, pp. 1-11.

An Analytical Study of Opportunistic Lease Renewal by Randal C. Burns, Robert M. Rees and Darrell D. E. Long, pp. 1-8.

Safe Caching in a Distributed File System for Network Attached Storage by Randal C. Burns, Robert M. Rees and Darrell D. E. Long, pp. 1-8.

A Bit-Parallel Search Algorithm for Allocating Free Space by Randal Burns and Wayne Hineman, pp. 1-9.

Date Management in a Distributed File System for Storage Area Networks by Randal Chilton Burns, Mar. 2000, pp. 1-161.

Common Internet File System (CIFS) Version: CIFS-Spec 0.9, Draft SNIA CIFS Work Group Work-in-Progress, Revision Date: Mar. 26, 2001, pp. 1-126.

Serverless Network File Systems, Copyright © 1995 by Michael Donald Dahlin, pp. 1-177.

Solaris Internals, Core Kernel Components; Sun Microsystems Press, A Prentice Hall Title, by Jim Mauro and Richard McDougall, pp. 1-116.

Unix Internals, The New Frontiers by Uresh Vahalia, EMC Corporation, Hopkinton, MA, Prentice Hall, Upper Saddle River, New Jersey 07458, pp. 1-151.

NFS Illustrated, An Imprint of Addison Wesley Longman, Inc., by Brent Callaghan, pp. 1-120.

Sun Microsystems, Inc., NFS: Network File System Protocol Specification (RFC 1094) 1989, IETF, Network Working Group, whole document.

Bott et al. Special Edition Using Windows 95 with Internet Explorer 4.0, Que, Chapter 38.

IBM, Method for Domain Server Load Balancing, Mar. 1996, International Business Machines, whole document.

Novell, Technical Information Document—TID2941090, Oct. 12, 1998, Novell, whole document.

Novell, Technical Information Document—TID2945817, Aug, 26, 1999, Novell, whole document.

Novell, Technical Information Document—TID 2932364, Dec. 1, 1997, Novell, whole document.

Mandana et al., Proving Correctness of a Controller algorithm for the RAID Level 5 System, 1998, IEEE, whole document in particular p. 2.

* cited by examiner

| INDEX | G-CODE | DATA | FILE LOGICAL BLOCK |
|---|---|---|---|
| 45 | GNODE | GNODE=67, EXTENT=2, ROOT=TRUE | |
| 46 | DATA | DISK LOGICAL BLOCKS: 456,457 DRIVE 13 | 1 |
| 47 | DATA | DISK LOGICAL BLOCKS: 667,668 DRIVE 15 | 2 |
| 48 | DATA | DISK LOGICAL BLOCKS: 112,113 DRIVE 19 | 3 |
| 49 | PARITY | DISK LOGICAL BLOCKS: 554,555 DRIVE 2 | |
| 50 | DATA | DISK LOGICAL BLOCKS: 458,459 DRIVE 13 | 4 |
| 51 | DATA | DISK LOGICAL BLOCKS: 669,670 DRIVE 15 | 5 |
| 52 | DATA | DISK LOGICAL BLOCKS: 119,120 DRIVE 19 | 6 |
| 53 | PARITY | DISK LOGICAL BLOCKS: 556,557 DRIVE 2 | |
| 54 | LINK | INDEX 76 | |
| ... | ... | ... | |
| 76 | GNODE | GNODE=67, EXTENT=3, ROOT=FALSE | |
| 77 | DATA | DISK LOGICAL BLOCKS: 460,461,462 DRIVE 13 | 7 |
| 78 | DATA | DISK LOGICAL BLOCKS: 671,672,673 DRIVE 15 | 8 |
| 79 | PARITY | DISK LOGICAL BLOCKS: 121,122,123 DRIVE 19 | |
| 80 | LINK | INDEX 88 | |
| ... | ... | ... | |
| 88 | GNODE | GNODE=67, EXTENT=3, ROOT=FALSE | |
| 89 | DATA | DISK LOGICAL BLOCKS: 463,464,465 DRIVE 13 | 9 |
| 90 | DATA | DISK LOGICAL BLOCKS: 674,675,676 DRIVE 15 | 10 |
| 91 | PARITY | DISK LOGICAL BLOCKS: 124,125,126 DRIVE 19 | |
| 92 | GNODE | GNODE=43, EXTENT=4, ROOT=FALSE | |
| ... | ... | ... | |

FIG.5

| ATTRIBUTE DATA |
|---|
| 602 — FILE ATTRIBUTE-TYPE |
| 604 — FILE ATTRIBUTE-MODE |
| 606 — FILE ATTRIBUTE-LINKS |
| 608 — FILE ATTRIBUTE-UID |
| 610 — FILE ATTRIBUTE-GID |
| 612 — FILE ATTRIBUTE-SIZE |
| 614 — FILE ATTRIBUTE-USED |
| 620 — FILE ATTRIBUTE-FILEID |
| 622 — FILE ATTRIBUTE-ATIME |
| 624 — FILE ATTRIBUTE-MTIME |
| 626 — FILE ATTRIBUTE-CTIME |
| 628 — CHILD GNID INDEX |
| 630 — GEE INDEX-LAST USED |
| 631 — GEE OFFSET-LAST USED |
| 632 — GEE INDEX-MIDPOINT |
| 633 — GEE OFFSET-MIDPOINT |
| 634 — GEE INDEX-TAIL |
| 635 — GEE OFFSET-TAIL |
| 636 — GEE INDEX-ROOT |
| 638 — GNODE STATUS |
| 640 — QUICK SHOT STATUS |
| 642 — QUICK SHOT LINK |

Entire block braced as 600.

*FIG. 6*

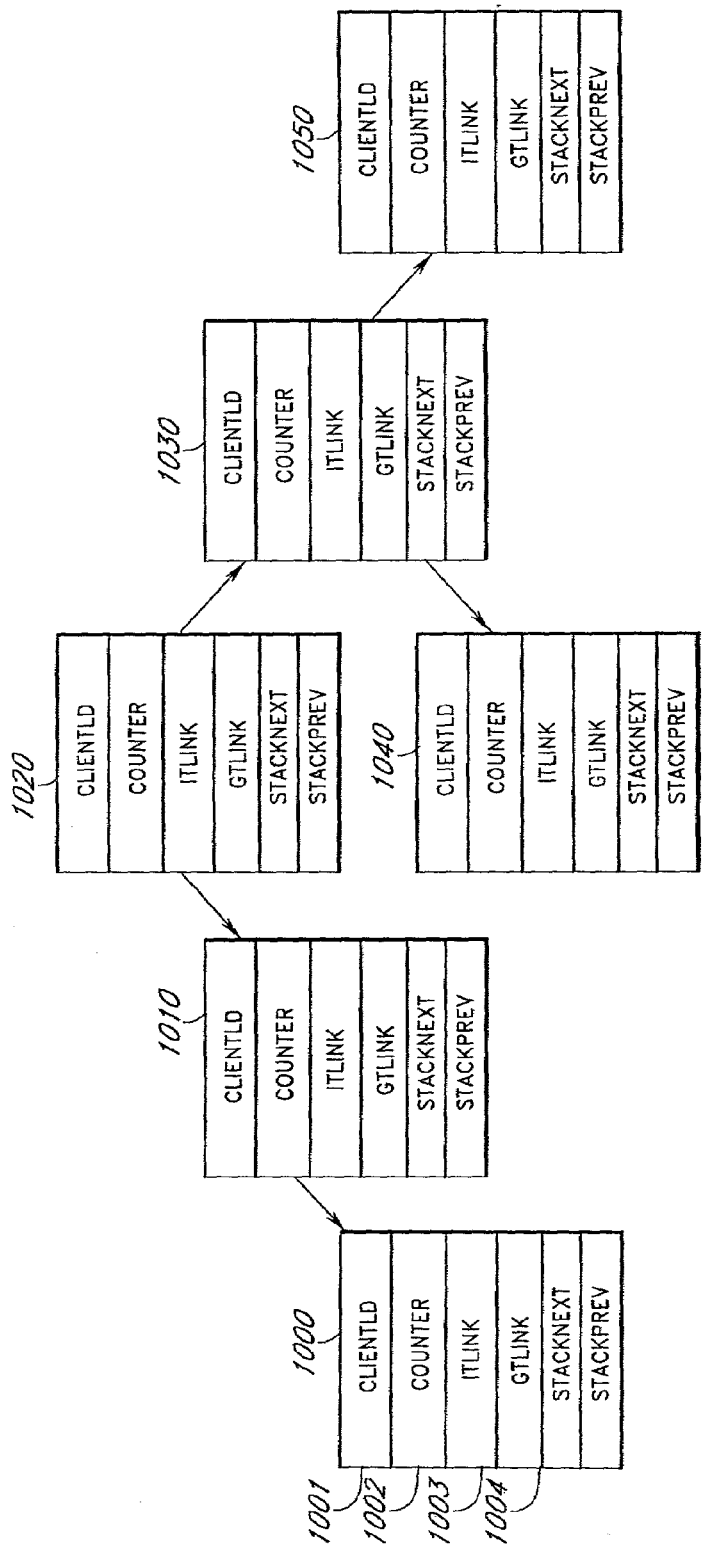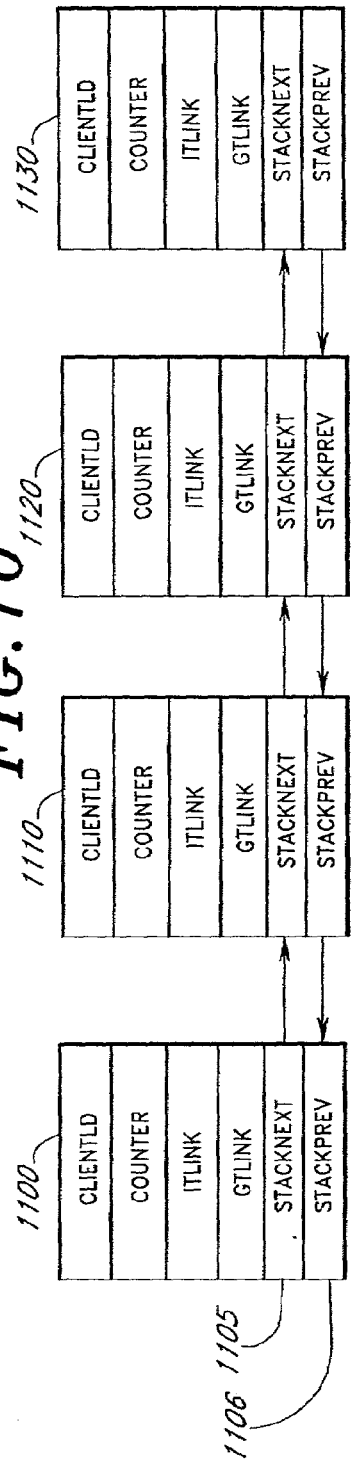

DISK ARRAY INITIALIZATION USING GEE TABLE
SPACE ALLOCATION

| INDEX | G-CODE | DATA |
|---|---|---|
| ... | ... | ... |
| 45 | GNODE | EXTENT=2 |
| 46 | DATA | BLOCKS 456,457:DRIVE 13 |
| 47 | DATA | BLOCKS 667,668:DRIVE 15 |
| 48 | DATA | BLOCKS 112,113:DRIVE 19 |
| 49 | PARITY | BLOCKS 554,555:DRIVE 2 |
| ... | ... | ... |
| 76 | GNODE | EXTENT=2 |
| 77 | DATA | BLOCKS 460,461,462:DRIVE 13 |
| 78 | DATA | BLOCKS 671,672,673:DRIVE 15 |
| 79 | PARITY | BLOCKS 121,122,123:DRIVE 19 |
| ... | ... | ... |
| 88 | GNODE | EXTENT=2 |
| 89 | DATA | BLOCKS 463,464,465:DRIVE 2 |
| 90 | DATA | BLOCKS 674,675,676:DRIVE 5 |
| 91 | PARITY | BLOCKS 124,125,126:DRIVE 13 |
| ... | | |

| | | | INTIAL ALLOCATION 3491 | DISK SPACE% 3485 |
|---|---|---|---|---|
| DATA DATA DATA DATA PARITY | 4 BLOCK PANITY 3480 | | 10000 GROUPS | 36% |
| DATA DATA DATA PARITY | 3 BLOCK PANITY 3481 | | 10000 GROUPS | 28% |
| DATA DATA PARITY | 2 BLOCK PANITY 3482 | | 10000 GROUPS | 22% |
| DATA PARITY | 1 BLOCK PANITY 3483 | | 10000 GROUPS | 14% |

⇩ DISK USAGE 3487

FIG.34B

| | 3492 FREE | OCCUPIED 3490 | TOTAL | DISK SPACE% |
|---|---|---|---|---|
| 3480 ⟶ 4 BLOCK PANITY | 2500 GROUPS | 7500 GROUPS | 10000 GROUPS | 36% |
| 3481 ⟶ 3 BLOCK PANITY | 7500 GROUPS | 2500 GROUPS | 10000 GROUPS | 28% |
| 3482 ⟶ 2 BLOCK PANITY | 3500 GROUPS | 6500 GROUPS | 10000 GROUPS | 22% |
| 3483 ⟶ 1 BLOCK PANITY | 500 GROUPS | 9500 GROUPS | 10000 GROUPS | 14% |

⇩ REDISTRIBUTION 3494

FIG.34C

| | | 3492 FREE | OCCUPIED 3490 | TOTAL | DISK SPACE% |
|---|---|---|---|---|---|
| 3480 ⟶ 4 BLOCK PANITY | | 2500 GROUPS | 7500 GROUPS | 10000 GROUPS | 36% |
| 3481 ⟶ 3 BLOCK PANITY | −5000 GROUPS OF 3 BLOCK PARITY | 2500 groups | 2500 GROUPS | 5000 GROUPS | 14% |
| 3482 ⟶ 2 BLOCK PANITY | +10000 GROUPS OF 1 BLOCK PARITY | 3500 GROUPS | 6500 GROUPS | 10000 GROUPS | 22% |
| 3483 ⟶ 1 BLOCK PANITY | | 10500 GROUPS | 9500 GROUPS | 20000 GROUPS | 28% |

REDISTRIBUTION

PARITY GROUP REDISTRIBUTION PROCESSES /-3500

F3 OBJECT POSITIONING PLAN

- PUSH LF TO F4-F5 CLUSTER

- ISSUE FILE HANDLE FOR LF=STALE

- IF REQUESTED,
    - SEND ACCEPTANCE FOR COPY OF SF TO F1

- CREATE COPY OF SF
    - SEND FILE HANDLE OF SF TO F1

*FIG. 41*

FILE SYSTEM METADATA DESCRIBING SERVER DIRECTORY INFORMATION

REFERENCE TO RELATED APPLICATIONS

The present application claims priority benefit under 35 U.S.C. § 119(e) from all of the following U.S. Provisional Applications, the contents of which are hereby incorporated by reference in their entirety:

U.S. Provisional Application No. 60/264,671, filed Jan. 29, 2001, titled "DYNAMICALLY DISTRIBUTED FILE SYSTEM";

U.S. Provisional Application No. 60/264,694, filed Jan. 29, 2001, titled "A DATA PATH ACCELERATOR ASIC FOR HIGH PERFORMANCE STORAGE SYSTEMS";

U.S. Provisional Application No. 60/264,672, filed Jan. 29, 2001, titled "INTEGRATED FILE SYSTEM/PARITY DATA PROTECTION";

U.S. Provisional Application No. 60/264,673, filed Jan. 29, 2001, titled "DISTRIBUTED PARITY DATA PROTECTION";

U.S. Provisional Application No. 60/264,670, filed Jan. 29, 2001, titled "AUTOMATIC IDENTIFICATION AND UTILIZATION OF RESOURCES IN A DISTRIBUTED FILE SERVER";

U.S. Provisional Application No. 60/264,669, filed Jan. 29, 2001, titled "DATA FLOW CONTROLLER ARCHITECTURE FOR HIGH PERFORMANCE STORAGE SYSTEMS";

U.S. Provisional Application No. 60/264,668, filed Jan. 29, 2001, titled "ADAPTIVE LOAD BALANCING FOR A DISTRIBUTED FILE SERVER"; and U.S. Provisional Application No. 60/302,424, filed Jun. 29, 2001, titled "DYNAMICALLY DISTRIBUTED FILE SYSTEM".

BACKGROUND OF THE INVENTION

1. Field of the Invention

This invention relates to the field of data storage and management. More particularly, this invention relates to high-performance mass storage systems and methods for data storage, backup, and recovery.

2. Description of the Related Art

In modern computer systems, collections of data are usually organized and stored as files. A file system allows users to organize, access, and manipulate these files and also performs administrative tasks such as communicating with physical storage components and recovering from failure. The demand for file systems that provide high-speed, reliable, concurrent access to vast amounts of data for large numbers of users has been steadily increasing in recent years. Often such systems use a Redundant Array of Independent Disks (RAID) technology, which distributes the data across multiple disk drives, but provides an interface that appears to users as one, unified disk drive system, identified by a single drive letter. In a RAID system that includes more than one array of disks, each array is often identified by a unique drive letter, and in order to access a given file, a user must correctly identify the drive letter for the disk array on which the file resides. Any transfer of files from one disk array to another and any addition of new disk arrays to the system must be made known to users so that they can continue to correctly access the files.

RAID systems effectively speed up access to data over single-disk systems, and they allow for the regeneration of data lost due to a disk failure. However, they do so by rigidly prescribing the configuration of system hardware and the block size and location of data stored on the disks. Demands for increases in storage capacity that are transparent to the users or for hardware upgrades that lack conformity with existing system hardware cannot be accommodated, especially while the system is in use. In addition, such systems commonly suffer from the problem of data fragmentation, and they lack the flexibility necessary to intelligently optimize use of their storage resources.

RAID systems are designed to provide high-capacity data storage with built-in reliability mechanisms able to automatically reconstruct and restore saved data in the event of a hardware failure or data corruption. In conventional RAID technology, techniques including spanning, mirroring, and duplexing are used to create a data storage device from a plurality of smaller single disk drives with improved reliability and storage capacity over conventional disk systems. RAID systems generally incorporate a degree of redundancy into the storage mechanism to permit saved data to be reconstructed in the event of single (or sometimes double) disk failure within the disk array. Saved data is further stored in a predefined manner that is dependent on a fixed algorithm to distribute the information across the drives of the array. The manner of data distribution and data redundancy within the disk array impacts the performance and usability of the storage system and may result in substantial tradeoffs between performance, reliability, and flexibility.

A number of RAID configurations have been proposed to map data across the disks of the disk array. Some of the more commonly recognized configurations include RAID-1, RAID-2, RAID-3, RAID-4, and RAID-5.

In most RAID systems, data is sequentially stored in data stripes and a parity block is created for each data stripe. The parity block contains information derived from the sequence and composition of the data stored in the associated data stripe. RAID arrays can reconstruct information stored in a particular data stripe using the parity information, however, this configuration imposes the requirement that records span across all drives in the array resulting in a small stripe size relative to the stored record size.

FIG. 21 illustrates the data mapping approach used in many conventional RAID storage device implementations. Although the diagram corresponds most closely to RAID-3 or RAID-4 mapping schemas, other RAID configurations are organized in a similar manner. As previously indicated, each RAID configuration uses a striped disk array 2110 that logically combines two or more disk drives 2115 into a single storage unit. The storage space of each drive 2115 is organized by partitioning the space on the drives into stripes 2120 that are interleaved so that the available storage space is distributed evenly across each drive.

Information or files are stored on the disk array 2110. Typically, the writing of data to the disks occurs in a parallel manner to improve performance. A parity block is constructed by performing a logical operation (exclusive OR) on the corresponding blocks of the data stripe to create a new block of data representative of the result of the logical operation. The result is termed a parity block and is written to a separate area 2130 within the disk array. In the event of data corruption within a particular disk of the array 10, the parity information is used to reconstruct the data using the information stored in the parity block in conjunction with the remaining non-corrupted data blocks.

In the RAID architecture, multiple disks a typically mapped to a single 'virtual disk'. Consecutive blocks of the virtual disk are mapped by a strictly defined algorithm to a set of physical disks with no file level awareness. When the RAID system is used to host a conventional file system, it is the file system that maps files to the virtual disk blocks where they may be mapped in a sequential or non-sequential order in a RAID stripe. The RAID stripe may contain data from a single file or data from multiple files if the files are small or the file system is highly fragmented.

The aforementioned RAID architecture suffers from a number of drawbacks that limit its flexibility and scalability for use in reliable storage systems. One problem with existing RAID systems is that the data striping is designed to be used in conjunction with disks of the same size. Each stripe occupies a fixed amount of disk space and the total number of stripes allowed in the RAID system is limited by the capacity of the smallest disk in the array. Any additional space that may be present on drives having a capacity larger than the smallest drive goes unused as the RAID system lacks the ability to use the additional space. This further presents a problem in upgrading the storage capacity of the RAID system, as all of the drives in the array must be replaced with larger capacity drives if additional storage space is desired. Therefore, existing RAID systems are inflexible in terms of their drive composition, increasing the cost and inconvenience to maintain and upgrade the storage system.

A further problem with conventional RAID arrays resides in the rigid organization of data on the disks of the RAID array. As previously described, this organization typically does not use available disk space in an efficient manner. These systems further utilize a single fixed block size to store data which is implemented with the restriction of sequential file storage along each disk stripe. Data storage in this manner is typically inefficient as regions or gaps of disk space may go unused due to the file organization restrictions. Furthermore, the fixed block size of the RAID array is not able to distinguish between large files, which benefit from larger block size, and smaller files, which benefit from smaller block size for more efficient storage and reduced wasted space.

Although conventional RAID configurations are characterized as being fault-tolerant, this capability is typically limited to single disk failures. Should more than one (or two) disk fail or become inoperable within the RAID array before it can be replaced or repaired there is the potential for data loss. This problem again arises from the rigid structure of data storage within the array that utilizes sequential data striping. This problem is further exacerbated by the lack of ability of the RAID system to flexibly redistribute data to other disk areas to compensate for drive faults. Thus, when one drive becomes inoperable within the array, the likelihood of data loss increases significantly until the drive is replaced resulting in increased maintenance and monitoring requirements when using conventional RAID systems.

With respect to conventional data storage systems or other computer networks, conventional load balancing includes a variety of drawbacks. For example, decisions relating to load balancing are typically centralized in one governing process, one or more system administrators, or combinations thereof. Accordingly, such systems have a single point of failure, such as the governing process or the system administrator. Moreover, load balancing occurs only when the centralized process or system administrator can organize performance data, make a decision, and then transmit that decision throughout the data storage system or computer network. This often means that the such load balancing can be slow to react, difficult to optimize for a particular server, and difficult to scale as the available resources expand or contract. In addition, conventional load balancing typically is limited to balancing processing and communications activity between servers only.

SUMMARY OF THE INVENTION

The present invention solves these and other problems by providing a dynamically distributed file system that accommodates current demands for high capacity, throughput, and reliability, while presenting to the users a single-file-system interface that appears to include every file in the system on a single server or drive. In this way, the file system is free to flexibly, transparently, and on-the-fly distribute and augment physical storage of the files in any manner that suits its needs, across disk drives, and across servers, and users can freely access any file without having specific knowledge of the files current physical location.

One embodiment includes a storage device and architecture which possesses features such as transparent scalability where disks of non-identical capacity can be fully-utilized without the "dead-space" restrictions associated with conventional disk arrays. In one embodiment a flexible storage space allocation system handles storing large and small file types to improve disk space utilization. In another embodiment an improved method for maintaining data integrity overcomes the single drive (or double) fault limitation of conventional systems in order to increase storage reliability while at the same time reducing maintenance and monitoring requirements.

In one embodiment, distributed parity groups (DPG) are integrated into the distributed file storage system technology. This architecture provides capabilities for optimizing the use of disk resources by moving frequently and infrequently accessed data blocks between drives so as to maximize the throughput and capacity utilization of each drive.

In one embodiment, the architecture supports incorporation of new disk drives without significant reconfiguration or modification of the exiting distributed file storage system to provide improved reliability, flexibility, and scalability. Additionally, the architecture permits the removal of arbitrary disk drives from the distributed file storage system and automatically redistributes the contents of these drives to other available drives as necessary.

The distributed file storage system can proactively position objects for initial load balancing, such as, for example, to determine where to place a particular new object. Additionally, the distributed file storage system can continue to proactively position objects, thereby accomplishing active load balancing for the existing objects throughout the system. According to one embodiment, one or more filters may be applied during initial and/or active load balancing to ensure one or a small set of objects are not frequently transferred, or churned, throughout the resources of the system.

As used herein, load balancing can include, among other things, capacity balancing, throughput balancing, or both. Capacity balancing seeks balance in storage, such as the number of objects, the number of Megabytes, or the like, stored on particular resources within the distributed file storage system. Throughput balancing seeks balance in the number of transactions processed, such as, the number of transactions per second, the number of Megabytes per second, or the like, handled by particular resources within the distributed file storage system. According to one embodiment, the distributed file storage system can position objects to balance capacity, throughput, or both, between objects on a resource, between resources, between the servers of a cluster of resources, between the servers of other clusters of resources, or the like.

The distributed file storage system can comprise resources, such as servers or clusters, which can seek to balance the loading across the system by reviewing a collection of load balancing data from itself, one or more of the other servers in the system, or the like. The load balancing data can include object file statistics, server profiles, predicted file accesses, or the like. A proactive object positioner associated with a particular server can use the load balancing data to generate an object positioning plan designed to move objects, replicate objects, or both, across other resources in the system. Then, using the object positioning plan, the resource or other resources within the distributed file storage system can execute the plan in an efficient manner.

According to one embodiment, each server pushes objects defined by that server's respective portion of the object positioning plan to the other servers in the distributed file storage system. By employing the servers to individually push objects based on the results of their object positioning plan, the distributed file storage system provides a server-, process-, and administrator-independent approach to object positioning, and thus load balancing, within the distributed file storage system.

In one embodiment, the network file storage system includes a first file server operably connected to a network fabric; a second file server operably connected to the network fabric; first file system information loaded on the first file server; and second file system information loaded on the second file server, the first file system information and the second file system information configured to allow a client computer operably connected to the network fabric to locate files stored by the first file server and files stored by the second file server without prior knowledge as to which file server stores the files. In one embodiment, the first file system information includes directory information that describes a directory structure of a portion of the network file system whose directories are stored on the first file server, the directory information includes location information for a first file, the location information includes a server id that identifies at least the first file server or the second file server.

In one embodiment, the network file storage system loads first file system metadata on a first file server operably connected to a network fabric; loads second file system metadata on a second file server connected to the network fabric, the first file system metadata and the second file system metadata include information to allow a client computer operably connected to the network fabric to locate a file stored by the first file server or stored by the second file server without prior knowledge as to which file server stores the file.

In one embodiment, the network file storage system performs a file handle lookup on a computer network file system by: sending a root-directory lookup request to a first file server operably connected to a network fabric; receiving a first lookup response from the first file server, the first lookup response includes a server id of a second file server connected to the network fabric; sending a directory lookup request to the second file server; and receiving a file handle from the second file server.

In one embodiment, the network file storage system allocates space by: receiving a file allocation request in a first file server, the first file server owning a parent directory that is to contain a new file, the file allocation request includes a file handle of the parent directory; determining a selected file server from a plurality of file servers; sending a file allocation request from the first server to the selected server; creating metadata entries for the new file in file system data managed by the selected file server; generating a file handle for the new file; sending the file handle to the first file server; and creating a directory entry for the new file in the parent directory.

In one embodiment, the network file storage system includes: a first file server operably connected to a network fabric; a second file server operably connected to the network fabric; first file system information loaded on the first file server; and second file system information loaded on the second file server, the first file system information and the second file system information configured to allow a client computer operably connected to the network fabric to locate files owned by the first file server and files owned by the second file server without prior knowledge as to which file server owns the files, the first file server configured to mirror at least a portion of the files owned by the second file server, the first file server configured to store information sufficient to regenerate the second file system information, and the second file server configured to store information sufficient to regenerate the first file system information.

In one embodiment, the network file storage system: loads first file system metadata on a first file server operably connected to a network fabric; loads second file system metadata on a second file server connected to the network fabric, the first file system metadata and the second file system metadata include information to allow a client computer operably connected to the network fabric to locate a file stored by the first file server or stored by the second file server without prior knowledge as to which file server stores the file; maintains information on the second file server to enable the second file server to reconstruct an information content of the first file system metadata; and maintains information on the first file server to enable the first file server to reconstruct an information content of the second file system metadata.

In one embodiment the computer network file storage system is fault-tolerant and includes: a first file server operably connected to a network fabric; a second file server operably connected to the network fabric; a first disk array operably coupled to the first file server and to the second file server; a second disk array operably coupled to the first file server and to the second file server; first file system information loaded on the first file server, the first file system information including a first intent log of proposed changes to the first metadata; second file system information loaded on the second file server, the second file system information including a second intent log of proposed changes to the second metadata, the first file server having a copy of the second intent log, the second file server maintaining a copy of the first intent log, thereby allowing the first file server to access files on the second disk array in the event of a failure of the second file server.

In one embodiment, a distributed file storage system provides hot-swapping of file servers by: loading first file system metadata on a first file server operably connected to a network fabric, the first file system operably connected to a first disk drive and a second disk drive; loading second file system metadata on a second file server connected to the network fabric, the second file system operably connected to the first disk drive and to the second disk drive; copying a first intent log from the first file server to a backup intent log on the second file server, the first intent log providing information regarding future changes to information stored on the first disk drive; and using the backup intent log to allow the second file server to make changes to the information stored on the first disk drive.

In one embodiment, a distributed file storage system includes: a first file server operably connected to a network fabric; a file system includes first file system information loaded on the first file server, the file system configured to create second file system information on a second file server that comes online sometime after the first file server has begun servicing file requests, the file system configured to allow a requester to locate files stored by the first file server and files stored by the second file server without prior knowledge as to which file server stores the files.

In one embodiment, a distributed file storage system adds servers during ongoing file system operations by: loading first file system metadata on a first file server operably connected to a network fabric; creating at least one new file on a second file server that comes online while the first file server is servicing file requests, the at least one new file created in response to a request issued to the first file server, the distributed file system configured to allow a requester to locate files stored by the first file server and files stored by the second file server without prior knowledge as to which file server stores the files.

In one embodiment, a distributed file storage system includes: first metadata managed primarily by a first file server operably connected to a network fabric, the first metadata includes first file location information, the first file location information includes at least one server id; and second metadata managed primarily by a second file server operably connected to the network fabric, the second metadata includes second file location information, the second file location information includes at least one server identifier, the first metadata and the second metadata configured to allow a requestor to locate files stored by the first file server and files stored by the second file server in a directory structure that spans the first file server and the second file server.

In one embodiment, a distributed file storage system stores data by: creating first file system metadata on a first file server operably connected to a network fabric, the first file system metadata describing at least files and directories stored by the first file server; creating second file system metadata on a second file server connected to the network fabric, the second file system metadata describing at least files and directories stored by the second file server, the first file system metadata and the second file system metadata includes directory information that spans the first file server and the second file server, the directory information configured to allow a requestor to find a location of a first file catalogued in the directory information without prior knowledge as to a server location of the first file.

In one embodiment, a distributed file storage system balances the loading of servers and the capacity of drives associated with the servers, the file system includes: a first disk drive including a first unused capacity; a second disk drive including a second unused capacity, wherein the second unused capacity is smaller than the first unused capacity; a first server configured to fill requests from clients through access to at least the first disk drive; and a second server configured to fill requests from clients through access to at least the second disk drive, and configured to select an infrequently accessed file from the second disk drive and push the infrequently accessed files to the first disk drive, thereby improving a balance of unused capacity between the first and second disk drives without substantially affecting a loading for each of the first and second servers.

In one embodiment, a distributed file storage system includes: a first file server operably connected to a network fabric; a second file server operably connected to the network fabric; first file system information loaded on the first file server; and second file system information loaded on the second file server, the first file system information and the second file system information configured to allow a client computer operably connected to the network fabric to locate files stored by the first file server and files stored by the second file server without prior knowledge as to which file server stores the files.

In one embodiment, a data engine offloads data transfer operations from a server CPU. In one embodiment, the server CPU queues data operations to the data engine.

In one embodiment, a distributed file storage system includes: a plurality of disk drives for storing parity groups, each parity group includes storage blocks, the storage blocks includes one or more data blocks and a parity block associated with the one or more data blocks, each of the storage blocks stored on a separate disk drive such that no two storage blocks from a given parity set reside on the same disk drive, wherein file system metadata includes information to describe the number of data blocks in one or more parity groups.

In one embodiment, a distributed file storage system stores data by: determining a size of a parity group in response to a write request, the size describing a number of data blocks in the parity group; arranging at least a portion of data from the write request according to the data blocks; computing a parity block for the parity group; storing each of the data blocks on a separate disk drive such that no two data blocks from the parity group reside on the same disk drive; and storing each the parity block on a separate disk drive that does not contain any of the data blocks.

In one embodiment, a distributed file storage system includes: a plurality of disk drives for storing parity groups, each parity group includes storage blocks, the storage blocks includes one or more data blocks and a parity block associated with the one or more data blocks, each of the storage blocks stored on a separate disk drive such that no two storage blocks from a given parity set reside on the same disk drive; a redistribution module to dynamically redistribute parity groups by combining some parity groups to improve storage efficiency.

In one embodiment, a distributed file storage system stores data by: determining a size of a parity group in response to a write request, the size describing a number of data blocks in the parity group; arranging at least a portion of data from the write request according to the data blocks; computing a parity block for the parity group; storing each of the data blocks on a separate disk drive such that no two data blocks from the parity group reside on the same disk drive; storing the parity block on a separate disk drive that does not contain any of the data blocks; and redistributing the parity groups to improve storage efficiency.

In one embodiment, a distributed file storage system includes: a plurality of disk drives for storing parity groups, each parity group includes storage blocks, the storage blocks includes one or more data blocks and a parity block associated with the one or more data blocks, each of the storage blocks stored on a separate disk drive such that no two storage blocks from a given parity set reside on the same disk drive; and a recovery module to dynamically recover data lost when at least a portion of one disk drive in the plurality of disk drives becomes unavailable, the recovery module configured to produce a reconstructed block by using information in the remaining storage blocks of a parity set corresponding to an unavailable storage block, the recovery module further configured to split the parity group corresponding to an unavailable storage block into two parity groups if the parity group corresponding to an unavailable storage block spanned all of the drives in the plurality of disk drives.

In one embodiment, a distributed file storage system stores data by: determining a size of a parity group in response to a write request, the size describing a number of data blocks in the parity group; arranging at least a portion of data from the write request according to the data blocks; computing a parity block for the parity group; storing each of the data blocks on a separate disk drive such that no two data blocks from the parity group reside on the same disk drive; storing the parity block on a separate disk drive that does not contain any of the data blocks; reconstructing lost data by using information in the remaining storage blocks of a parity set corresponding to an unavailable storage block to produce a reconstructed parity group; splitting the reconstructed parity group corresponding to an unavailable storage block into two parity groups if the reconstructed parity group is too large to be stored on the plurality of disk drives.

In one embodiment, a distributed file storage system integrates parity group information into file system metadata.

BRIEF DESCRIPTION OF THE DRAWINGS

These and other aspects, advantages, and novel features of the invention will become apparent upon reading the following detailed description and upon reference to the accompanying drawings:

FIG. 5 shows an example of a Gee-string stored in a Gee Table.

FIG. 6 shows one embodiment of the structure of a G-node.

FIG. 10 shows one embodiment of Refresh Nodes configured as a binary tree.

FIG. 11 shows one embodiment of Refresh Nodes configured as a doubly-linked list.

FIG. 27 illustrates one embodiment of a G-table used to determine parity group mapping.

FIGS. 34A–C illustrate a parity set redistribution process.

FIG. 41 depicts an object positioning plan for Server F3 of FIG. 39, according to aspects of an exemplary embodiment of the invention.

DETAILED DESCRIPTION

Introduction

Figure 1:
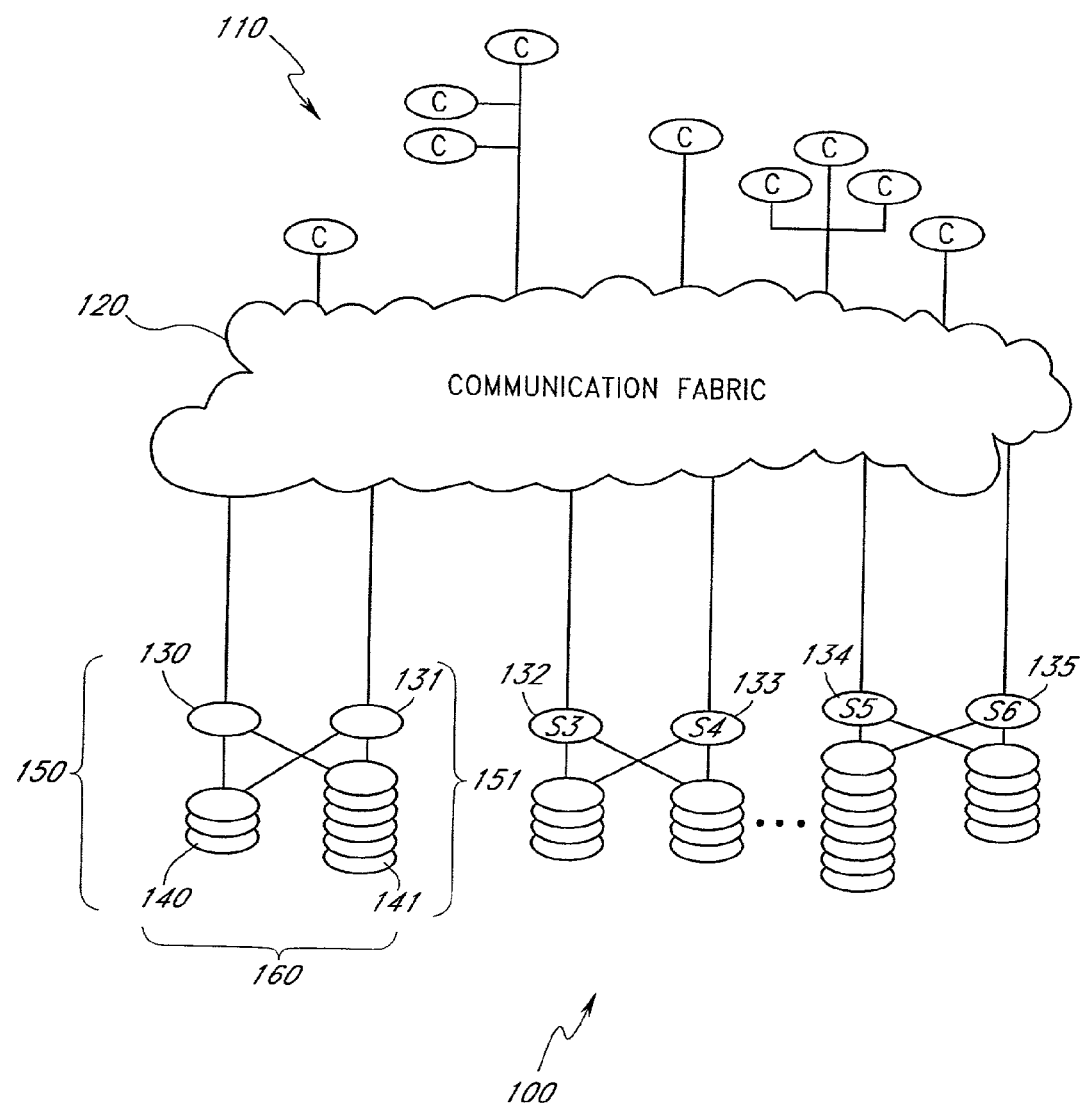
FIG. 1 is a general overview of a distributed file storage system showing clients, a communication fabric, and a plurality of servers with associated disk arrays.

As data storage requirements increase, it is desirable to be able to easily increase the data storage capacity and/or performance of a data storage system. That is, it is desirable to be able to increase the available capacity and performance of a storage system without modifying the configuration of the clients accessing the system. For example, in a typical Personal Computer (PC) network environment, if a database accesses a network drive "M", it is desirable to be able to add storage to this drive, all the while still calling the drive "M", as opposed to adding, say, drives "N", "O", and "P" as storage requirements increase. In some cases, having to switch from a single drive "M" to four drives, "M", "O", "P" is a mere nuisance. However, in some cases such a change requires significant reconfiguration of client configurations. In other cases, such a change requires modification of existing application software, and in some instances such a change simply will not work with the application being used.

The objective for more capacity can be met in some storage systems by adding additional disk drives to the system. However, this may not result in increasing performance. In fact, adding additional drives may cause a significant decrease in performance. This is because: (1) if more ports are not added to the system when new drives are added, the performance decreases because now more data is available (and presumably being accessed) through the same performance ports; and (2) the controller managing the file system metadata has more operations to perform and can become a bottleneck. Adding drives to existing systems may also limited by physical form factors. That is to say, that some systems have physical limits to how many drives can be added.

In one embodiment, the system described herein provides a Distributed File Storage System (DFSS) that can scale disk capacity, scale data throughput (e.g., megabytes per second of data delivery); and scale transaction processing throughput (e.g., processing of file system metadata). In one embodiment, the system also provides load balancing such that the scaled components handle the workload with improved efficiency.

In one embodiment, the DFSS is dynamically distributed. In one embodiment, the DFSS allows the integration of multiple servers so that the aggregation of servers appears to a client as a single storage device. With the DFSS, multiple servers can access and control the same disk array, separate disk arrays, or both simultaneously. The DFSS is designed so that each server can continue to read and write data to the drives it controls even when other controllers in the DFSS fail. The DFSS also provides a mechanism for balancing the load on the controllers and the drives.

In one embodiment, the DFSS is designed such that when multiple controllers are controlling a single array of disk drives (also called a drive array), some or all of the servers connected to the drive array have valid copies of the file system metadata describing the data on that drive array. This means that each server has direct access to all of the file system metadata for one or more of the drive arrays it can access. Thus: (1) a server can continue to operate normally if the other servers in the system fail; and (2) there is little or no performance degradation due to one server polling another server regarding location of data on drive arrays.

The DFSS provides inter-server communication to maintains synchronization of the file system metadata. The DFSS is designed such that a server can read from more than one drive array and can read from drive arrays maintained by another server. In one embodiment, only one controller attached to a particular drive array has write privileges for that particular drive array at a given time.

The DFSS maintains a description of which servers have read and write privileges to a file represented by a file handle passed to the client. When the client looks up a file handle, the client is informed of its options regarding which servers it may read the data from (which is typically several) and which one server it needs to use to write data. In addition, since the servers typically have multiple network interface cards (ports) to the client network, the file handle also includes data which suggests to the client which port is likely to be the least utilized.

The DFSS is also designed such that when there are multiple servers, which are not sharing the same drive arrays, the drive arrays are seamlessly integrated. For example, suppose a system has 4 servers (numbered S1, S2, S3, and S4) and two drive arrays, numbered (A1, and A2). Further suppose that S1 and S2 control A1 and that S3 and S4 control A2. The DFSS allows for a directory on A1 to have children on A2. In fact, the file system keeps track of usage statistics, and if A2 is less utilized than A1, the file system will automatically create the next files on A2 instead of A1. The DFSS provides coordination between the servers to allow this level of integration.

Because each server has a complete set of metadata for each drive array it can access, a particular server can continue to operate even if other servers fail. The DFSS includes a mechanism for determining if a controller has failed and a mechanism for transferring write privileges in such cases. Clearly if all controllers attached to a given drive array fail, the data on that drive array will become inaccessible. However, the capability to support multiple controllers for each drive array greatly reduces the likelihood of such an event. If all such controllers for a drive array fail, read and write operations on the remaining controller/drive arrays continue unhindered.

The DFSS can perform load balancing at three levels. First, when a directory lookup is performed, the file system encodes within the file handle the lesser-used network interface to provide balancing of network interface resources. Second, when a new file is created, it is created on lesser-used drives and owned by a lesser-used server. Third, dynamic analysis of loading conditions is performed to identify under-utilized and over-utilized drives. In response, the file system in some cases redistributes the parity groups across the drives in the existing drive array for more optimum usage of parity checking, and in other cases the file system moves files to lesser used drive arrays.

Many data storage systems are designed with the twin goals of providing fast access to data and providing protection against loss of data due to the failure of physical storage media. Prior art solutions typically relied on Redundant Arrays of Independent Disks (RAID). By having the data striped across multiple drives, the data can be accessed faster because the slow process of retrieving data from disk is done in parallel, with multiple drives accessing their data at the same time. By allocating an additional disk for storing parity information, if any one disk fails, the data in the stripe can be regenerated from the remaining drives in the stripe.

While this approach has proven effective in many applications, it does have a few fundamental limitations, one of this is that there is a rigid algorithm for mapping addresses from the file system to addresses on the drives in the array. Hence stripes are created and maintained in a rigid manner, according to a predetermined equation. An unfortunate side effect results from this limitation. There is no mechanism from keeping data from a particular file from becoming highly fragmented, meaning that although the data could actually fit in a single stripe, the data could actually be located in many of stripes (this situation can be particularly acute when multiple clients are writing to a file system).

In one embodiment, the DFSS abandons the notion of having a rigid algorithm to map from addresses in the file system to drive addresses. Instead, DFSS uses Distributed Parity Groups (DPGs) to perform the mapping. Data blocks in the DPGs are mapped via a mapping table (or a list of tables) rather than a fixed algorithm, and the blocks are linked together via a table of linked lists. As discussed below, the DPG mapping can be maintained separately or can be integrated into the file system metadata.

Initially the mapping is somewhat arbitrary and is based on the expectation that the drives will be accessed evenly. However, the system keeps track of drive usage frequency. As patterns of usage are established, blocks are copied from frequently accessed drives to infrequently accessed drives. Once the copy is complete, the blocks are remapped to point to the new copies.

The disk drives are viewed as consisting of a collection of blocks. The block size is typically an integer multiple of the drive sector size. The drive sector size is a characteristic of the drives, and is the minimum size of data that can be written to the drives. For most Fibre Channel drives, the sector size is 512 bytes.

In one embodiment, the blocks are grouped via a G-Table. The G-table is a collection of Gees, which represent the individual blocks and their linkage. Each Gee contains a code that identifies what that the Gee's purpose is (e.g., linkage or representing data). Gees for a DPG strung together into a G-group. The entire G-table is cached, either in whole or in part, in Random Access Memory (RAM). Individual Gees are modified in cache to indicate when a specific block of data is in cache. This provides a straightforward way to be assured that if any client has caused disk data to be cached, any other client seeking that same data will be directed to the already cached data.

RAID systems are implemented independently from the file system. That is, from the file system's point of view, the array looks like one big disk. Hence stripes are created and maintained without any knowledge of the data they contain. Two unfortunate side effects result from this limitation. First, there is no mechanism from keeping data from a particular file from becoming highly fragmented, meaning that although the data could actually fit in a single stripe, the data could actually be located many stripes (this situation can be particularly acute when multiple clients are writing to files). The can result in each drive doing hundreds of seeks, while a smarter system could do just one. This is significant because the seek is the slowest operation related to accessing data on disks.

Second, when a drive fails, the data on that drive must be regenerated on a replacement drive exactly as it was on the failed drive. This means that if, for example, a server that has only 10% of its disk space currently used, can only regenerate the data onto a replacement drive (or a hot spare) even though there is more than enough disk space to regenerate the data onto the other disks. For remote installations, if a hot spare is used, once one failure occurs, the hot spare is used and the system can no longer tolerate another failure until the bad drive is replaced. Of curse this could be lessened by the usage of multiple hot spares, but that significantly increases the amount of disk storage that is not being used and merely "waiting in the wings".

In one embodiment, the DFSS management of the DPGs is integrated into the file system, thus making the file system "aware" of the DPGs and how data blocks from a file are collected into parity groups. Making the file system aware of the DPGs allows the file servers in the DFSS to more intelligently use the disk arrays than a RAID system would. With the DPG system, the file system has knowledge of the drive arrays and therefore reduces the kind of fragmenting that is typical of RAID systems.

Furthermore, in the event of a failure of one drive in the DFSS, the data from the failed drive can be redistributed across the remaining drives in a disk array. For example, suppose a file contained a DPG having a length (also known as a "span") of 9 (data spread across 9 drives, where 8 drives contain the data blocks and the ninth drive contains the parity block). When one drive fails, the data can be regenerated and redistributed using a DPG of span 8. Note that without knowledge of which blocks are associated with which files, this redistribution is not possible, because the file must still have the same number of total blocks, but when the span is reduced from 9 to 8, there is an orphan block of 1 which must be still associated with the file. This orphan is associated with another DPG in the same file. This association is not possible without knowledge of the file. Alternatively, if there are at least ten disks in the disk array, the data can be regenerated and redistributed using a DPG span of 9, omitting the failed drive. Thus, the integration of DPG management into the file system provides flexibility not available in a conventional RAID system.

Sine the DFSS has full knowledge of the file system, the DFSS has knowledge of which blocks on the disks are not used. This allows the DFSS to identify heavily used disks and redistribute data from heavily-used disks to unused blocks on lesser-used blocks.

Storage system capability is typically measured in capacity, bandwidth, and the number of operations per second that can be processed. It is desirable to be able to easily scale a storage system, that is, to be able to easily increase the storage capacity, the bandwidth, or the operations per second capacity of the storage system. Storage system capacity is scaled by adding disk drives or to replace disk drive with drives having greater capacity. To increase storage system bandwidth or transactions per second capacity, it is typically necessary to add servers. It is desirable to be able to add and utilize these resources with little or no user intervention or configuration.

In one embodiment, the DFSS can automatically identify and utilize available resources, including disk drives and servers. Two features are used realize this: 1) detecting the addition of disk drives and/or servers; and 2) a automatically initializing and incorporating newly added disk drives and/or servers. The same mechanisms that are used to detect newly-added resources can also be used to support the deletion of resources.

With regard to detection of new resources, modern, high performance networking technologies such as Fibre Channel and Gigabit Ethernet supply methods for determining what devices are connected to the network. By storing the device map, and periodically querying the network for an updated device map, the presence of new devices can be determined. New devices are added to the appropriate server resource map.

In one embodiment, a resource manager in the DFSS provides the capability to incorporate the new resources automatically. The resource manager keeps track of available disk resources, as measured in available disk devices and the available free blocks on each disk. The resource manager keeps track of the available servers and the unutilized capacity, in terms of bandwidth and transactions per second, of each server. When new resources are added to the DFSS, the resource manager incorporates the additions into a resource database.

The resource manager works in conjunction with aspects of the DFSS to dynamically allocate storage and controller resources to files. When the DFSS needs to create a new file, or extend an already created file, it coordinates with the resource manager to create a DPG of the appropriate size. A similar approach is followed by the DFSS in the selection of which server to use in the creation of a new file.

The resource manager approach also supports a load balancing capability. Load balancing is useful in a distributed file system to spread the workload relatively uniformly across all of the available resources (e.g., across disks, network interfaces, and servers). The ability to proactively relocate file data is a tool that can be used to support load balancing by moving file data from over-utilized resources to under-utilized resources. In one embodiment, the resource manager supports load balancing by incorporating resource usage predictions.

In the DFSS, the server workload includes communication with client machines, reading and writing files from disks, managing file metadata, and managing server resources such as storage capacity. The workload is divided up among the server hardware resources. If the workload is evenly divided, the resulting performance will be improved. Thus, one key to performance is intelligent resource management. In one embodiment, resource management involves adaptive load balancing of server workloads. Prior art distributed file system technologies do not offer an effective method of performing load balancing in the face of a dynamic load environment and thus cannot provide optimum performance.

In one embodiment adaptive load balancing is based on the implementation of two mechanisms. First, a mechanism is provided to predict the future server workload. Second, a mechanism is provided to reallocate distributed server resources in response to the predicted workload.

Prediction of the future workload has several aspects. The first of these aspects is the past history of server workload, in terms if file access statistics, server utilization statistics, and network utilization statistics. The loading prediction mechanism uses these statistics (with an appropriate filter applied) to generate predictions for future loading. As a very simple example, a file that has experienced heavy sequential read activity in the past few minutes will likely continue to experience heavy sequential read access for the next few minutes.

The predictions for future workload can be used to proactively manage resources to improve performance and capacity usage. One mechanism used to reallocate server workload is the movement and replication of content (files) such that server and storage utilization is balanced and the direction of client accesses to available servers is balanced. Some degree of cooperation from client machines can be used to provide more effective load balancing, but client cooperation is not strictly required.

A file server contains a number of hardware resources, including controllers, storage elements (disks), and network elements. In the configuration used by the DFSS, multiple client machines are connected through a (possibly redundant) client network to one or more server clusters. Each server cluster has one or more servers and a disk storage pool.

Software resident on each server collects statistics regarding file accesses and server resource utilization. This includes information regarding the access frequency, access bandwidth and access locality for the individual files, the loading of each disk controller and disk storage element in terms of CPU utilization, data transfer bandwidth, transactions per second, and the loading of each network element in terms of network latency and data transfer bandwidth.

The collected statistics are subjected to various filter operations, which results in a prediction of future file and resource utilization (i.e., workload). This prediction can also be modified by server configuration data which has been provided in advance by a system administrator, and explicit "hints" regarding future file and/or resource usage which can be provided directly from a client machine.

The predicted workload is then used to develop a plan that where to move content (files) between storage elements and where to direct client accesses to controllers in such a manner that the overall workload is distributed as evenly as possible, resulting in best overall load balance and distributed server performance.

The predicted workload can be used to perform the following specific types of load balancing:

1) Client Network Load Balancing, which includes managing client requests to the extent possible such that the client load presented to the servers in a cluster, and the load present to the network ports within each cluster is evenly balanced.

2) Intra-Cluster Storage Load Balancing, which includes of the movement of data between the disks connected to a controller cluster such that the disk bandwidth loading among each of the drives in an array, and the network bandwidth among network connecting disk arrays to servers is balanced. There are two goals. The first goal is to achieve relatively uniform bandwidth loading for each storage sub-network. The second goal is to achieve relatively uniform bandwidth loading for each individual disk drive. This is accomplished by moving relatively infrequently accessed material to drives with frequently accessed material.

3) Inter-Node Storage Load Balancing, which includes the movement of data between drives connected to different clusters to equalize disk access load between clusters. This is done at a higher cost than Intra-Node Drive Load Balancing, as file data must actually be copied between controllers over the client network.

4) Intra-Node Storage Capacity Balancing, which includes movement of data between the disks connected to a server (or servers in a cluster) to balance disk storage utilization among each of the drives.

5) Inter-Node Storage Capacity Balancing, which includes movement of data between drives connected to different servers to equalize overall disk storage utilization among the different servers. This is done at a higher cost than Intra-Node Drive Capacity Balancing, as file data must actually be copied between controllers over the network.

6) File Replication Load Balancing, which includes load balancing though file replication. This is an extension of Inter-Node Drive Load Balancing. High usage files are replicated so that multiple controller clusters have one or more that one local (read-only) copy. This allows the workload associated with these heavily-accessed files to be distributed across a larger set of disks and servers.

Disks and servers in the DFSS can be "hot swapped" and "hot added" (meaning they can be replaced or added while the DFSS is online and servicing file requests. Disks in a disk array need not match in capacity or throughput. Extra capacity is automatically detected, configured, and used. Data is redistributed in the background (both across servers and across DPGs) to improve system performance. Hot adding of servers allows for increased file operations per second and file system capacity. Hot-added servers are automatically configured and used.

In one embodiment, servers are arranged in clusters that operate as redundant groups (typically as redundant pairs). In normal operation, the servers in a cluster operate in parallel. Each acts as a primary server for a portion of the file system. Each server in a cluster maintains a secondary copy of the metadata and intent log of the other's primary file system metadata and intent log. The intent log tracks differences between metadata stored in memory (e.g., metadata in a metadata cache) and metadata stored on disk. Upon failure of a server in the cluster, the server remaining server (or servers) will pick up the workload of the failed server with no loss of metadata or transactions.

Each server in a high-performance data storage system includes storage controller hardware and storage controller software to manage an array of disk drives. Typically, a large number of disk drives are used in a high performance storage system, and the storage system in turn is accessed by a large number of client machines. This places a large workload on the server hardware and server software. It is therefore important that the servers operate in an efficient manner so that they do not become a bottleneck in the storage system. In one embodiment, a high-performance data path is provided in the server so that data can efficiently be moved between the client machines and disks with a minimum amount of software intervention.

Prior art approaches for server and storage controllers tend to be software intensive. Specifically, a programmable CPU in the server becomes involved in the movement of data between the client and the disks in the disk array. This limits the performance of the storage system because the server CPU becomes a bottleneck. While current approaches may have a certain degree of hardware acceleration, such as XOR parity operations associated with RAID, these minimal acceleration techniques do not adequately offload the server CPU.

In one embodiment, the DFSS uses a server architecture that largely separates the data path from the control message path. Control messages (e.g. file read/write commands from clients) are routed to a host CPU in the server. The host CPU processes the commands, and sets up the network and storage interfaces as required to complete the data transfer operations associated with the commands. The data transfer operations, once scheduled with the network and storage interfaces can be completed without further CPU involvement, thus significantly offloading the host CPU. In one embodiment, a data flow architecture packages instructions with data as it flows between the network interfaces and data cache memories.

The server hardware and software perform the functions of interfacing with client via the network interfaces, servicing client file operation requests, setting up disk read and write operations needed to service these requests, and updating the file metadata as necessary to manage the files stored on disk.

The controller hardware provides a control flow path from the network and storage interfaces to the host CPU. The host CPU is responsible for controlling these interfaces and dealing with the high level protocols necessary for client communications. The host CPU also has a non-volatile metadata cache for storing file system metadata.

A separate path for data flow is provided that connects the network and storage interfaces with a non-volatile data cache. In one embodiment, the separate path for data flow is provided by a data engine. The data path is used for bulk data transfer between the network and storage interfaces. As an example of the data path operation, consider a client file read operation. A client read request is received on one of the network interfaces and is routed to the host CPU. The host CPU validates the request, and determines from the request which data is desired. The request will typically specify a file to be read, and the particular section of data within the file. The host CPU will use file metadata to determine if the data is already present in the data cache memory, or if it must be retrieved from the disks. If the data is in the data cache, the CPU will queue a transfer with the network interface to transfer the data directly from the data cache to the requesting client, with no further CPU intervention required. If the data is not in the data cache, the CPU will queue one or more transfers with the storage interfaces to move the data from disk to the data cache, again without any further CPU intervention. When the data is in the data cache, the CPU will queue a transfer on the network interface to move the data to the requesting client, again with no further CPU intervention.

One aspect of this autonomous operation is that the CPU schedules data movement operations by merely writing an entry onto a network or storage interface queue. The data engine and the network and storage interfaces are connected by busses that include address and data buses. In one embodiment, the network or storage interface does the actual data movement (or sequence of data movements) independently of the CPU by encoding an instruction code in the address bus that connects the data engine to the interface. The instruction code is set up by the host CPU when the transfer is queued, and can specify that data is to be written or read to one or both of the cache memories. In addition, it can specify that an operation such as a parity XOR operation or a data conversion operation be performed on the data while it is in transit. Because instructions are queued with the data transfers, the host CPU can queue hundreds or thousands of instructions in advance with each interface, and all of these can be can be completed asynchronously and autonomously. The data flow architecture described above can also be used as a bridge between different networking protocols.

As described above, the data engine offloads the host CPU direct involvement in the movement of data from the client to the disks and vice-versa. The data engine can be a general purpose processor, digital signal processor, programmable FPGA, other forms of soft or hard programmable logic, or a fully custom ASIC.

The data engine provides the capability for autonomous movement of data between client network interfaces and data cache memory, and between disk network interfaces and cache memory. The server CPU involvement is merely in initializing the desired transfer operations. The data engine supports this autonomy by combining an asynchronous data flow architecture, a high-performance data path than can operate independently of the server CPU data paths, and a data cache memory subsystem. The data engine also implements the parity generation functions required to support a RAID-style data protection scheme.

The data engine is data-flow driven. That is, the instructions for the parallel processing elements are embedded in data packets that are fed to the data engine and to the various functional blocks within the data engine.

In one embodiment, the data engine has four principal interfaces: two data cache RAM interfaces, and two external bus interfaces. Other versions of the data engine can have a different number of interfaces depending on performance goals.

A data path exits between each network interface and each cache interface. In each of these data path is a processing engine that controls data movement between the interfaces as well as operations that can be performed on the data as it moves between the interfaces. These processing engines are data-flow driven as described above.

The processing engine components that are used to perform these functions include an external bus write buffer, a feedback buffer, a cache read buffer, a cache write buffer, a parity engine, and the associated controller logic that controls these elements. The buffer elements are memories of appropriate sizes that smooth the data flow between the external interfaces, the parity engines, and the caches.

The data engine is used to provide a data path between client network interface and storage network interface controllers. The network interface controllers may support Fibre Channel, Ethernet, Infiniband, or other high performance networking protocols. One or more host CPUs schedule network transfers by queuing the data transfer operations on the network interfaces controllers. The network interface controllers then communicate directly with the data engine to perform the data transfer operations, completely autonomously from any additional CPU involvement. The data transfer operations may require only the movement of data, or they may combine the movement of data with other operations that must be performed on the data in transit.

The processing engines in the data engine can perform five principal operations, as well as a variety of support operations. The principal operations are: read from cache; write to cache; XOR write to cache; write to one cache with XOR write to other cache; write to both caches.

The data-flow control structure of the data engine reduces the loading placed on the server CPU. Once data operations are queued, the server CPU does not need to be directly involved in the movement of data, in the operations that are performed on data, or the management of a data transfer.

FIG. 1 shows a general overview of a Distributed File Storage System (DFSS) 100 that operates on a computer network architecture. One or more clients 110 operating on one or more different platforms are connected to a plurality of servers 130, 131, 132, 133 134, 135, by way of a communication fabric 120. In one embodiment, the communication fabric 120 is a Local Area Network (LAN). In one embodiment, the communication fabric 120 is a Wide Area Network (WAN) using a communication protocol such as, for example, Ethernet, Fibre Channel, Asynchronous Transfer Mode (ATM), or other appropriate protocol. The communication fabric 120 provides a way for a client 110 to connect to one or more servers 130–135.

The number of servers included in the DFSS 100 is variable. However, for the purposes of this description, their structure, configuration, and functions are similar enough that the description of one server 130 is to be understood to apply to all 130–135. In the descriptions of other elements of the figure that are similarly duplicated in the DFSS 100, a description of one instance of an element is similarly to be understood to apply to all instances.

The server 130 is connected to a disk array 140 that stores a portion of the files of the distributed file storage system. Together, the server-disk array pair 130,140 can be considered to be one server node 150. The disks in the disk array 140 can be Integrated Drive Electronics (IDE) disks, Fibre Channel disks, Small Computer Systems Interface (SCSI) disks, InfiniBand disks, etc. The present disclosure refers to disks in the disk array 140 by way of example and not by way of limitation. Thus, for example the "disks" can be many types of information storage devices, including, for example, disk drives, tape drives, backup devices, memories, other computers, computer networks, etc.

In one embodiment, one or more server nodes 150, 151 are grouped into a cluster 160 of server nodes. In one embodiment, each server 130 in the cluster 160 is connected not only to its own disk array 140, but also to the disk array(s) 141 of the other server(s) 131 of the cluster 160. Among other advantages conferred by this redundant connection is the provision of alternate server paths for reading a popular file or a file on a busy server node. Additionally, allowing servers 130, 131 to access all disk arrays 140, 141 of a cluster 160 provides the assurance that if one server 130 of a cluster 160 should fail, access to the files on its associated disk array 140 is not lost, but can be provided seamlessly by the other servers 131 of the cluster 160.

In one embodiment, files that are stored on the disk array 140 of one server node 150 are mirrored on the disk array(s) 141 of each server node 151 in the cluster 160. In such an embodiment, if the disk array 140 should become unusable, the associated server 130 will still be able to access copies of its files on the other disk array(s) 141 of the cluster 160.

As shown in FIG. 1, the server 130 is associated with the disk array 140 that can include multiple disk drives of various sizes and capacities. Thus, the DFSS 100 allows for much more flexibility than many conventional multi-disk file storage systems that require strict conformity amongst the disk arrays of the system. Among other advantages conferred by this flexibility is the ability to upgrade portions of the system hardware without having to upgrade all portions uniformly and simultaneously.

In many conventional networked storage systems, a user on a client needs to know and to specify the server that holds a desired file. In the DFSS 100 described in FIG. 1, although the files of the file system can be distributed across a plurality of server nodes, this distribution does not require a user on a client system 110 to know a priori which server has a given file. That is, to a user, it appears as if all files of the system 100 exist on a single server. One advantage of this type of system is that new clusters 160 and/or server nodes 150 can be added to the DFSS 100 while still maintaining the appearance of a single file system.

Figure 2:
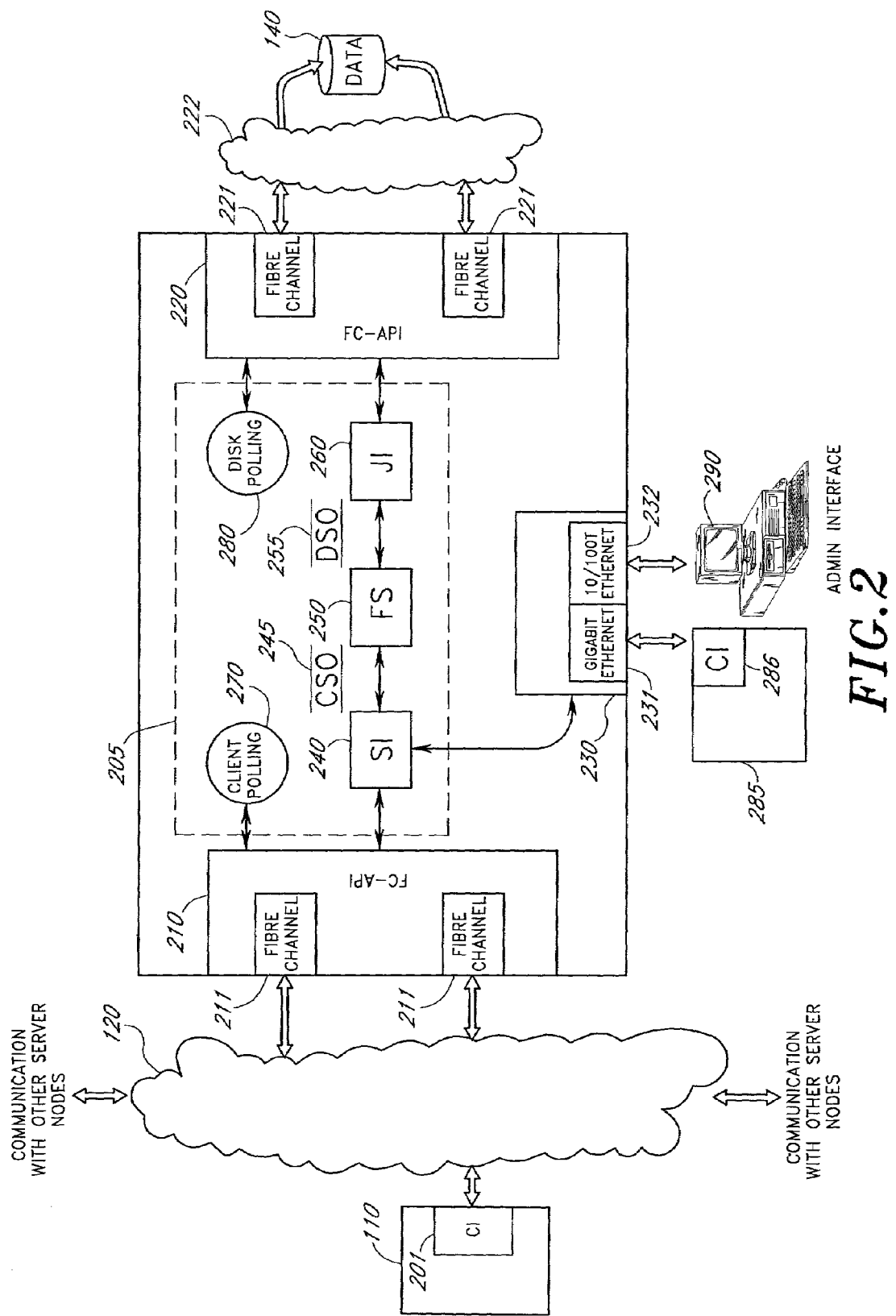
FIG. 2 is a block diagram of a server node.

FIG. 2 is a block diagram showing one embodiment 200 of the server node 150 in the DFSS 100. As in FIG. 1, the server node 150 includes the server 130 and the disk array 140 or other data storage device.

The server 130 includes a server software module 205. The server software module 205 includes server interface (SI) software 240 for handling communications to and from clients 110, file system (FS) software 250 for managing access, storage, and manipulation of the files, and a JBOD (Just a Bunch of Disks) interface (JI) 260 for handling communications with the disk array 140 and with other disk arrays of the cluster 160. Communications between the server interface 240 and the file system 250 take place using a Client Server Object 245. Communications between the file system 250 and the JBOD interface 260 take place using a Disk Service Object 255. In one embodiment, as depicted in FIG. 2, the software of the file system 250 resides principally on the servers 130, 131, while the file data is stored on standard persistent storage on the disk arrays 140, 141 of the DFSS 100.

The server software module 205 also includes a polling module 270 for polling clients 110 of the DFSS 100 and a polling module 280 for polling disk arrays 140 of the DFSS 100.

In the embodiment 200 shown in FIG. 2, the server 130 includes a Fibre Channel Application Programming Interface (FC-API) 210 with two Fibre Channel ports 211 for communicating via the fabric 120 with the client 110 and with other server(s) 151 of the cluster 160. The FC-API 210 also communicates with the server interface 240 and with the client polling module 270 in the server software module 205.

The server 130 includes an FC-API 220 with two Fibre Channel ports 221 for communicating with the disk array 140 and with other disk arrays of its cluster 160. The FC-API 220 may communicate with the disk array 140 via a communication fabric 222, as shown in FIG. 2. The FC-API 220 may also communicate with the disk array 140 directly. The FC-API 220 also communicates with the JBOD interface 260 and with the disk polling module 280 in the server software module 205.

The server 130 includes an Ethernet interface 230 with two Ethernet ports 231, 232 configured to handle Gigabit Ethernet or 10/100T Ethernet. The Ethernet interface 230 communicates with the server interface 240 in the server software module 205. In FIG. 2, the Gigabit Ethernet port 231 communicates with one or more Ethernet clients 285 of the DFSS 100. The Ethernet clients 285 include an installable client interface software component 286 that communicates with the client's operating system and with the Ethernet interface 230 of the server node 150. In FIG. 2, the Ethernet port 232 communicates with an administrative interface system 290.

To improve performance for certain implementations, a small file system software layer may also exist on clients 110, as shown in the embodiment 200 shown in FIG. 2, where the client system 110 includes an installable software component called the Client Interface (CI) 201 that communicates with both the client's operating system and, via the communication fabric 120, with a server node 150 of the DFSS 100.

The functions of the FC-API modules 210, 220 and the Ethernet interface 230 may alternatively be handled by other communication protocols.

Overview of Metadata Structures

Figure 3:
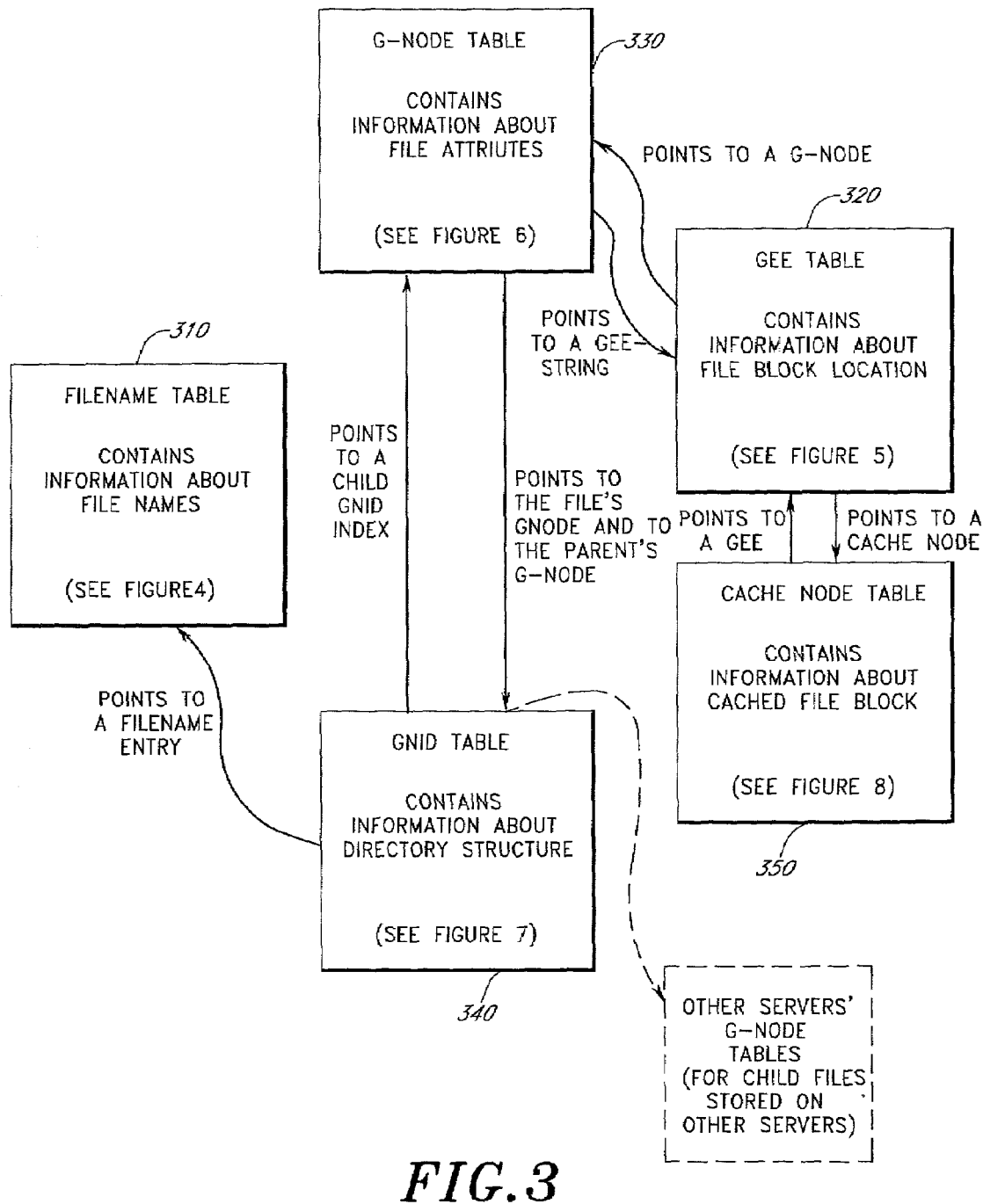
FIG. 3 is a block diagram of five metadata structures and connections between the five metadata structures.

In order to perform normal file system operations, such as, for example, creating and deleting files, allowing clients to read and write files, caching file data, and keeping track of file permissions, while also providing the flexibility mentioned above, a cluster 160 maintains metadata about the files stored on its disk arrays 140, 141. The metadata comprises information about file attributes, file directory structures, physical storage locations of the file data, administrative information regarding the files, as well as other types of information. In various embodiments, the file metadata can be stored in a variety of data structures that are configured in a variety of interconnected configurations, without departing from the spirit of the distributed file system. FIG. 3 is a block diagram that shows one embodiment of a configuration comprising five metadata structures and connections between them. Each of these structures, the data they hold, and how the structures are used are described in greater detail below.

Referring to FIG. 3, a Filename Table 310 includes a collection of filenames for both files stored on the server node 150 as well as files that are children of directories stored on the server node 150.

A G-node Table 330 includes a collection of G-nodes, where each G-node contains data related to attributes of a file. A one-to-one correspondence exists between the G-nodes and files stored on the server node 150.

A Gee Table 320 holds data about the physical locations of the file blocks on the disk array 140. The Gee Table 320 additionally includes pointers to each associated G-node in the G-node Table 330, and each G-node in the G-node Table 330 includes a pointer to an associated portion of the Gee Table 320.

A Gnid Table 340 on the server node 150 includes Gnid-strings that hold data describing the directory structure of that portion of the file system 250 whose directories are stored on the server node 150. A one-to-one correspondence exists between the Gnid-strings and directory files stored on the server node 150. Gnid-strings are collections of Gnids, which hold information about individual files that exist within a given directory. The file system 250 allows files within a directory to be stored on a cluster that is different from the cluster on which the parent directory is stored. Therefore, Gnids within a Gnid-string on the server node 150 can represent files that are stored on clusters other than the current cluster 160.

Each Gnid includes several pointers. A Gnid in the Gnid Table 340 includes a pointer to an associated filename for the file represented by the Gnid. Because the Filename Table 310 includes filenames for both files stored on the server node 150 as well as files that are children of directories stored on the server node 150, all Gnids on the server node 150 point to the Filename Table 310 on the server node 150.

A Gnid in the Gnid Table 340 includes a pointer to its parent directory's G-node in the G-node Table 330, and a parent directory's G-node includes a pointer to the beginning of its associated Gnid-string in the Gnid Table 340.

Each Gnid also includes a pointer to its own G-node. Since a Gnid can represent a file that is stored on another cluster 160 of the file system 250, a pointer to the Gnid's own G-node can point to the G-node Table 330 on another server node of the file system 250.

A Cache Node Table 350 includes the Cache Nodes that hold information about the physical locations of file blocks that have been cached, including a pointer to a cache location as well as a pointer to a non-volatile location of the data on the disk array 140. A pointer to a Cache Node exists in the Gee Table 320 for every associated data block that has been cached. Similarly, a pointer exists in the Cache Node to a location in the Gee Table 320 associated with a disk storage location for an associated data block.

Mirroring of Metadata Structures

To review the description from FIG. 1, in one embodiment, the servers 130, 131 of a cluster 160 are able to access files stored on all the disk array(s) 140, 141 of the cluster 160. In one embodiment, all server nodes 150, 151 of a cluster 160 have copies of the same Filename Table 310, Gee Table 320, G-node Table 330, and Gnid Table 340.

In embodiments where files, as well as metadata, are mirrored across the server nodes 150, 151 of a cluster 160, a different Gee Table 320 exists for each disk array 140, 141 within a cluster 160, since the Gee Table 320 holds information about the physical storage locations of the files on a given disk array, and since the disk arrays 140, 141 within a given cluster 160 are not constrained to being identical in capacity or configuration. In such an embodiment, the servers 130, 131 within the cluster 160 have copies of both the Gee Table 320 for a first disk array 140 and the Gee Table 320 for each additional disk array 141 of the cluster.

In one embodiment, in order to enhance both the security of the metadata and efficient access to the metadata, each server node 150, 151 stores a copy of the Filename Table 310, the G-node Table 330, the Gnid Table 340, and the Gee Table 320 in both non-volatile memory (for security) and in volatile memory (for fast access). Changes made to the volatile versions of the metadata structures 310, 320, 330, 340 are periodically sent to the non-volatile versions for update.

In one embodiment, the server nodes 150, 151 in the cluster 160 do not have access to one another's cache memory. Therefore, unlike the four metadata structures 310, 320, 330, and 340 already described, the Cache Node Table 350 is not replicated across the server nodes 150, 151 of the cluster 160. Instead, the Cache Node Table 350 stored in volatile memory on a first server 130 refers to the file blocks cached on the first the server 130, and the Cache Node Table 350 stored in volatile memory on a second server 131 refers to file blocks cached on the second server 131.

Division of Metadata Ownership

In one embodiment, the metadata structures described in FIGS. 3 are duplicated across the server nodes 150, 151 of the cluster 160, allowing access to a set of shared files and associated metadata to all servers in the cluster 160. All of the server nodes 150, 151 in the cluster 160 can access the files stored within the cluster 160, and all are considered to be "owners" of the files. Various schemes can be employed in order to prevent two or more servers 130, 131 from altering the same file simultaneously. For example, in embodiments where the cluster 160 includes two server nodes 150 and 151, one such scheme is to conceptually divide each of the duplicated metadata structures in half and to assign write privileges (or "primary ownership") for one half of each structure to each server node 150, 151 of the cluster 160. Only the server node 150 that that is primary owner of the metadata for a particular file has write privileges for the file. The other server node(s) 151 of the cluster 160 are known as "secondary owners" of the file, and they are allowed to access the file for read operations.

In a failure situation, when the server 130 determines that its counterpart 131 is not functional, the server 130 can assume primary ownership of all portions of the metadata structures 310, 320, 330, 340 and all associated files owned by the server 131, thus allowing operation of the file system 250 to continue without interruption. In one embodiment, if a server in cluster 160 having more than two servers experiences a failure, then primary ownership of the failed server's files and metadata can be divided amongst the remaining servers of the cluster.

Filename Table

Figure 4:
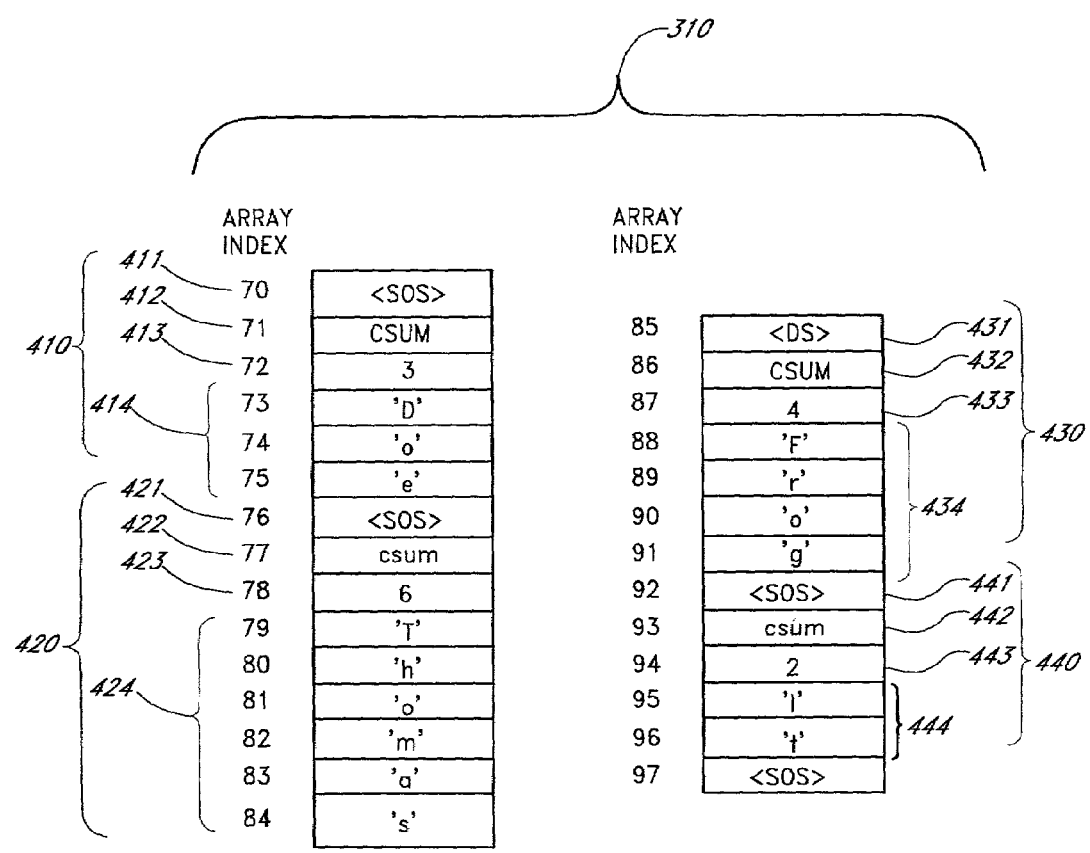
FIG. 4 shows an example portion of a Filename Table.

FIG. 4 shows a sample portion of the Filename Table 310. In one embodiment, the Filename Table 310 on the server 130 contains Filename Entries 410, 420, 430, 440 for files which are either stored in the disk array 140 or are parented by a directory file in the disk array 140. In one embodiment, the Filename Table 310 is stored as an array. In FIG. 4, a 'Start of String' (SOS) marker 411 marks the beginning of the Filename Entry 410, and a character string 414 holds characters of the filename, "Doe." In one embodiment, a checksum 412 for the string 414 is also included in the Filename Entry 410. In one embodiment, a filename length count 413 representing the length of the string 414, shown in FIG. 4 to have a value of "3," is included in the Filename Entry 410. The checksum 412 and the filename length count 413 advantageously allow for an expedited search of the Filename Table 310.

A 'Start of String' (SOS) marker 421 marks the beginning of the Filename Entry 420 with a checksum 422, a filename length count 423 of "6," and a character string 424 holding the filename "Thomas."

A 'Deleted String' (DS) marker 431 marks the beginning of the Filename Entry 430 with a checksum 432, a filename length count 433 of "4," and a character string 434 holding the filename "Frog."

A 'Start of String' (SOS) marker 441 marks the beginning of the Filename Entry 440 with a checksum 442, a filename length count 443 of "2," and a character string 444 holding the filename "It."

Comparing the checksums 412, 422, 432, 442 and the filename length counts 413, 423, 433, 443 of each Filename Entry 410, 420, 430, 440 to those calculated for a desired filename provides a quick way to eliminate most Filename Entries in the Filename Table 310 before having to make a character-by-character comparison of the character strings 414, 424, 434, 444.

Another advantage of including the filename length counts 413, 423, 433, 443 applies when deleting a Filename Entry 410, 420, 430, 440 from the Filename Table 310. Replacing the 'Start of String' (SOS) marker 411, 421, 441 with a 'Deleted String' (DS) marker 431, as in the Filename Entry 430, signals that the corresponding file is no longer stored on the disk array 140, even if the remainder of the Filename Entry 432–434 remains unchanged. The filename length 433 accurately represents the length of the "deleted" string 434, and when a new filename of the same length (or shorter) is to be added to the table 310, the new name and checksum (and filename length count, if necessary) can be added into the slot left by the previous filename.

Gee Table

The file system 250 divides files into one or more file logical blocks for storage. Each file logical block is stored in a cluster of one or more disk logical blocks on the disk array 140. Although the file system 250 retains many of the advantages of a conventional file system implemented on RAID (Redundant Array of Independent Disks), including the distribution of files across multiple disk drives and the use of parity blocks to enhance error checking and error correcting, unlike many RAID systems, the file system 250 does not restrict file logical blocks to one uniform size. File logical blocks of data and parity logical blocks can be the size of any integer multiple of a disk logical block. This variability of file logical block size allows for flexibility in allocating disk space and, thus, for optimized use of system resources.

In the file system 250, the size of a file logical block is described by its integer multiple, called its extent, in disk logical blocks. For example, a file logical block with an extent of 3 is stored in a cluster of 3 disk logical blocks on the disk array 140.

The Gee Table 320 stores metadata describing the disk logical block locations on the disk array 140 for each file logical block of the files.

FIG. 5 shows one embodiment of a Gee Table 320 that is implemented as a flat array. Each indexed row 510–529 of the Gee Table 320 is called a Gee. In FIG. 5, Gees 510–528 relate to a single file that is divided into ten file logical blocks. Such a set of Gees 510–528, which together describe the logical location of a single file on the disk array 140, is known as a Gee-string 500. A Gee-string is made up of one or more Gee-groups. Each Gee-group is a set of contiguous Gees that all relate to a single file. In FIG. 5, the Gee-string 500 includes three Gee-groups, 550, 551, and 552. The Gee 529 relates to a separate file, as will be explained in more detail below.

In one embodiment, the Gees 510–529 include a G-code field 590 and a Data field 591. The G-code field 590 in the Gees 510–529 indicates the type of data that is included in the Data field 591. In FIG. 5, four types of G-codes 590 are depicted: "G-NODE," "DATA," "PARITY," and "LINK."

In one embodiment, the G-code 590 of "G-NODE" indicates that the Gee is a first Gee of a Gee-group. For example, the first Gee of the Gee-group 550 is a G-NODE Gee 510. Similarly, the first Gee of the Gee-groups 551 and 552 are also G-NODE Gees 520, 525.

The Data field 591 of a G-NODE Gee can include a pointer to the file's G-node in the G-node Table 330 and information about whether this is the first (or Root) G-NODE Gee of the file's Gee-string 500. The Data field 591 of a G-NODE Gee can also include information about the extent, or size, of the logical disk block clusters for the file logical blocks of the Gee-group, as will be described in greater detail below.

In FIG. 5, the Data fields 591 of the G-NODE Gees 510, 520, and 525 contain a reference to G-node index "67," indicating that they all relate to the file associated with the G-node at index "67" of the G-node Table 330. That is, they all relate to portions of the same file. The Data field 591 of the Gee 529 refers to the G-node index "43," indicating that it relates to a different file.

Of the G-NODE Gees 510, 520, 525, only the first Gee 510 contains an indication that it is a Root Gee, meaning that it is the first Gee of the Gee-string 500. The Gee 529 is a G-NODE Gee, indicating that it is a first Gee of a Gee-group (the remainder of which is not shown), and the Data field 591 of the Gee 529 also indicates that the Gee 529 is not a Root Gee for its Gee-string.

Following the G-NODE Gee in a Gee-group are Gees representing one or more Distributed Parity Groups (DPGs) 560, 561, 52, 563. A DPG is set of one or more contiguous DATA Gees followed by an associated PARITY Gee. A DATA Gee is a Gee with a G-code 590 of "DATA" that lists disk logical block(s) where a file logical block is stored. For example, in FIG. 5, the Gees 511–513, 515–517, 521–522, and 526–527 are all DATA Gees, and each is associated with one file logical block 592.

A PARITY Gee is a Gee with a G-code 590 of "PARITY." Each PARITY Gee lists disk logical block location(s) for a special type of file logical block that contains redundant parity data used for error checking and error correcting one or more associated file logical blocks. A PARITY Gee is associated with the contiguous DATA Gees that immediately precede the PARITY Gee. A set of contiguous DATA Gees and the PARITY Gee that follows them are known collectively as a Distributed Parity Group 560, 561, 562, 563.

For example, in FIG. 5, the PARITY Gee 514 is associated with the DATA Gees 510–513, and together they form the Distributed Parity Group 560. Similarly, the PARITY Gee 518 is associated with the DATA Gees 515–517, and together they form the Distributed Parity Group 561. The PARITY Gee 523 is associated with the DATA Gees 521–522, which together form the Distributed Parity Group 562, and the PARITY Gee 528 is associated with the DATA Gees 526–527, which together form the Distributed Parity Group 563.

The size of a disk logical block cluster described by a DATA Gee or a PARITY Gee, as measured in number of disk logical blocks, matches the extent listed in the previous G-NODE Gee. In the example of FIG. 5, the G-NODE Gee 510 defines an extent size of 2, and each DATA and PARITY Gee 511–518 of the two Distributed Parity Groups 560, 561 of the Gee-group 550 lists two disk logical block locations. Similarly, G-NODE Gee 520 of the second Gee-group 551 defines an extent size of 3, and each DATA and PARITY Gee 521–523 of the Gee-group 551 lists three disk logical block locations. G-NODE Gee 525 of the third Gee-group 552 defines an extent size of 3, and each DATA and PARITY Gee 526–528 of the Gee-group 552 lists three disk logical block locations.

If a Gee-group is not the last Gee-group in its Gee-string, then a mechanism exists to logically link the last Gee in the Gee-group to the next Gee-group of the Gee-string. LINK Gees 519, 524 have the G-code 590 of "LINK" and a listing in their respective Data fields 591 that provides the index of the next Gee-group of the Gee-string 500. For example, the Gee 519 is the last Gee of Gee-group 550, and its Data field 591 includes the starting index "76" of the next Gee-group 551 of the Gee-string 500. The Gee 524 is the last Gee of Gee-group 551, and its Data field 591 includes the starting index "88" of the next Gee-group 552 of the Gee-string 500. Since the Gee-group 552 does not include a LINK Gee, it is understood that Gee-group 552 is the last Gee-group of the Gee-string 500.

A G-code 590 of "FREE" (not shown in FIG. 5) indicates that the Gee has never yet been allocated and has not been associated with any disk logical location(s) for storing a file logical block. A G-code 590 of "AVAIL" (not shown in FIG. 5) indicates that the Gee has been previously allocated to a cluster of disk logical block(s) for storing a file logical block, but that the Gee is now free to accept a new assignment. Two situations in which a Gee is assigned the G-code of "AVAIL" are: after the deletion of the associated file logical block; and after transfer of the file to another server in order to optimize load balance for the file system 250.

A G-code of "CACHE DATA" indicates that the disk logical block cluster associated with the Gee (which was previously a DATA Gee) has been cached. A G-code of "CACHE PARITY" indicates that the disk logical block cluster associated with this Gee (which was previously a PARITY Gee) has been cached. The CACHE DATA and CACHE PARITY G-codes will be described in greater detail when Cache Nodes and the Cache Node Table are described in connection with FIG. 8A below.

G-Node Table

The G-node Table 330 is a collection of G-nodes, where each G-node includes attribute information relating to one file. Attribute information can include, but is not restricted to: information about physical properties of the file (such as, for example, its size and physical location on disk); information about the file's relationships to other files and systems (such as, for example, permissions associated with the file and server identification numbers for the primary and secondary owners of the file); and information about access patterns associated with the file (such as, for example, time of the last file access and time of the last file modification).

In addition to file attribute information, a G-node provides links to the root Gee and a midpoint Gee of the file's Gee-string in the Gee Table 320. If the file is a directory file, its G-node also contains a pointer to the beginning of the Gnid-string that describes the files contained in the directory, as will be explained with reference to FIG. 7 below.

In one embodiment, the G-node Table 330 is implemented as a flat array.

FIG. 6 shows one embodiment of information that can be included in a G-node 600. A File Attribute-type field 602 designates a file as belonging to a supported file type. For example, in one embodiment, NFNON indicates that the G-node is not currently associated with a file, NFREG indicates that the associated file is a regular file, NFDIR indicates that the associated file is a directory, NFLINK indicates that an associated file is a symbolic link that points to another file.

A File Attribute-mode field 604 gives information regarding access permissions for the file.

A File Attribute-links field 606 designates the number of directory entries for a file in the file system 250. This number can be greater than one if the file is the child of more than one directory, or if the file is known by different names within the same directory.

A File Attribute-uid field 608 designates a user ID for a file's user/owner.

A File Attribute-gid field 610 designates a group ID of a file's user/owner.

A File Attribute-size field 612 designates a size in bytes of a given file.

A File Attribute-used field 614 designates an amount of disk space used by a file.

A File Attribute-fileId field 620 designates a file ID.

A File Attribute-atime field 622 designates the time of the last access to the file.

A File Attribute-mtime field 624 designates the time of the last modification to the file.

A File Attribute-ctime field 626 designates the time of the last modification to a G-node (excluding updates to the atime field 622 and to the mtime field 624).

If a file is a directory file rather than a data file, then its Child Gnid Index field 628 is an index for the oldest child in an associated Gnid-string (to be described in greater detail with reference to FIG. 7 below); otherwise, this field is not used.

A Gee Index-Last Used field 630 and a Gee Offset-Last Used field 631 together designate a location of a most recently accessed Gee 510 for a given file. These attributes can be used to expedite sequential reading of blocks of a file.

A Gee Index-Midpoint field 632 and a Gee Offset-Midpoint field 633 together point to a middle Gee 510 of the Gee-string 500. Searching for a Gee for a given file block can be expedited using these two fields in the following way: if a desired block number is greater than the block number of the midpoint Gee, then sequential searching can begin at the midpoint of the Gee-string 500 rather than at its beginning.

A Gee Index-Tail field 634 and a Gee Offset-Tail field 635 together point to the last Gee 528 of the Gee-string 500. New data can easily be appended to the end of a file using the pointers 634 and 635.

A Gee Index-Root field 636 is an index of the root Gee 510 of a Gee-string for an associated file.

A G-node Status field 638 indicates whether the G-node is being used or is free for allocation.

A Quick Shot Status field 640 and a Quick Shot Link field 642 are used when a "snapshot" of the file system 250 is taken to allow for online updates and/or verification of the system that does not interrupt client access to the files. During a "snapshot," copies of some portions of the system are made in order to keep a record of the system's state at one point in time, without interfering with the operation of the system. In some embodiments, more than one Quickshot can be maintained at a given time. The Quick Shot Status field 640 indicates whether the G-node was in use at the time of the "snapshot" and, therefore, if it has been included in the "snapshot." If the G-node has been included in the "snapshot," the Quick Shot Link field 642 provides a link to the newly allocated copy of the G-node.

In one embodiment, a bit-mask is associated with each element with the file system 250 identifying any of a number of Quickshot instances to which the element belongs. When a Quickshot is requested, a task can set the bit for every element, holding the file system at bay for a minimum amount of time. Thus, capturing the state of a file system comprises identifying elements in the file system as being protected, rather than actually copying any elements at the time of the Quickshot.

In one embodiment, the file system uses a copy-on-write mechanism so that data is not overwritten; new blocks are used for new data, and the metadata is updated to point to the new data. Thus, a minimum of overhead is required to maintain a Quickshot. If a block is being written and the file system element being modified has a bit set indicating that it is protected by a Quickshot, the metadata is copied to provide a Quickshot version of the metadata, which is distinct from the main operating system. Then, the write operation continues normally.

Gnid Table

Files in the file system 250 are distributed across a plurality of server nodes 150 while still appearing to clients 110 as a single file system. According to different embodiments, files can be distributed in a variety of ways. Files can be distributed randomly, or according to a fixed distribution algorithm, or in a manner that enhances load balancing across the system, or in other ways.

In one embodiment, the files of a given directory need not be stored physically within the same cluster as the cluster that stores the directory file itself. Nor does one large table or other data structure exist which contains all directory structure information for the entire file system 250. Instead, directory structure information is distributed throughout the file system 250, and each server node 150 is responsible for storing information about the directories that it stores and about the child files of those directories.

In one embodiment, server nodes of the DFSS 100 hold directory structure information for only the directory files that are stored on the server node and for the child files of those directories, that is, the files one level down from the parent directory. In another embodiment, server nodes of the DFSS 100 hold directory structure information for each directory file stored on the server node and for files from a specified number of additional levels below the parent directory in the file system's directory structure.

In one embodiment, an exception to the division of responsibility described above is made for the directory structure information for a "root" directory of the file system 250. The "root" directory is a directory that contains every directory as a sub-directory and, thus, every file in the file system 250. In this case, every server in the file system 250 can have a copy of the directory structure information for the "root" directory as well as for its own directories, so that a search for any file of unknown location can be initiated at the "root" directory level by any server of the file system 250. In another embodiment, the directory structure information for the "root" directory is stored only in the cluster that stores the "root" directory, and other clusters include only a pointer to the "root" directory.

The Gnid Table 340 on the server node 150 defines a structure for directory files that reside on the server node 150. The Gnid Table 340 comprises Gnid-strings, which, in one embodiment, are linked lists implemented within a flat array. In one embodiment, a Gnid-string exists for each directory file on the server node 150. Individual elements of a Gnid-string are called Gnids, and a Gnid represents a child file of a given parent directory.

Figure 7:
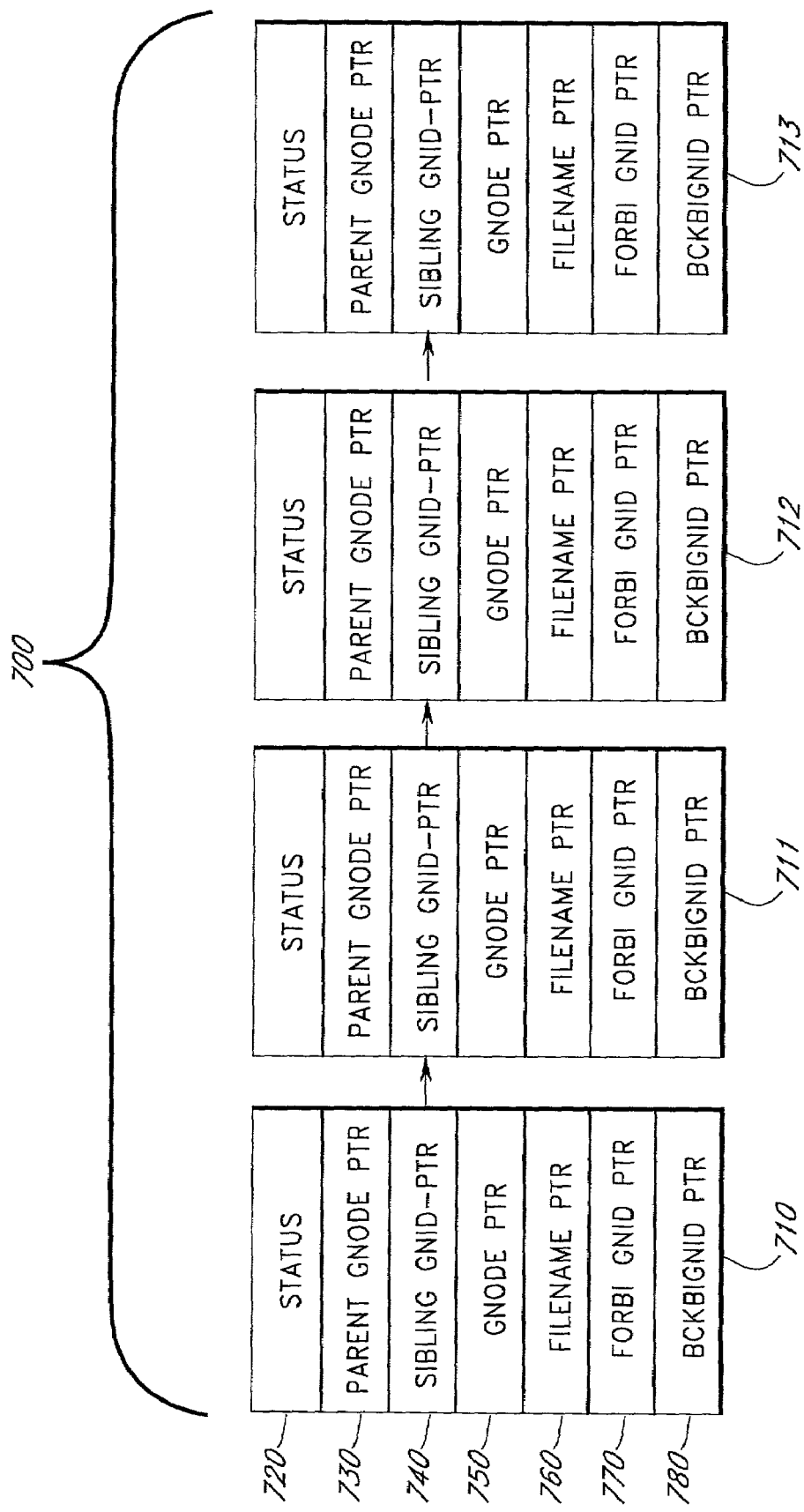
FIG. 7 shows one embodiment of the structure of a Gnid-string.

FIG. 7 shows the structure of one embodiment of a Gnid-string 700. In this embodiment, the Gnid-string 700 for a directory file is a linked list of Gnids 710–713, where each Gnid represents one file in the directory. In one embodiment, in order to expedite searching the Gnid-string 700 for a given Gnid, the Gnids are kept in ascending order of the checksums 412, 422, 442 of the files' filenames 410, 420, 440, such that the Gnid with the smallest checksum is first in the Gnid-string 700. When a new file is added to a directory, a Gnid for the newly added file is inserted into the appropriate location in the Gnid-string 700. Search algorithms that increase the efficiency of a search can exploit this sorted arrangement of Gnids 710–713 within a Gnid-string 700.

Since Gnids share a common structure, a description of one Gnid 710 is to be understood to describe the structure of all other Gnids 711–713 as well.

The Gnid 710 includes, but is not restricted to, seven fields 720, 730, 740, 750, 760, 770, and 780. A Status field 720 indicates whether the Gnid 710 is a first Gnid (GNID_OLDEST) in the Gnid-string 700, a last Gnid (GNID_YOUNGEST) in the Gnid-string 700, a Gnid that is neither first nor last (GNID_SIBLING) in the Gnid-string 700, or a Gnid that is not currently in use (GNID_FREE).

A Parent G-node Ptr field 730 is a pointer to the G-node for the file's parent directory in the G-node Table 330.

A Sibling Gnid Ptr field 740 is a pointer to the next Gnid 711 on the Gnid-string 700. In the embodiment described above, the Sibling Gnid Ptr field 740 points to the Gnid within the Gnid-string 700 that has the next largest checksum 412, 422, 442 value. A NULL value for the Sibling Gnid Ptr field 740 indicates that the Gnid is the last Gnid of the Gnid-string 700.

A G-node Ptr field 750 is a pointer to the file's G-node 600, indicating both the server node that is primary owner of the file and the file's index into the G-node Table 330 on that server node.

A Filename Ptr field 760 is a pointer to the file's Filename Entry in the Filename Table 310.

A ForBiGnid Ptr field 770 is a pointer used for skipping ahead in the Gnid-string 700, and a BckBiGnid Ptr field 780 is a pointer for skipping backward in the Gnid-string 700. In one embodiment, the fields 770 and 780 can be used to link the Gnids into a binary tree structure, or one of its variants, also based on checksum size, thus allowing for fast searching of the Gnid-string 700.

Cache Node Table

The Cache Node Table 350 stores metadata regarding which data blocks are currently cached as well as which data blocks have been most recently accessed. The Cache Node Table 350 is integrated with the file system 250 by way of a special type of Gee 510 in the Gee Table 320. When a data block is cached, a copy of its associated DATA Gee 511–513, 515–517, 521–522, 526–527, which describes the location of the data on the disk array 140, is sent to the Cache Node Table 350, where it is held until the associated data is released from the cache. Meanwhile, the DATA Gee 511–513, 515–517, 521–522, 526–527 in the Gee Table 320 is modified to become a CACHE DATA Gee; its G-Code 590 is changed from DATA to CACHE DATA, and instead of listing a data block's location on disk 140, the Data field 591 of the Gee now indicates a location in the Cache Node Table 350 where a copy of the original DATA Gee 511–513, 515–517, 521–522, 526–527 was sent and where information about the data block's current location in cache can be found.

In one embodiment, the Cache Node Table 350 is implemented as a list of fixed length Cache Nodes, where a Cache Node is associated with each Gee 511–513, 515–517, 521–522, 526–527 whose data has been cached. The structure of one embodiment of a Cache Node 800 is described in FIG. 8A.

Figure 8A:
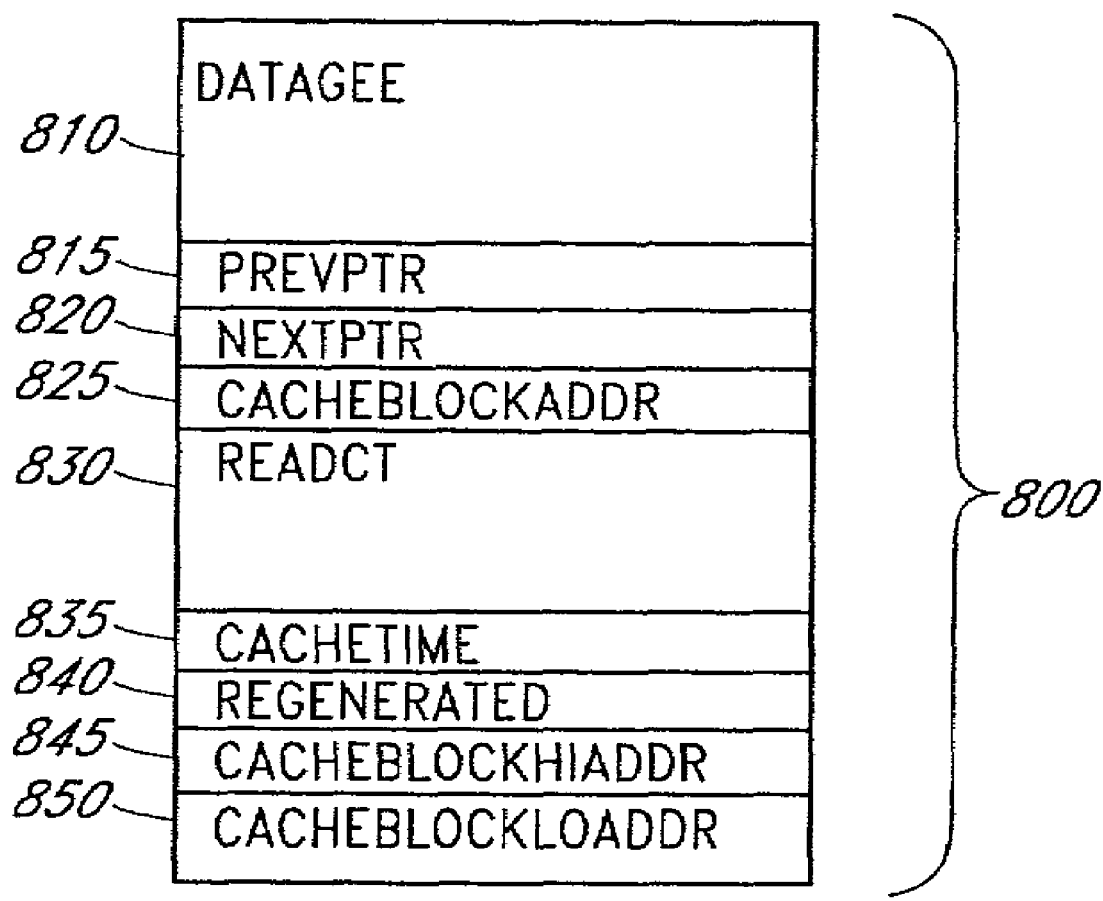
FIG. 8A shows one embodiment of the structure of a Cache Node.

Referring to FIG. 8A, the Cache Node 800 is shown to include nine fields. A Data Gee field 810 is a copy of the DATA Gee 511–513, 515–517, 521–522, 526–527 from the Gee Table 320 that allows disk location information to be copied back into the Gee Table 320 when the associated data block is released from cache. A PrevPtr field 815 holds a pointer to the previous Cache Node in the Cache Node Table 350. A NextPtr field 820 holds a pointer to the next Cache Node in the Cache Node Table 350. In one embodiment, the Cache Node Table 350 is implemented as a flat array, in which case the PrevPtr 815 and NextPtr 820 fields can hold indices of a previous and a next item in the table. A CacheBlockAddr field 825 holds a pointer to a location in cache where the associated data has been cached. A ReadCt field 830 is a counter of the number of clients currently reading the associated data block. A CacheTime field 835 holds a time that the associated cache contents were last updated. A Regenerated field 840 holds a flag indicating that the associated cache contents have been regenerated. A CacheBlockHiAddr field 845 and a CacheBlockLoAddr field 850 hold a "high water mark" and "low water mark" of the data in a cache block. These "water marks" can be used to demarcate a range of bytes within a cache block so that if a write operation has been performed on a subset of a cache block's bytes, then when the new data is being written to disk, it is possible to copy only relevant or necessary bytes to the disk.

Figure 8B:
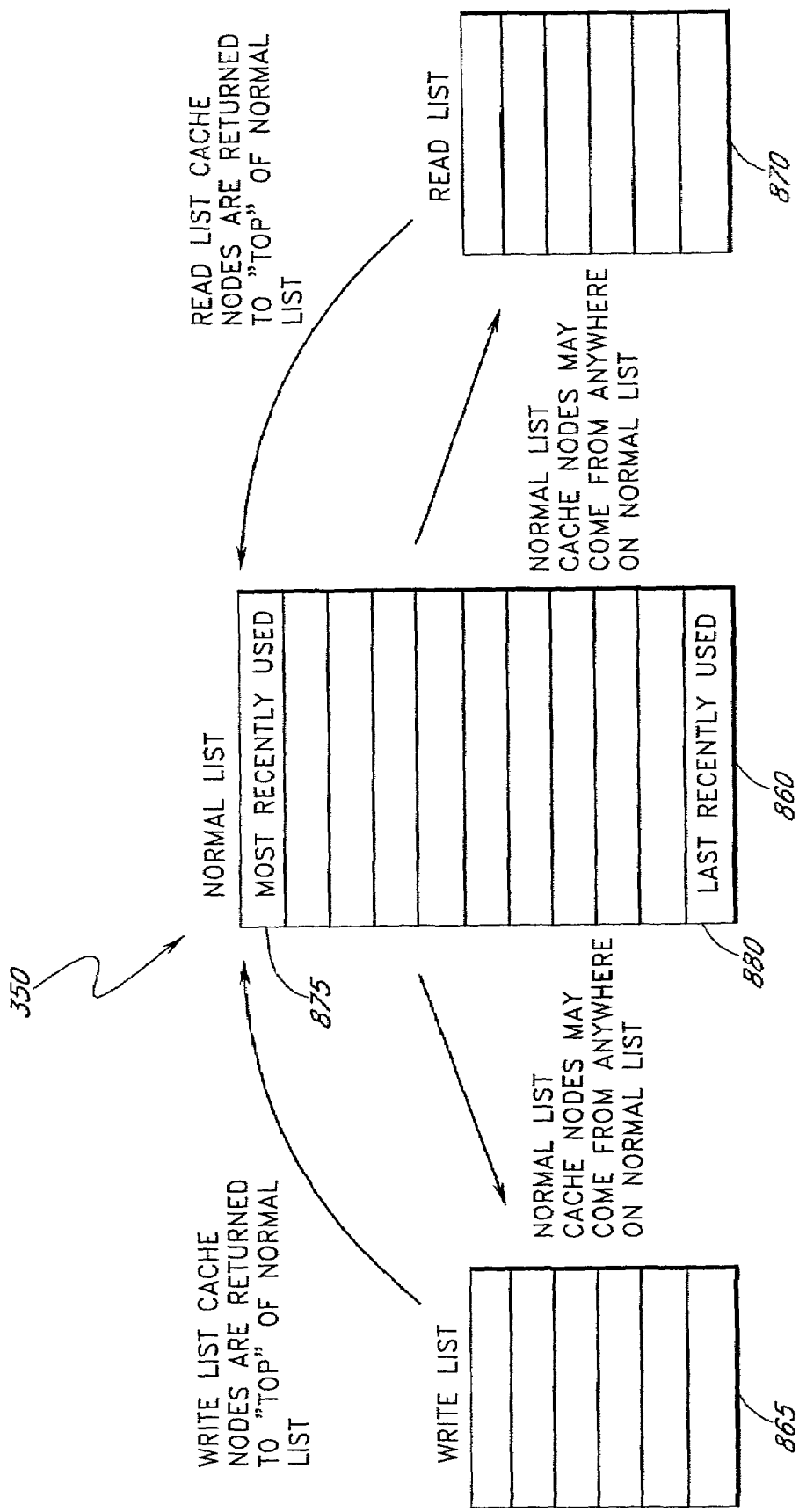
FIG. 8B shows a conceptual division of a Cache Node Table into three lists.

In one embodiment, the Cache Node Table 350 is conceptually divided into three lists, as depicted in FIG. 8B. A Normal List 860 includes all the Cache Nodes 800 in the Cache Node Table 350 which are associated with cached data that is not currently in use. A Write List 865 holds the Cache Nodes 800 of data blocks that have been modified and that are waiting to be written to disk. A Read List 870 holds the Cache Nodes 800 of data blocks that are currently being read by one or more clients.

When existing cached data is needed for a write or a read operation, the associated Cache Node 800 can be "removed" from the Normal List 860 and "linked" to the Write List 865 or the Read List 870, as appropriate. The Cache Nodes 800 in each of the lists 860, 865, 870 can be linked by using the PrevPtr 815 and NextPtr 820 fields. The Cache Nodes 800 of data blocks that are being written to can be "moved" from the Normal List 860 to the Write List 865 until an associated data block stored on the disk array 140 is updated. The Cache Nodes 800 of data blocks that are being read can be similarly "moved" to the Read list by resetting the links of the PrevPtr 815 and NextPtr 820 fields.

The Cache Nodes 800 of data blocks that are being read can additionally have their ReadCt field 830 incremented, so that a count may be kept of the number of clients currently reading a given data block. If additional clients simultaneously read the same file, the server 130 increments the Cache Node's ReadCt field 830 and the Cache Node 800 can stay in the Read List 870. As each client finishes reading, the ReadCt 830 is appropriately decremented. When all clients have finished reading the file block and the ReadCt field 830 has been decremented back to a starting value, such as 0, then the Cache Node 800 is returned to the Normal List 860.

In one embodiment, the server 130 that wishes to access an existing Cache Node 800 for a read or a write operation can "take" the desired Cache Node 800 from any position in the Normal List 860, as needed. The Cache Nodes 800 from the Write List 865 whose associated data have already been written to disk are returned to a "top" position 875 of the Normal List 860. Similarly, when no clients are currently reading the cached data associated with a given the Cache Node 800 on the Read List 870, the Cache Node 800 is returned to the "top" position 875 of the Normal List 860. In this way, a most recently accessed Cache Node 800 amongst the Cache Nodes 800 on the Normal List 860 will be at the "top" position 875, and a least recently accessed the Cache Node 800 will be at a "bottom" position 880.

In one embodiment, if space in the cache is needed for a new data block when all of the Cache Nodes 800 have been assigned, then the Cache Node 800 in the "bottom" position 880 is selected to be replaced. To do so, the cached data associated with the "bottom" Cache Node 880 can be written to a disk location specified in the DataGee field 810 of the "bottom" Cache Node 880, and the DataGee 810 from the "bottom" Cache Node 880 is returned to its location in the Gee Table 320. The "bottom" Cache Node 880 can then be overwritten by data for a new data block.

In one embodiment, the server nodes 150, 151 in the cluster 160 do not have access to one another's cache memory. Therefore, unlike the metadata structures described in FIGS. 4–7, the Cache Node Table 350 is not replicated across the servers 130, 131 of the cluster 160.

Lock Nodes and Refresh Nodes

In addition to the metadata structures described above in connection with FIGS. 3–8, other metadata structures can be used to enhance the security and the efficiency of the file system 250. Two metadata structures, a Lock Node Table and a Refresh Node Table, assist with the management of "shares" and "locks" placed on the files of the server node 150. A share or a lock represents a client's request to limit access by other clients to a given file or a portion of a file. Depending on its settings, as will be described in greater detail below, a share or a lock prevents other client processes from obtaining or changing the file, or some portion of the file, while the share or lock is in force. When a client requests a share or a lock, it can either be granted, or, if it conflicts with a previously granted share or lock, it can be given a "pending" status until the original share or lock is completed.

Information about current shares and locks placed on a server node's files is stored in a Lock Node Table. A Lock Node Table includes Lock Strings, where each Lock String describes the current and pending shares and locks for a given file.

Figure 9:
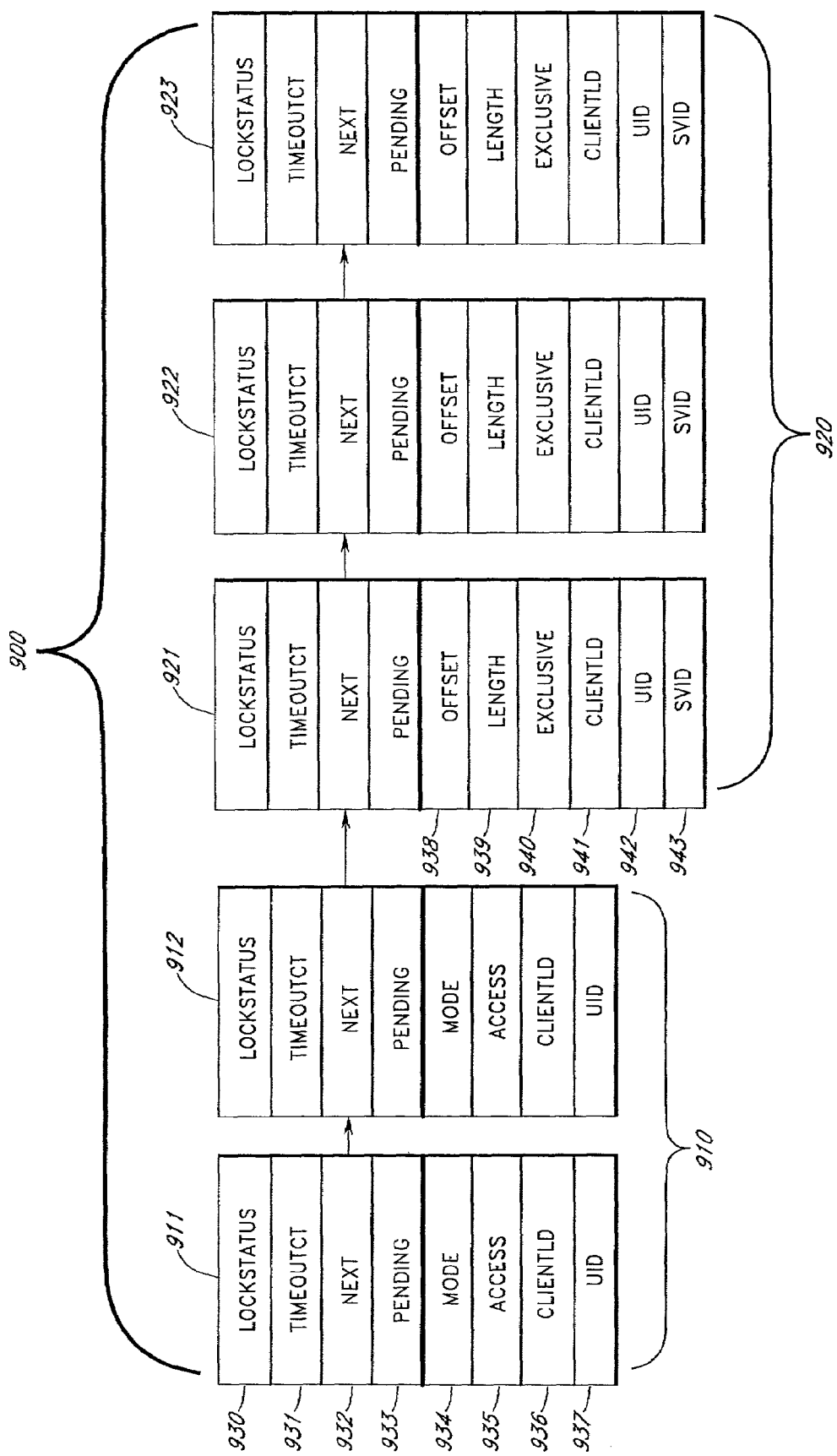
FIG. 9 shows a sample portion of a lock string.

FIG. 9 shows the structure of one embodiment of a Lock String 900. The Lock String 900 includes five nodes 911, 912, 921, 922, and 923. The first two nodes 911 and 912 are Share Nodes 910. The next three nodes 921–923 are Lock Nodes 920. As shown in FIG. 9, in one embodiment, Share Nodes 910 precede Lock Nodes 920 in the Lock String 900.

The Share Nodes 910 have eight fields 930–937, and the Lock Nodes 920 have ten fields 930–933 and 938–943. In FIG. 9, the first four fields of both the Share Nodes 910 and the Lock Nodes 920 are the same, and as such, a description of one shall be understood to apply to both Share Nodes and Lock Nodes.

A lockStatus field 930 indicates whether the node is of type SHARE or LOCK, or if it is currently an unused FREE node. A SHARE node represents a current or pending share request. A share applies to an entire file, and, if granted, it specifies the read and write permissions for both a requesting client and for all other clients in the system. A LOCK node represents a current or pending lock request. A lock applies to a specified byte range within a file, and, if granted, it guarantees that no other client process will be able to access the same range to write, read or read/write, depending on the values in the other fields, while the lock is in effect.

A timeoutCt field 931 helps to ensure that locks and shares are not inadvertently left in effect past their intended time, due to error, failure of a requesting client process, or other reason. Locks automatically "time out" after a given length of time unless they are "refreshed" periodically.

A next field 932 points to the next node in the Lock String 900. A pending field 933 indicates whether the lock or share represented by the node is active or pending.

The fields 934–937 of FIG. 9 contain additional information useful to the Share Nodes 910. An access field 935 indicates the kind of access to the file that the client desires. In one embodiment, the access field 935 may take on one of four possible values: 0 indicates that no access to the file is required; 1 indicates that read only access is required; 2 indicates that only write access is required; and 3 indicates that read and write access to the file are both required.

A mode field 934 indicates the level of access to the file that another client process will be permitted while the share is in effect. In one embodiment, the mode field 934 can take on one of four possible values: 0 indicates that all access by other client processes is permitted; 1 indicates that access to read the file is denied to other client processes; 2 indicates that access to write to the file is denied to other client processes; and 3 indicates that both read and write access are denied to other client processes.

A clientID field 936 identifies the client that requested the share. A uid field 937 identifies the user on the client that has requested the share or lock.

Fields 938–943 of FIG. 9 contain additional information useful to Lock Nodes 920. An offset field 938 indicates the starting point of the byte range within the file where the lock is in effect. A length field 939 indicates the length of the segment (beginning at the offset point) that is affected by the lock. In one embodiment, Lock Nodes 920 are kept ordered within the Lock String 900 according to their offset field 938.

An exclusive field 940 indicates whether the lock is exclusive or non-exclusive. An exclusive lock, sometimes called a write lock, is used to guarantee that the requesting process is the only process with access to that part of the file for either reading or writing. A non-exclusive lock, often called a read lock, is used to guarantee that no one else may write to the byte range while the requesting the process is using it, although reading the file is permitted to other clients.

A clientID field 941 identifies the client that requested the lock. A uid field 942 identifies the user on the client that is requesting the lock. A svid field 943 identifies the process that is requesting the lock.

In one embodiment, a Refresh Node Table is used to detect clients who hold locks or shares on files and who are no longer in communication with the DFSS 100. A Refresh Node is created for each client that registers a lock or share. FIGS. 10 and 11 depict examples of how Refresh Nodes can be configured as a binary tree and as a doubly-linked list, respectively. Based on the task at hand and on the links used for traversal, both structures can exist simultaneously for the same set of Refresh Nodes, as will be explained in greater detail below.

Referring to FIG. 10, six Refresh Nodes 1000, 1010, 1020, 1030, 1040, and 1050 are shown configured as a binary tree. The structure of each Refresh Node is the same, and it is to be understood that a detailed description of one Refresh Node 1000 applies also to the other Refresh Nodes 1010, 1020, 1030, 1040 of FIG. 10. In one embodiment, the Refresh Node 1000 includes six fields. A clientID field 1001 identifies a client who has registered at least one current lock or share. A counter field 1002 maintains a counter that, in one embodiment, is originally set to a given start value and is periodically decremented until a "refresh" command comes from the client to request that the counter be returned to its full original value. If the counter field 1002 is allowed to decrement to a specified minimum value before a "refresh" command is received from the identified client 1001, then all locks and shares associated with the client 1001 are considered to have "timed out," and they are removed from their respective Lock Strings 900.

In one embodiment, Refresh Nodes are allocated from a flat array of Refresh Nodes. The Refresh Nodes can be linked and accessed in a variety of ways, depending on the task at hand, with the help of pointer fields located in each node. For example, when a "refresh" command arrives from the client 110, it is advantageous to be able to quickly locate the Refresh Node 1000 with the associated clientID field 1001 in order to reset its counter field 1002. A binary tree structure, as shown in the example of FIG. 10, can allow for efficient location of the Refresh Node 1000 with the given clientID field 1001 value if the nodes of the tree are organized based on the clientID field 1001 values. In such a case, a left link field 1003 (ltLink) and a right link field 1004 (rtLink), pointing to the Refresh Node's left and right child, respectively, provide links for traversal of the tree using conventional algorithms for traversing a binary tree.

In one embodiment, unused Refresh Nodes 1100, 1110, 1120, 1130 in the flat array are kept in a doubly-linked Free List, such as the one depicted in FIG. 11, for ease of allocation and de-allocation. In one embodiment, used Refresh Nodes are kept in a doubly-linked list, called a Used List. With this structure, decrementing the counter field 1002 of each Refresh Node that is currently in use can be carried out efficiently. In FIG. 11, a stackNext field 1105 and a stackPrev field 1106 of the Refresh Node 110 together allow for doubly-linked traversal of the Refresh Nodes of the Free List and the Used List. When a new Refresh Node is needed, it can be removed from the Free List and linked to both the Used List and the binary tree by the appropriate setting of the link fields 1003, 1004, 1105, and 1106.

Intent Log

In one embodiment, the Filename Table 310, the G-node Table 330, the Gee Table 320 and the Gnid Table 340 are cached as well as being stored on the disk array 140. In one embodiment, when the server 130 changes a portion of the metadata in cache, an entry is made into an Intent Log in non-volatile memory, such as flash memory or battery-backed RAM. The Intent Log Entry documents the intention to update both the version of the metadata stored on the disk array 140 and any mirrored version(s) of the metadata on other server nodes 151 of the cluster 160. The Intent Log provides protection against inconsistencies resulting from a power loss before or during an update.

The following is a list of steps that show the general use of the Intent Log:

1. Cached metadata is updated at the time of the original change.
2. An intention to update the disk version of the metadata is put into the Intent Log.
3. A copy of the intention is transmitted to other server nodes of the cluster.
4. The intention to write metadata to disk on the first server node is executed.
5. The intention to write metadata to disk on the other server nodes is executed.
6. The Intent Log Entry on the first server is deleted.
7. Notice of the first server's Intent Log Entry is sent to the other server nodes.

Figure 12:
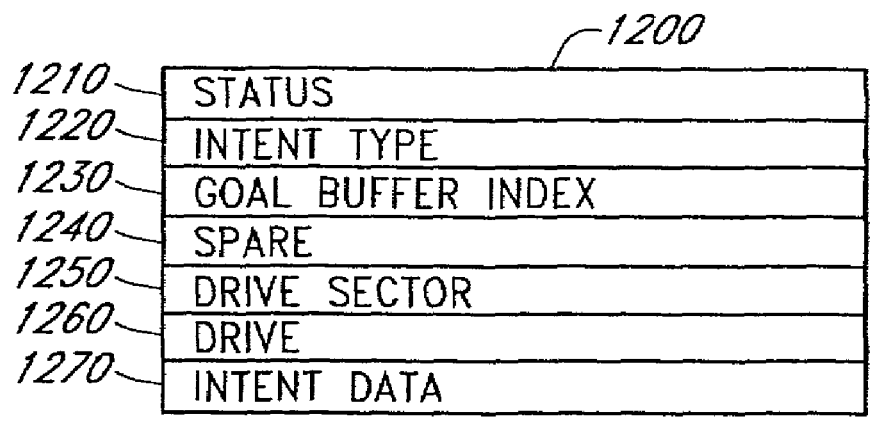
FIG. 12 shows one embodiment of the structure of an Intent Log Entry.

FIG. 12 shows the structure of an Intent Log Entry 1200. In one embodiment, the Entry 1200 includes seven fields. A status field 1210 designates whether the intention is FREE, WAITING, or ACTIVE. An intentType field 1220 designates the type of metadata that is to be updated. For example, the update may apply to a G-node, a Gnid, a Gee, a Filename Entry, or to a file's last access time (aTime). A goalBuffer-Index field 1230 points to an entry in a Goal Buffer that is used to verify the update. Field 1240 is a spare field that helps align the fields to a 64 bit boundary. A driveSector field 1250 and a drive field 1260 identify the location on disk where the update is to be made. An intentData field 1270 holds the data of the update.

File Handle

A file handle is provided to clients by the DFSS 100 for use when requesting access to a file. Each file handle uniquely identifies one file. The DFSS 100 treats both normal data files and directories as files, and provides file handles for both. In the description that follows, the term "file" may apply to either a data file or a directory file, unless specifically limited in the text.

Figure 13:
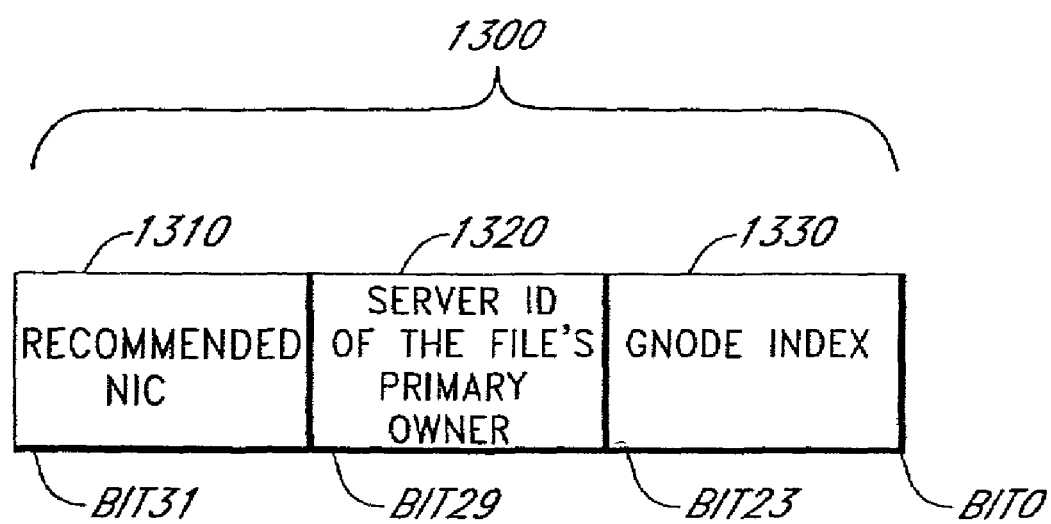
FIG. 13 shows one embodiment of the structure of a file handle.

FIG. 13 shows the structure of one embodiment of a file handle 1300 as a 32-bit number with three fields. A Recommended NIC field 1310 indicates which of a server's Network Interface Connections (NICs) is recommended for accessing the file associated with the file handle 1300. Fibre Channel typically provides two ports per server; accordingly, in one embodiment, the Recommended NIC field 1310 is one bit in size.

A ServerID field 1320 identifies, by means of a server identification number (ServerID), the primary owner of the associated file. The inclusion of the file owner's ServerID 1320 in the file handle 1300 enables a user on the client 110 to access a file in the distributed file system 250 without needing to knowing explicitly which server node is holding the desired file. Using the file handle 1300 to request a file from the file system software 250 allows the file system software 250 to direct the request to the appropriate server. By contrast, conventional UNIX file handles do not include information regarding the server storing a file, and they are therefore not able to accommodate the level of transparent file access provided in the file system software 250.

In one embodiment, clusters 160 include only two server nodes 150, 151, and the ServerID of the file's secondary owner can be obtained by "flipping" the least significant bit of the field 1320. This ability is useful when the primary owner 150 is very busy and must issue a "retry later" response to a client's request to read a file. In return, the client 110 can temporarily change the ServerID in the file's file handle 1300 and re-send the read request to the file's secondary owner 151. Similar accommodations can be made for clusters of more than two server nodes.

A G-node Index field 1330 provides an index into the file's G-node in the G-node Table 330 on the server identified in the ServerID field 1320.

In one embodiment, the file handle for a given file does not change unless the file is moved to another server node or unless its G-node location is changed. Thus, the file handle is relatively persistent over time, and clients can advantageously store the file handles of previously accessed files for use in subsequent accesses.

File Handle Look-Up

In order to access a desired file, the client 110 sends the file's file handle 1300 and a request for file access to the file system 250. As was illustrated in the embodiment shown in FIG. 13, the file handle 1300 of a given file comprises information to identify the server that stores the file and the location of the file's G-node 600 in the G-node Table 330. With the information found in the G-node 600, as described in the example of FIG. 6, the desired file can be located and accessed.

The file handle 1300 for a given file remains relatively static over time, and, typically, the client 110 stores the file handles 1300 of files that it has already accessed for use in subsequent access requests. If the client 110 does not have a desired file's file handle 1300, the client 110 can request a file handle look-up from the file system 250 to determine the needed file handle 1300.

In one embodiment of a file handle look-up process, the DFSS 100 accepts the file handle 1300 of a parent directory along with the filename of a desired child file, and the DFSS 100 returns the file handle 1300 for the desired child file. If the client 110 does not know the file handle 1300 for the desired file's parent directory, then the client 110 can use the file handle 1300 for any directory along the pathname of the desired file and can request a file handle look-up for the next component on the desired pathname. The client 110 can then iteratively request a file handle look-up for each next component of the pathname, until the desired file's file handle 1300 is returned.

For example, if the client 110 desires the file handle 1300 for a file whose pathname is "root/WorkFiles/PatentApps/DesiredFile" and if the client 110 has the file handle 1300 for the parent "Patent Apps" directory, then the client 110 can send the look-up request with the "PatentApps" file handle 1300 to get the "DesiredFile" file handle 1300. If the client initially has no file handle 1300 for the parent "PatentApps" directory, but does have the file handle 1300 for the "WorkFiles" directory, then the client 110 can send a first look-up request with the known "WorkFiles" file handle 1300 together with the filename for the "PatentApps" directory. The DFSS 100 returns the file handle for the "PatentApps" directory. Since the client 110 still does not have the needed "DesiredFile" file handle 1300, the client 110 can send a second file handle look-up request, this time using the newly received "PatentApps" file handle and the "DesiredFile" filename. In response, the file system 250 returns the "DesiredFile" file handle 1300. In this way, beginning with the file handle 1300 for any file along the pathname of a desired file, the file handle 1300 for the desired file can eventually be ascertained.

In one embodiment, when the client 110 first accesses the file system 250, the client 110 is provided with one file handle 1300, namely the file handle for a "root" directory. The "root" directory is the directory that contains all other directories, and is therefore the first component on the pathname of every file in the system. Thus, if need be, the client 110 can begin the look-up process for any file's file handle 1300 with a look-up request that comprises the "root" file handle and the filename of the next component of the desired file's pathname. The final file handle returned will provide the client with the information needed to accurately locate the desired file.

Figure 14A:
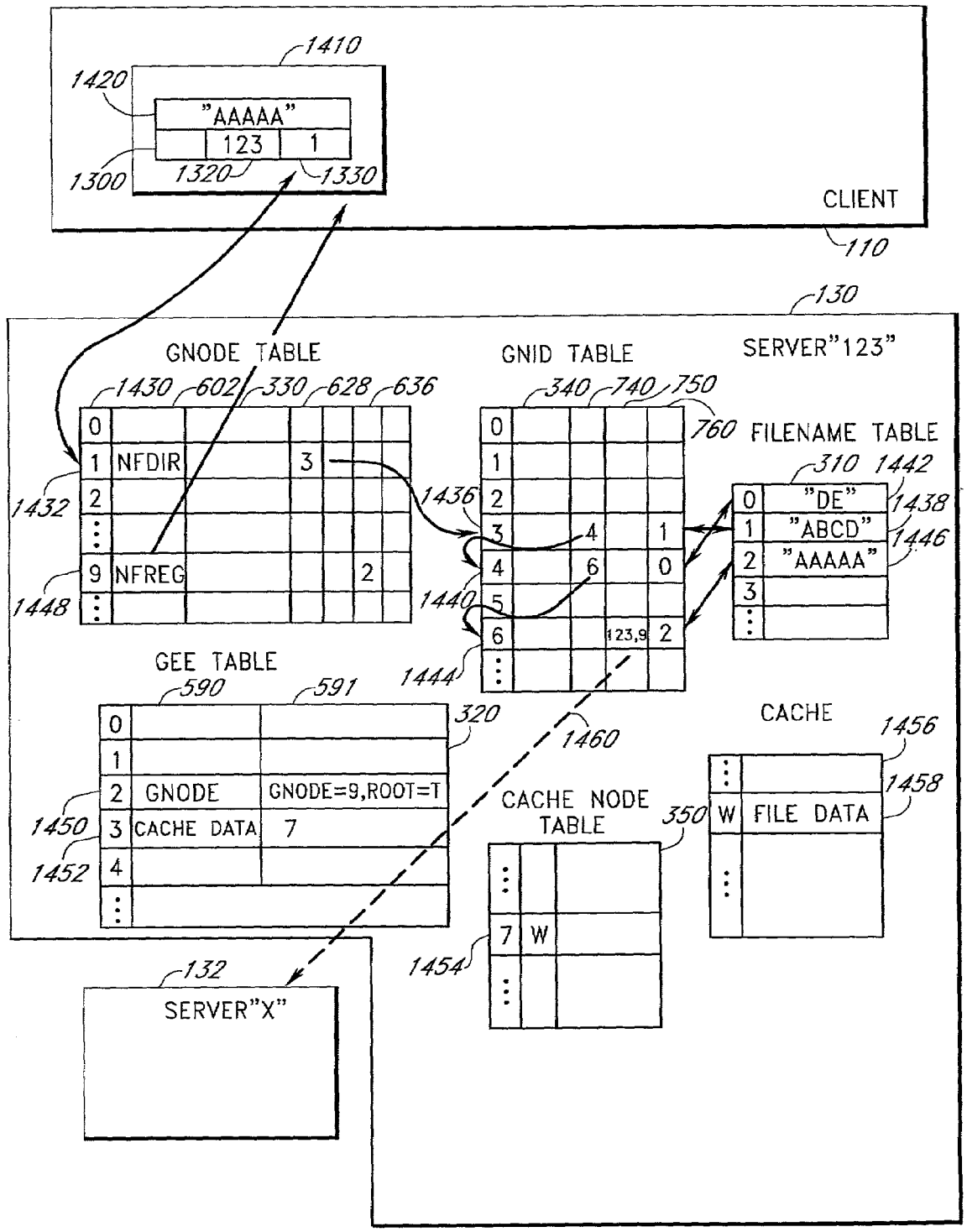
FIG. 14A is a block diagram depicting one embodiment of a file handle look-up process.

FIG. 14A shows an example of the file handle look-up procedure in which the client 110 has a file handle 1300 for a desired file's parent directory and needs a file handle for the desired file itself. The client 110 initiates a look-up for the desired file handle by sending a look-up request 1410 that comprises a filename 1420 of the desired file and the file handle 1300 of the parent directory. The ServerID field 1320 in the file handle 1300 identifies the server 130 of the node 150 where the parent directory is stored, and the file system software 250 directs the look-up request 1410 to the identified server 130. The G-node index field 1330 stores an index for the parent directory's G-node in the G-node Table 330 on the identified server.

In this example, the filename 1420 of the desired file is "AAAAA." The ServerID field 1320 indicates that the parent directory is stored on the server 130 with ServerID "123," and the G-node index field 1330 shows that a G-node for the parent directory can be found at index location "1" in the G-node Table 330.

When the server 130 receives the look-up request 1410, the server 130 uses information in the G-node index field 1330 of the file handle 1300 to access a G-node 1432 at index location "1."

As described above, the G-node 600 acts as a repository of general information regarding a file. In the example illustrated in FIG. 14A, the File Attribute-type field 602 of the G-node 1432, namely "NFDIR," indicates that the file associated with the G-node 1432 is a directory, not a regular data file.

As described earlier, the Gnid-string 700 holds information about the children files of a given directory. The Child Gnid Index 628 in G-node 1432 points to a first Gnid 1436 in the directory's Gnid-string 700. The server 130 searches for the desired data file amongst the children files of the parent directory by searching the corresponding Gnids on the directory's Gnid-string. The server 130 uses the Filename Ptr fields 760 of each Gnid 710 to access the associated file's filename entry 410 for comparison with the filename 1420 of the desired file.

In FIG. 14A, the Child Gnid Index field 628 of G-node 1432 indicates a value of "3," and the server 130 accesses the Gnid 1436 at index location "3" in the Gnid Table 340. To determine a filename associated with the Gnid 1436, the server 130 uses the Filename Ptr field 760 to access the Filename Entry 1438 associated with the Gnid 1436 at index "3." To ascertain if the filename stored at the Filename Entry 1438 matches the filename 1420 in the look-up request 1410, the server 130 first compares the checksum and filename length count of the filename 1420 in the look-up request 1410 with the checksum 412 and the filename length count 413 stored in the Filename Entry 1438 in the Filename Table 310. (Note: These checksums and filename lengths are not shown explicitly in FIGS. 14A and 14B.) If the aforementioned checksums and filename length counts match, the server 130 proceeds with a character-by-character comparison of the character string 1420 in the look-up request 1410 and the filename 414 in the Filename Entry 1438.

If a mismatch is encountered during the comparisons, as is the case in FIG. 14A, where the Filename Entry 1438 holds a filename of "ABCD" and length "4" while the desired filename of "AAAAA" has a length of "5," then the current Gnid is eliminated from consideration. After encountering a mismatch for the Gnid 1436 at index "3," the server 130 continues to traverse the Gnid-string 700 by using the Sibling Gnid Ptr field 740 in the current Gnid 1436 as an index pointer.

The Sibling Gnid Ptr field 740 of the Gnid 1436 holds a value of "4," indicating that a next Gnid 1440 can be found at index location "4" of the Gnid Table 340. When the checksum and name length for the desired filename 1420 do not match those from a Filename Entry 1442 "DE" found at index location "0" of the Filename Table 310, the server 130 again eliminates the current Gnid from consideration.

The server 130 again uses the Sibling Gnid Ptr field 740 as a pointer, this time from the Gnid 1440 at index location "4" to a Gnid 1444 at index location "6" in the Gnid Table 340. Following the Filename Ptr 760 of the Gnid 1444 to Filename Entry 1446 and performing the aforementioned checksum, filename length, and filename comparisons reveals that the desired filename 1420 and Filename Entry filename 1446 do match. The server 130 therefore determines that this Gnid 1444 is associated with the desired file.

In order to send the desired file handle 1300, which comprises the ServerID 1320 and G-node Table index 1330 for the desired file, to the requesting client 110, the server 130 accesses the G-node Ptr field 750 of the current Gnid 1444. The G-node 600 of a file is stored on the server node 150 where the file is stored, which is not necessarily the same server node that holds its parent directory. The G-node Ptr field 750 provides both the ServerID of the server that is the file's primary owner and an index that identifies the file's G-node 1448 in the primary owner's G-node Table 330.

In the example of FIG. 14A, the contents of the G-node Ptr field 750 show that the desired G-node 1448 exists at location "9" in the G-node table 330 on the same server 130, namely the server with ServerID "123." However, it would also be possible for the G-node Ptr field 750 to contain an index to a G-node Table 330 on another server 132, in which case, the file handle 1300 would include the ServerID of the server 132 holding the file and its G-node 600. (This possibility is indicated by the dotted arrow 1460 pointing from the G-node Ptr field 750 to another server 132 of the DFSS 100.) Thus, the information in the G-node Ptr field 750 allows the server 130 to provide the client 110 with both a ServerID 1320 and with the G-node Index 1330 needed to create the file handle 1300 for the desired file. The file handle 1300 for the desired file can be sent back to the client 110 for use in future access of the desired file, and the process of file handle look-up is complete.

Figure 14B:
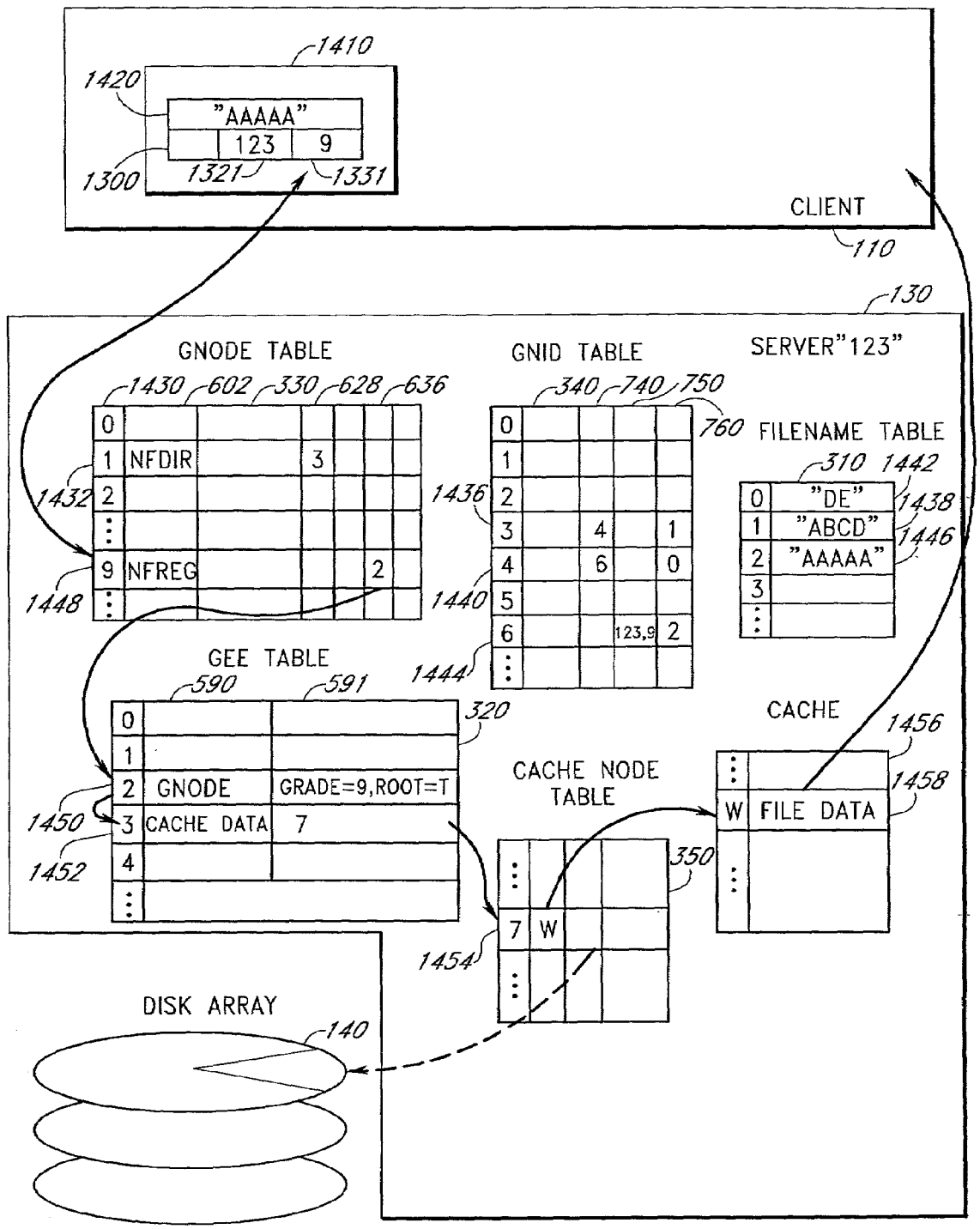
FIG. 14B is a block diagram depicting one embodiment of a file access process.

FIG. 14B shows one example of a file access operation, illustrated using the same context as was used in FIG. 14A. Here, the client 110 already has a file handle 1301 for the desired file, so an access request 1411 can be sent directly to the file system 250. As previously disclosed, the user on the client 110 has no need to be aware of the specific server node 150 that will be accessed. This information is embedded in the desired file's file handle 1301.

The server 130, indicated in a ServerID field 1321, accesses the G-node 1448 at index "9" as indicated in a G-node index field 1331 of the file handle 1301.

As disclosed above, the Gee Table 320 holds information about the physical storage locations of a file's data and parity blocks on the disk array 140. The Gee Table 320 also holds information that helps locate blocks of data that have been copied to cache. A Gee holds storage location information about one block of data. Gees for a given file are linked together to form the gee-string 500. A first Gee of the gee-string 500 is called the root of the gee-string 500.

The Gee Index-Root field 636 of the G-node 1448 provides an index to a root Gee 1450 in the Gee Table 320. Reading the data field 591 of the Gee 1450 confirms that this Gee is a root Gee and that it is associated with the G-node 1448 at index location "9." The server 130 continues reading the gee-string at the next contiguous Gee 1452 in the Gee Table 320. Reading the G-code 590 of the Gee 1452 with its value of "CACHE DATA" reveals that this Gee represents data that has been cached.

As disclosed above, the Cache Node Table 350 holds information that allows the server 130 to access a file block's location in cache 1456. Reading the Data Field 591 of a next Gee 1452 provides a pointer to an appropriate cache node 1454 of the Cache Node Table 350. The cache node 1454 holds the CacheBlockAddr field 825 which points to a location 1458 in cache 1456 of the data associated with the Gee 1452. The cache node 1454 also holds a copy of the associated Gee 1452 from the Gee Table 320 in the Data Gee field 810 until the associated data block 1458 is no longer stored in cache. The Data Gee field 810 also provides a pointer to the location of the associated file data stored on the server node's disk array 140. By following the pointers from the file handle 1301 to the G-node 1448 at index location "9", on to the Gees 1450 and 1452 at index locations "2" and "3," on to the Cache Node 1454 at index location "7," and finally on to cache location "w" 1458, the data originally requested by the client 110 can be accessed for reading, writing, or other operations, and the process of file access is complete.

Figure 15:
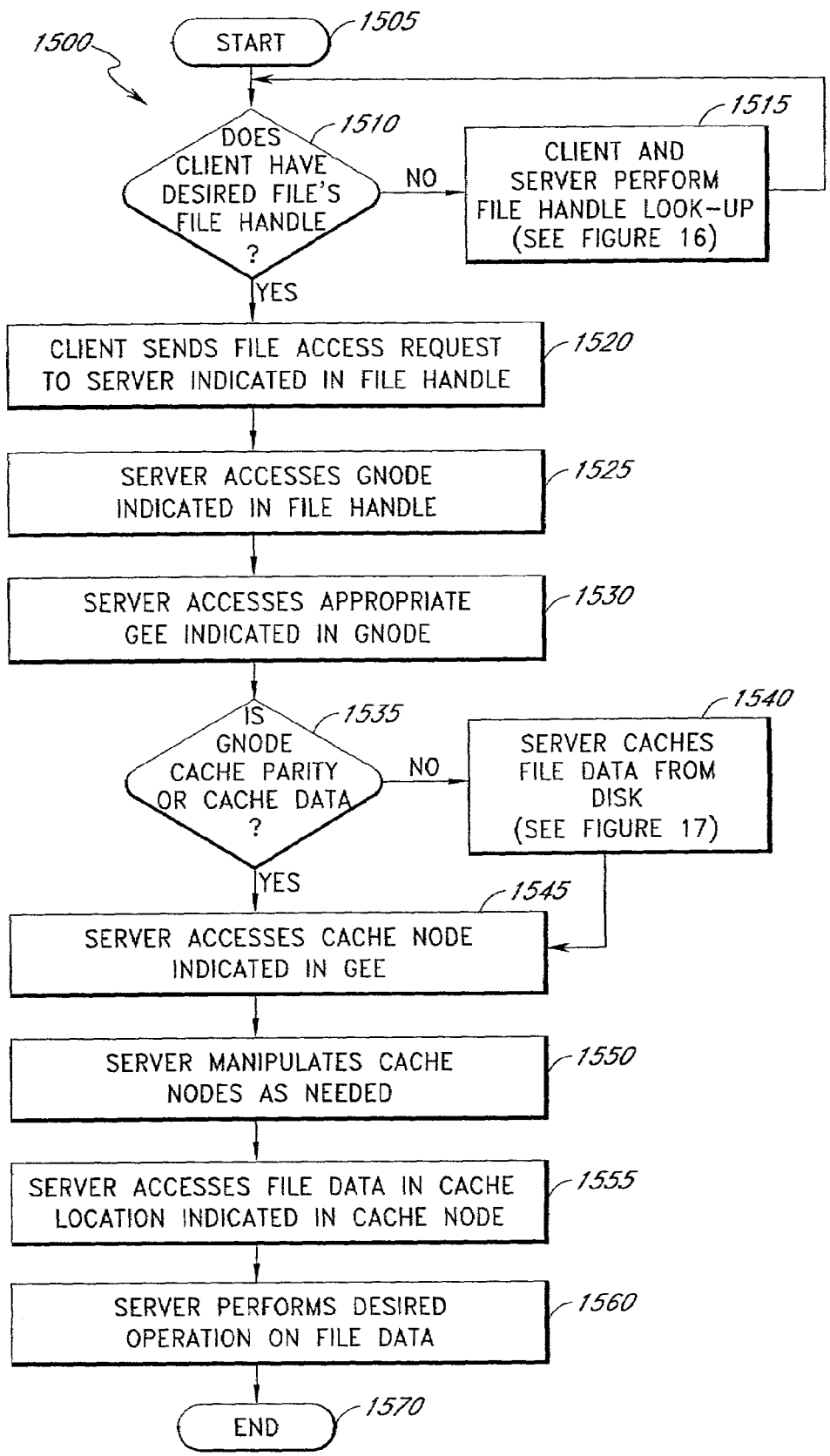
FIG. 15 is a flow chart depicting one embodiment of performing a file access.
Figure 16:
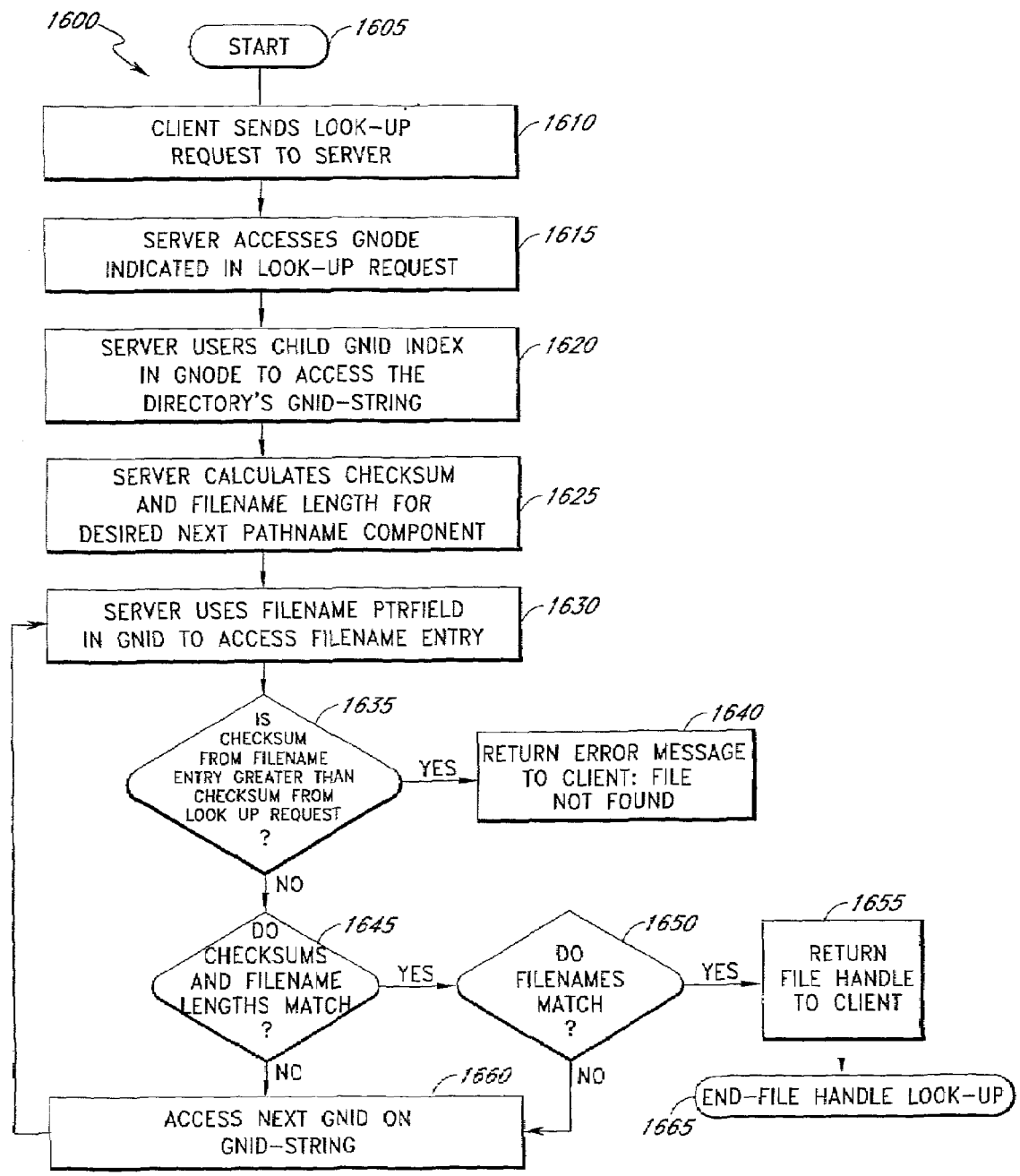
FIG. 16 is a flow chart depicting one embodiment of performing a file handle look-up.
Figure 17:
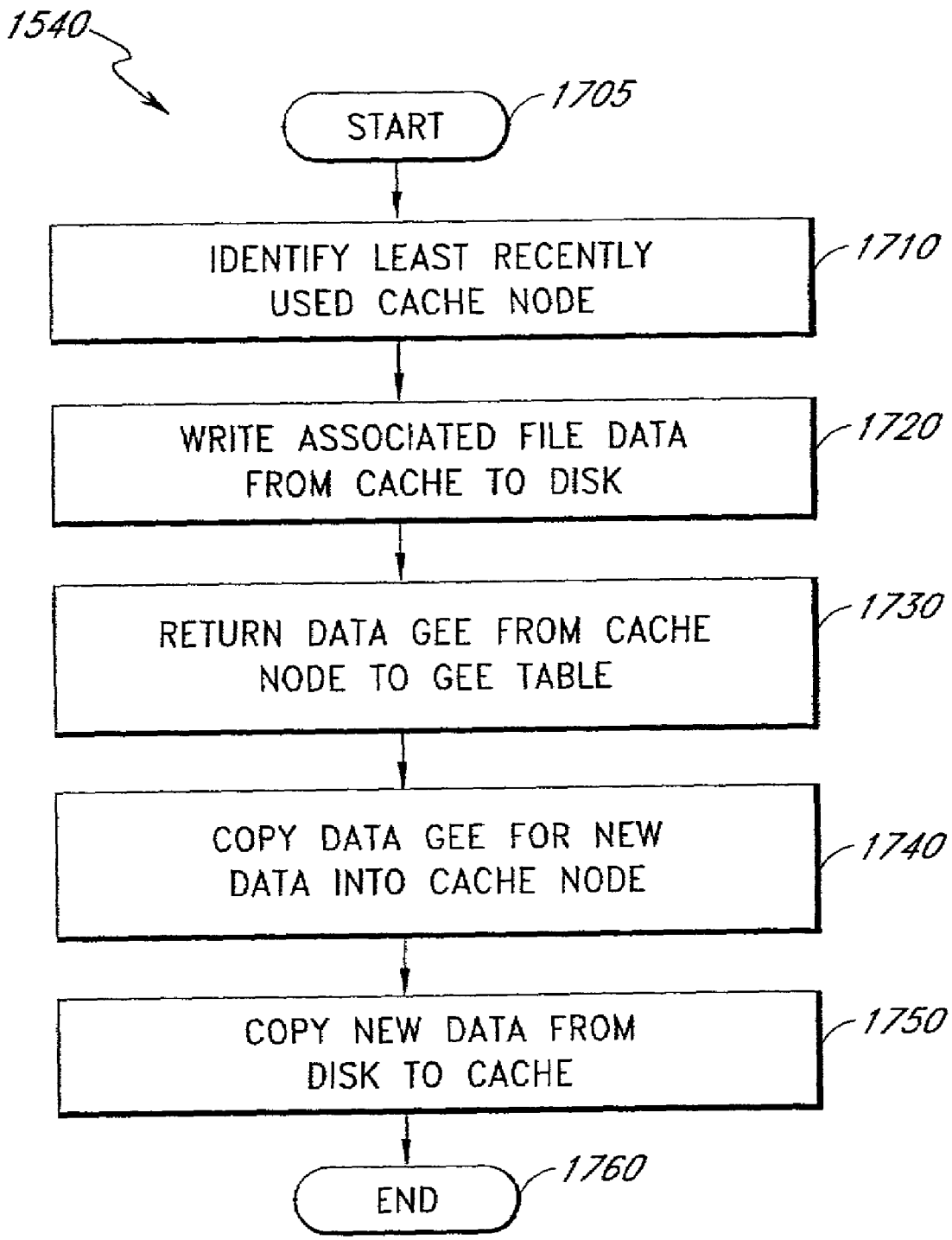
FIG. 17 is a flow chart depicting one embodiment of caching file data.

FIGS. 15–17 present a set of interrelated flow charts that illustrate the process of file access, including file handle look-up, if necessary.

Referring to FIG. 15, a process 1500 of accessing a file is described, beginning with the request for a file handle look-up, through the use of the file system's metadata structures, to final access of the file data in cache.

Beginning at a start state 1505, the process 1500 moves to a state 1510 where the client 110 determines whether it has the file handle 1300 for a file that it wishes to access.

If the client 110 does not have the desired file handle 1300, the process 1500 moves to a state 1515, where the client 110 and one or more servers of the DFSS 100 perform a file handle look-up, as will be described in greater detail with reference to FIG. 16.

Returning to the state 1510, if the client 110 determines that it does have the desired file handle 1300, then the process 1500 moves on to a state 1520 where the client 110 sends the file access request 1411 to the server 130 indicated in the file handle 1300.

From state 1520, the process 1500 moves to a state 1525 where the server 130 accesses a G-node 600 indicated in the file handle 1300.

Moving on to a state 1530, the server 130 uses a pointer in the G-node 600 to access an appropriate Gee in the Gee Table 320. Several possibilities exist for appropriate gees, depending on the current access needs of the server 130. For example, in the embodiment of the G-node 600 described in FIG. 6, seven fields 630–636 relate to pointers to the Gee Table 320. The Gee Index—Root field 636 is an index to the root Gee, which can be used, for example, when reading from the beginning of a file is desired. Fields 634 and 635 together point to the last Gee of a file, which can be used, for example, when appending new data to the end of a file. Fields 630 and 631 together point to a most recently used Gee for the file, which can be used, for example, for sequential access to the gees of a file. Fields 632 and 633 together point to a middle Gee for the gee-string 500 which can be used, for example, when access to the middle, or second half, of the file is desired.

After accessing an appropriate Gee in the state 1530, the process 1500 moves on to a state 1535 where the server 130 reads the G-code field 590 in order to determine if the data represented by the Gee has already been cached. If the G-code 590 holds a value other than "CACHE DATA" or "CACHE PARITY," the server 130 assumes that the desired data has not yet been cached, and the process 1500 moves to a state 1540 where the desired data is sent to cache. The state 1540 is described in greater detail in connection with FIG. 17 below.

Returning to the state 1535, if the server 130 determines that the G-code 590 holds a value of "CACHE DATA" or "CACHE PARITY," the server 130 assumes that the desired data has already been cached. The process 1500 then moves on to a state 1545 where the server 130 accesses the cache node 800 indicated in the gee's data field 591.

From the state 1545, the process 1500 moves on to a state 1550 where the server 130 manipulates the accessed cache node 800 as needed according to the description of FIG. 8B. For example, if the cache node 800 is currently on the Normal List 860, and the client 110 has requested to read the data block, the server 130 can increment the cache node's ReadCt field 830 and move it to the Read List 870.

Once the Cache Node 800 is properly updated, the process 1500 moves from the state 1550 to a state 1555 where the server 130 accesses the file block data in the cache location indicated in the Cache Node 800. From here, the process 1500 moves on to a state 1560 where the server 130 performs a desired operation on the cached data block. From the state 1560, the process 1500 moves on to a state 1570 where accessing the file is complete.

In FIG. 15, the process 1500 reaches the state 1515 only if the client 110 does not have a file handle 1300 for the desired file. Referring to the embodiment of the file handle 1300 illustrated in FIG. 13, the file handle 1300 for a given file comprises, among other possible fields, a ServerID field 1320 identifying the server 130 that stores the data and metadata for a file, as well as a G-node Index field 1330 that indicates the G-node 600 of the given file on that identified server 130.

FIG. 16 is a flow chart that describes in more detail how the process of the state 1515 carries out a file handle look-up. The look-up process 1515 begins with a look-up request that comprises the file handle 1300 for a directory on the pathname of the desired file and continues on through each component of the pathname, retrieving a file handle for each, until a file handle for the desired file itself is returned to the client 110.

The "root" directory is the first component of the pathname for every file in the file system, and, if necessary, the client 110 can begin the process of file handle look-up 1515 with the file handle of the "root" directory. In one embodiment, every client has at least the file handle 1300 for a "root" directory for the file system 250. For example, the "root" directory can be known to reside on the server 130 with ServerID number 0, and its G-node 600 can be known to reside at index 0 of the G-node Table 330 on Server 0. However, it may also be that at the beginning of the look-up process 1515, the client 110 has the file handle 1300 for the desired file's parent directory or for another directory on the pathname of the file, and that by beginning with one of these directories "closer" to the file itself, the look-up process may be shortened.

Beginning at a start state 1605, the process 1515 moves to a state 1610 where the client 110 sends the look-up request 1410 comprising the file handle 1300 for a directory and the filename 1420 of a desired next component. The look-up request 1410 is sent to a server 1300 indicated in the file handle 1300 field of the look-up request 1410. The process 1515 next moves to a state 1615, where the server 130 accesses a G-node 600 indicated in the file handle 1300 of the look-up request 1410.

Moving on to a state 1620, the server 130 uses the ChildGnidIndex field 628 in the G-node 600 to access a first Gnid 710 in the directory's Gnid-string 700. As described in connection with the embodiment shown in FIG. 7, the Gnid-string 700 is a linked list of Gnids 710, with one Gnid 710 for each child file in a parent directory.

Moving on to a state 1625, the server 130 calculates a checksum and filename length for the filename 1420 of the next desired pathname component that was sent by the client 110 in the look-up request 1410. Having a checksum and filename length for a desired file allows the server 130 to expedite searching for a matching Filename Entry because comparison of checksums and comparison of filename lengths can be accomplished much more quickly than a character-by-character comparison of the filenames themselves. Performing the first two types of comparisons before embarking on the character-by-character comparison allows the server 130 to eliminate any Filename Entries whose checksum and filename length do not match, before performing the more costly character-by-character filename comparison.

Moving on to a state 1630, the server 130 uses the FilenamePtr field 760 of the currently accessed Gnid 710 to locate the associated Filename Entry 410 in the Filename Table 310. Moving on to a state 1635, the server 130 determines if the checksum 412 stored in the currently accessed Filename Entry 410 is greater than the checksum calculated in the state 1625.

As described in connection with FIG. 7, in one embodiment, Gnids 710 are stored in the Gnid-string 700 in order of checksum 412 values calculated for their associated character strings 414, with the Gnid 710 having the smallest checksum 412 value coming first. This ordering of Gnids 710 by checksum 412 value allows the server 130 to determine whether a desired filename may still exist on the given Gnid-string 700. In this embodiment, if, in the state 1635, the server 130 determines that the checksum 412 found in the currently accessed Filename Entry 410 is greater than the checksum calculated in the state 1625, then a Gnid 710 for the desired file (with the lower checksum) cannot exist on the currently accessed Gnid-string 700. In this case, the process 1515 moves on to a state 1640, where it reports a File-Not-Found Error to the client 10.

Returning to the state 1635, if the server 130 determines that a checksum found in a currently accessed Filename Entry is greater than the checksum calculated in state 1625, then the process 1515 moves on to a state 1645.

In the state 1645, the server 130 determines if the checksums and the filename lengths from the two sources match. If either the checksums or the filename lengths (or both) do not match, then this Filename Entry can be ascertained not to be associated with the client's desired file, and the process 1515 moves on to a state 1660. In the state 1660, the server 130 uses the SiblingGnidPtr 740 in the current Gnid 710 to access the next Gnid in the current Gnid-string.

Returning to the state 1645, if the server 130 determines that the checksums and filename lengths do match, then this Filename Entry 410 cannot yet be eliminated, and the process 1645 moves on to a state 1650, where the server 130 performs a character-by-character comparison of the two filenames.

If, in the state 1650, the server 130 determines that the two filenames do not match, then, as was the case in state 1645, this Filename Entry can be ascertained not to be associated with the client's desired file. In this case, the process 1515 moves on to a state 1660, where the server 130 uses a SiblingGnidPtr 740 in the current Gnid to access a next Gnid 711 in the current Gnid-string 700.

From the state 1660, the process 1515 returns to the state 1630, and the server 130 uses the Filename Ptr field 760 of the newly accessed Gnid 711 to access an associated Filename Entry in the File Table 310. This loop through the states 1630, 1635, 1645, 1660 (and possibly 1650) continues until a Filename Entry and associated Gnid for the desired file is found or until an error is encountered.

If, in the state 1650, the server 130 determines that the filenames do match, then the process 1515 has identified a Filename Entry and an associated Gnid that corresponds to the desired file. In this case, the process 1515 moves on to a state 1655, where the server 130 sends the desired file handle 1300 information back to the client 110. Moving on to a state 1665, the file handle look-up process 1515 is complete. The process 1500 from FIG. 15 then proceeds from the state 1515 back to the state 1510 and continues as described in the explanation of FIG. 15.

FIG. 17 presents a more detailed description of the state 1540 from FIG. 15, in which uncached data that has been requested for access by the client 110 is copied into cache memory. The process 1540 of caching file data begins in a start state 1705 and proceeds from there to a state 1710, where the server 130 identifies the least recently used cache node 880. In one embodiment of the file system 250, when the three-list scheme described in FIG. 8B is used, the server 130 can easily identify the least recently used cache node 880 because it is a "last" cache node on the Normal List 860 of the scheme.

Moving on to a state 1720, the server 130 writes the associated file data from its volatile location in cache to its non-volatile location on disk array 140, which is indicated in the DataGee field 810 of the cache node 800.

Moving on to a state 1730, the server 130 copies the DataGee field 810 from the cache node 800 back to its original position in the Gee Table 320, changing the G-code 590 back from "CACHE DATA" to "DATA" or from "CACHE PARITY" to "PARITY," indicating that the associated data is no longer cached.

Moving on to a state 1740, the server 130 overwrites the DataGee field 810 in the cache node 800 with a Gee from the Gee Table 320 that is associated with a new file block to be cached.

Moving on to a state 1750, the server 130 caches the new file block from disk to a cache location associated with the cache node.

Moving on to a state 1760, the process 1540 of caching file data is complete, and the process 1500 in FIG. 15 can proceed from the state 1540 on to the state 1545 to continue the task of accessing a file.

Figure 18:
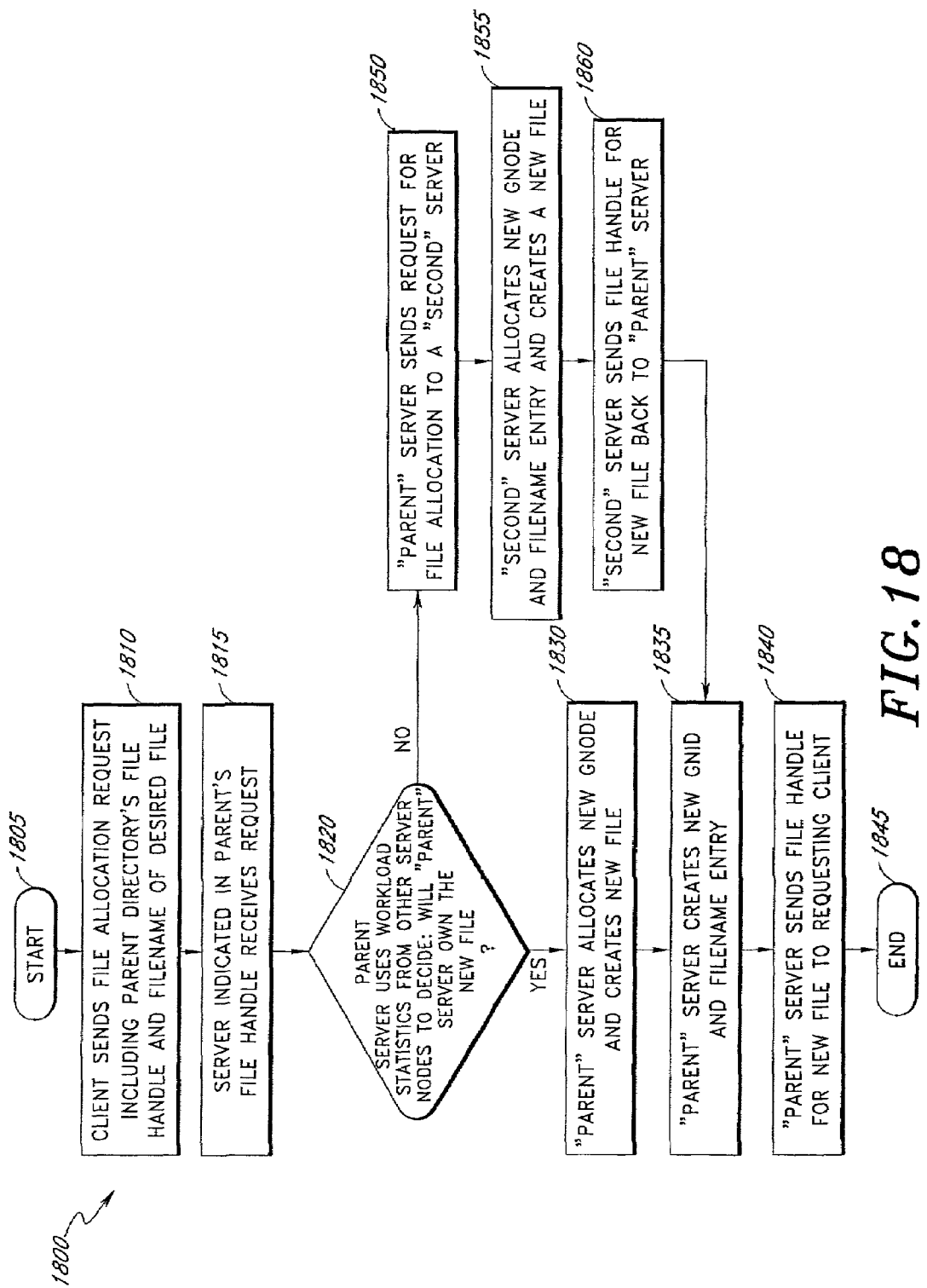
FIG. 18 is a flow chart depicting one embodiment of file allocation.

Referring to FIG. 18, a process of file allocation 1800 is shown in flowchart form. The process 1800 begins in a start state 1805 and moves to a state 1810 where the client 110 send a file allocation request that includes a filename for a new file and a file handle for the new file's parent directory.

The process 1800 moves to the state 1815, and the server node 150 indicated in the parent directory's file handle receives the file allocation request. For the purposes of the description of this figure, this server node 150 will be known as the "parent" server.

The process 1800 moves to the state 1820, and the "parent" server 150 uses workload statistics received from the other server nodes of the DFSS 100 to decide if the file will be "owned" by the "parent" server node 150 or by another server node.

If the "parent" server node 150 decides that it will be the owner of the new file, then the process 1800 moves to a state 1830, where the "parent" server creates a new file, makes an appropriate new Filename Entry 410 in the Filename Table 310, and allocates a new G-node 600 for the new file. At this point, the "parent" server node 150 has enough information to create the file handle 1300 for the new file.

Returning to the state 1820, if the "parent" server node 150 decides that another server node should own the new file, the process 1800 moves to a state 1850, where the "parent" server 150 sends a file allocation request to another server of the DFSS 100. For the purposes of describing this figure, the other server will be known as the "second" server.

From the state 1850, the process 1800 moves to a state 1855 where the "second" server creates a new file, makes the appropriate new Filename Entry 410 in the Filename Table 310, and allocates the new G-node 600 for the new file. At this point, the "second" server has enough information to create the file handle 1300 for the new file.

From the state 1855, the process 1800 moves on to a state 1860, where the "second" server sends the file handle 1300 for the new file to the "parent" server node 150.

At this point, when the "parent" server node 150 has the file handle 1300 for the new file, the process 1800 moves on to a state 1835.

The state 1835 can also be reached from state 1830 in the case where the "parent" server 150 decided to be the owner of the file. As disclosed above, in state 1830 the "parent" server 150 also had the information to create a file handle 1300 for the new file, and the process 1800 also moves on to a state 1835.

For either case, in state 1835, the "parent" server node 150, as owner of the new file's parent directory, allocates a Gnid 710 for the new file, adds it to the appropriate Gnid-string 700, and, if one does not already exist, the "parent" server node 150 makes an appropriate new Filename Entry 410 in the Filename Table 310.

From the state 1835, the process 1800 moves on to a state 1840, where the "parent" server node 150 sends the file handle 1300 for the new file to the requesting client 110.

The process 1800 moves on to a state 1845 where the process of file allocation is now complete. The requesting client 110 can access the new file using the newly received file handle 1300, and since the file handle 1300 contains identification for the server that owns the new file, any access request can be automatically routed to the appropriate server node.

Redirectors

In various embodiments, the DFSS 100 can be configured to store and manage a very large number of files of widely varying sizes. In some embodiments, it can be advantageous to store all of the file metadata on disk, while copies of the metadata for only some of the most recently used files are additionally cached in volatile memory. In some embodiments, memory for metadata structures can be dynamically allocated as new metadata structures are brought from disk to volatile memory.

Figure 19:
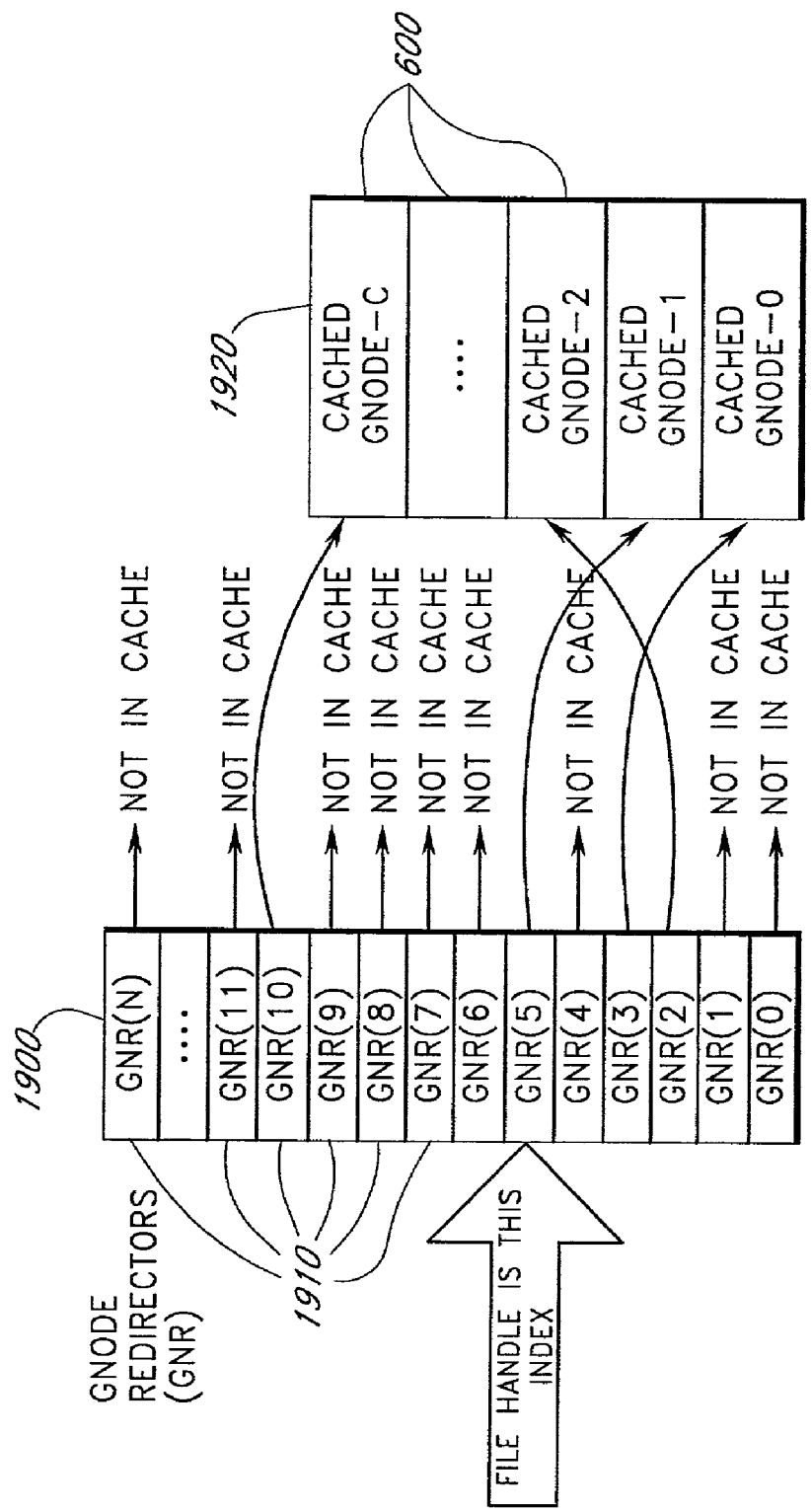
FIG. 19 shows one embodiment of Super G-nodes.

FIG. 19 depicts one embodiment of a scheme to allow for efficient access to file metadata when not all metadata is kept in volatile memory. In the embodiment shown in FIG. 19, a G-node Redirector (GNR) array 1900 in volatile memory holds a G-node Redirector (GNR) 1910 per file. The G-node Redirector (GNR) is a small data structure that comprises information for locating the G-node 600 of a desired file, including information regarding whether the file's G-node 600 is currently in cache 1920. In the embodiment shown in FIG. 19, a client 110 requesting access to a given file sends a file handle 1300 that includes an index for the desired G-node Redirector (GNR) 1910 in the G-node Redirector (GNR) array 1900, which references the G-node 600 of the desired file. In one embodiment, when a desired G-node 600 is not currently cached, a least recently used G-node 600 in cache 1920 can be removed from cache 1920, and a copy of the desired G-node 600 can be brought from the disk array to the cache 1920.

Super G-nodes

In one embodiment, the file system 250 can be advantageously configured to store file metadata in a data structure called a Super G-node (SG) that comprises the file's G-node, other file information, and information that allows the file system 250 to locate the physical storage locations of the file's data blocks, as will be described in greater detail below.

Figure 20A:
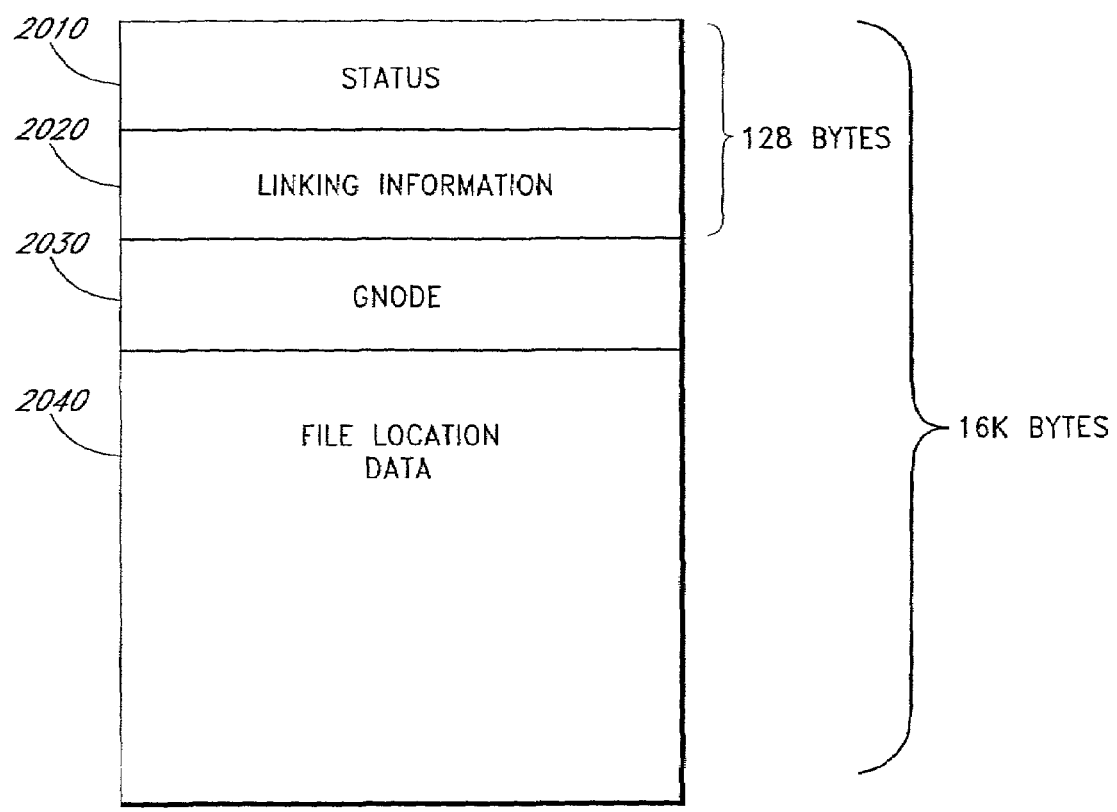
FIG. 20A shows one embodiment of a Super G-node.

FIG. 20A shows one embodiment of a Super G-node 2000 structure of fixed size that can provide location information for files of a wide variety of sizes. As shown in FIG. 20A, a Status field 2010 in the Super G-node 2000 can be used to indicate a type of Super G-node that corresponds to a category of associated file sizes, as will be described in greater detail with reference to FIG. 20B. A Linking Information field 2020 can be used to interconnect Super G-nodes 2000 into one or more linked lists or other structures. A G-node field 2030 comprises attribute and other information about a corresponding file that is similar to the information stored in the G-node 600 embodiment described with reference to FIG. 6. A File Location Data field 2040 in the Super G-node 2000 allows the file system 250 to locate a file's data, as will be described in greater detail below.

In the embodiment shown in FIG. 20A, the Super G-node 2000 comprises 16 Kbytes of memory. The Status 2010, Linking Information 2020, and G-node 2030 fields together comprise 128 Bytes of the Super G-node 2000, and the remainder of the Super G-node can be used to store the File Location Data 2040.

Figure 20B:
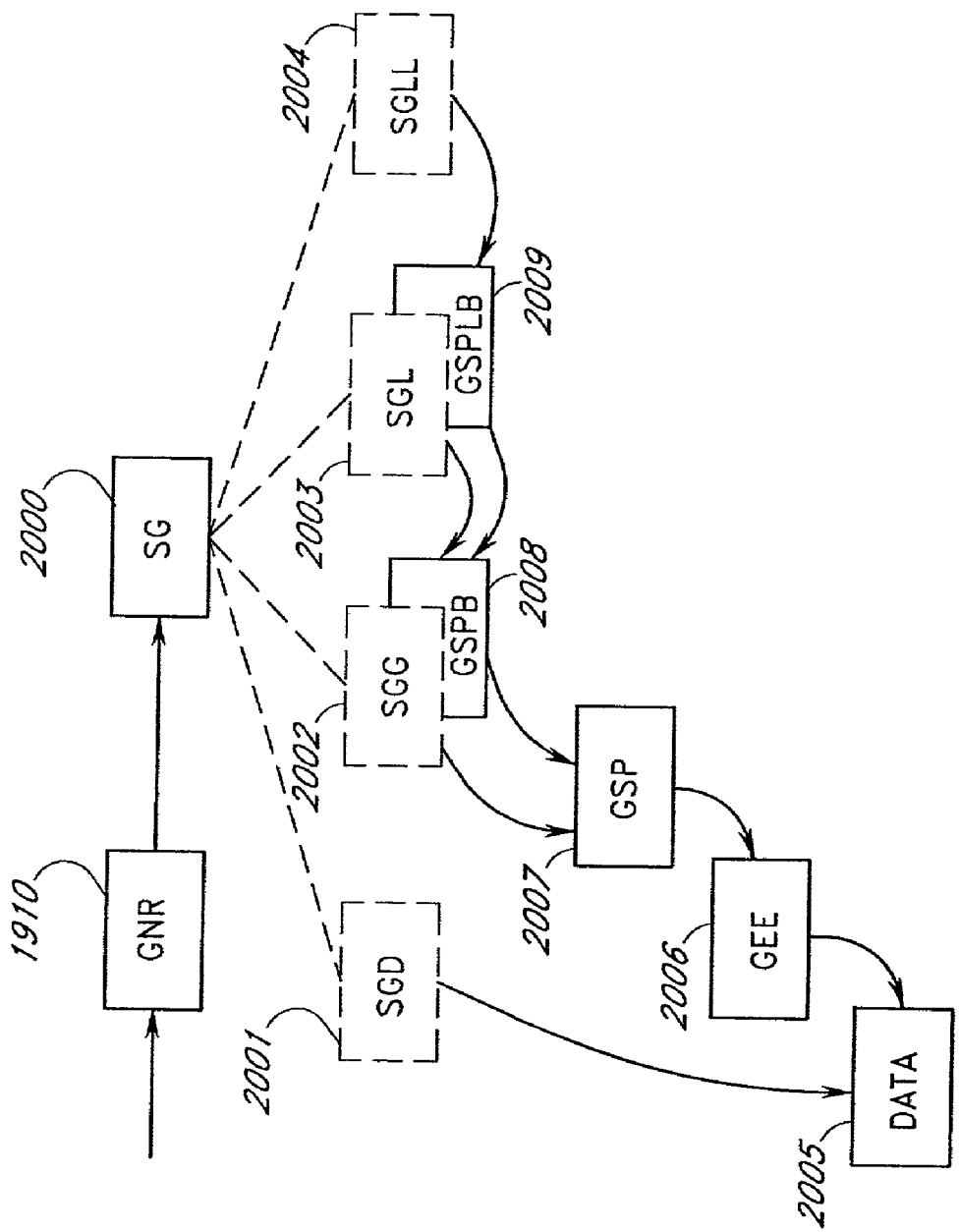
FIG. 20B shows one embodiment of a scheme to use Super G-nodes to hold metadata for files of widely varying sizes.
Figure 21:
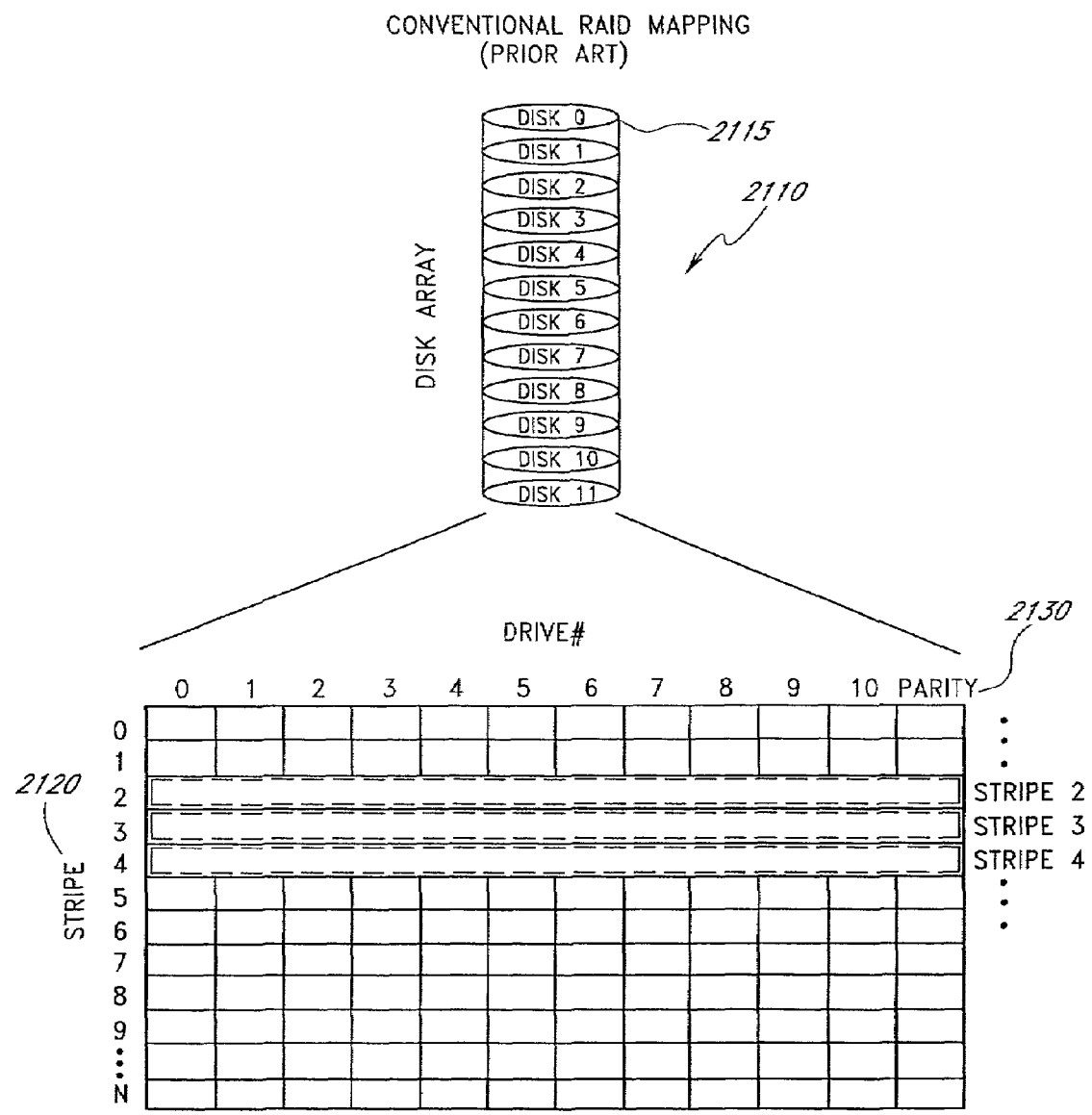
FIG. 21 illustrates a conventional disk array that incrementally stripes data in a RAID mapping architecture.

FIG. 20B depicts one embodiment of a scheme that uses Super G-nodes 2000 of a fixed size to hold information about files of widely differing sizes. In the embodiment shown in FIG. 20A, four types 2001–2004 of Super G-node 2000 are depicted.

A Super G-node 2000 of type Super G-node Data (SGD) 2001 can be used for a file that is small enough that its data 2005 can fit entirely within the File Location Data 2040 field of the SGD 2001. For the embodiment described with reference to FIG. 20A, a small file refers to a file that is 16,256 Bytes, or smaller. When a file's Super G-node 2000 is of type SGD 2001, locating the file's data simply means reading it from the File Location Data 2040 field of the SGD 2001.

In the embodiment shown in FIG. 20B, a Super G-node 2000 of type Super G-node Gee (SGG) 2002 can be used for medium files, that is, files of sizes up to approximately 700 MegaBytes of data that are too large to fit into an SGD 2001. In an SGG 2002, the File Location Data 2040 field is used to hold a Gee String Packet (GSP) 2007 that comprises information very similar to that of the Gee-String 500 described with reference to FIG. 5. As with the Gee-String 500, the Gee String Packet 2007 comprises Gees 2006 that point to the physical locations of the file's data 2005.

A Super G-node 2000 of type Super G-node List (SGL) 2003 can be used for large files whose Gee-String 500 is too large to be described by a Gee String Packet 2007 that fits within the SGL's 2003 File Location Data 2040 field. Instead, the SGL's 2003 File Location Data 2040 field is used to hold a Gee String Packet Block (GSPB) 2008, which is a list of pointers to a plurality of Gee String Packets 2007 that together describe the Gees 2006 that point to the locations of the file's data 2005. In one embodiment, an SGL 2003 can reference files of sizes up to approximately 490 GigaBytes.

A Super G-node 2000 of type Super G-node List of Lists (SGLL) 2004 can be used for very large files. Here, the File Location Data 2040 field of the SGLL 2004 comprises a Gee String Packet List Block 2009 that comprises pointers to a plurality of Gee String Packet Blocks ?008 that point to a plurality of Gee String Packets 2007 that points to a plurality of Gees 2006 that point to a plurality of storage locations that hold the desired data 2005.

In one embodiment, Gee String Packet List Blocks 2009, Gee String Packet Blocks 2008, and Gee String Packets 2007 are implemented in structures that are equivalent in size and organization to the Super G-node 2000 described with reference to FIG. 20A, except that the G-node field 2030 is not used.

Parity Groups

The foregoing description of a distributed file storage system addresses the need for a fault tolerant storage system with improved reliability and scalability characteristics. This system features a flexible disk array architecture that accommodates the integration of variably sized disk drives into the disk array and provides mechanisms to permit each drive's capacity to be more fully utilized than prior art systems. In one embodiment, variably sized data and parity blocks are distributed across the available space of the disk array. Furthermore, the system provides methods of redistributing data across the disk array to improve data storage and retrieval, as well as, provide for improved fault-tolerance. Another benefit of the data redistribution characteristics of the system is that it continues to provide fault-tolerant data access in situations where many drives of the disk array have failed. This feature is a notable improvement over conventional RAID systems that typically only provide fault-tolerance for single (or at most two) drive failures.

Figure 22A:
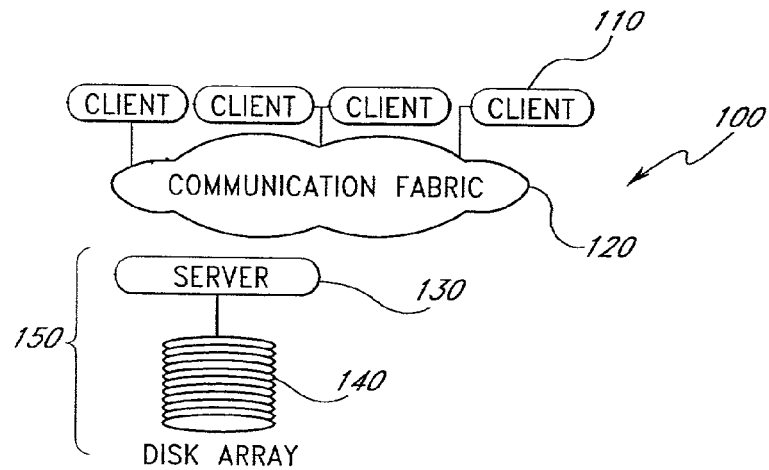
FIG. 22A illustrates one embodiment of a distributed file storage system.

FIG. 22A shows a file storage system 100 having the server node 150 that operates within a computer network architecture to provide data and file storage. The computer network comprises one or more clients 110 that exchange information with the server node 150 through the communications medium or fabric 120 to store and retrieve desired data from the server node 150. In one aspect, the clients 110 include one or more computing devices that exchange information with the server node 150 through the communications medium 120.

The communications medium 120 can be any of a number of different networking architectures including, for example, Local Area Networks (LAN), Wide Area Networks (WAN), and wireless networks which may operate using Ethernet, Fibre Channel, Asynchronous Transfer Mode (ATM), and Token Ring, etc. Furthermore, any of a number of different protocols can be used within the communications medium 120 to provide networking connectivity and information exchange capabilities between the clients 110 and the server node 150, including, for example, TCP/IP protocols, Bluetooth protocols, wireless local area networking protocols (WLAN), or other suitable communications protocols.

The server node 150 includes the server 130 that serves as a front end to the disk array 140. The server 130 receives information and requests from the clients 110 and processes these requests to store and retrieve information from the disk array 140. In one aspect, the server 130 maintains at least a portion of an instruction set or file system that determines how data and information are stored and retrieved from the disk array 140.

Although the server node 150 is illustrated as a single entity in FIG. 22A, it will be appreciated that many server nodes 150 can be connected to the communications medium 120. Thus, a plurality of server nodes 150 can be connected to the communications medium 120 and accessible to the clients 110 for the purposes of information storage and retrieval. Furthermore, the server nodes 150 can operate independently of one another or be configured to transparently present a single disk image to each client 110 thus creating a unified storage area that facilitates end user interaction with the server nodes 150. In one aspect, the server nodes 150 incorporate functionality for maintaining the single disk image through the use of the file system present in each of the servers 130 which provides communication and organization to create the single disk image.

Figure 22B:
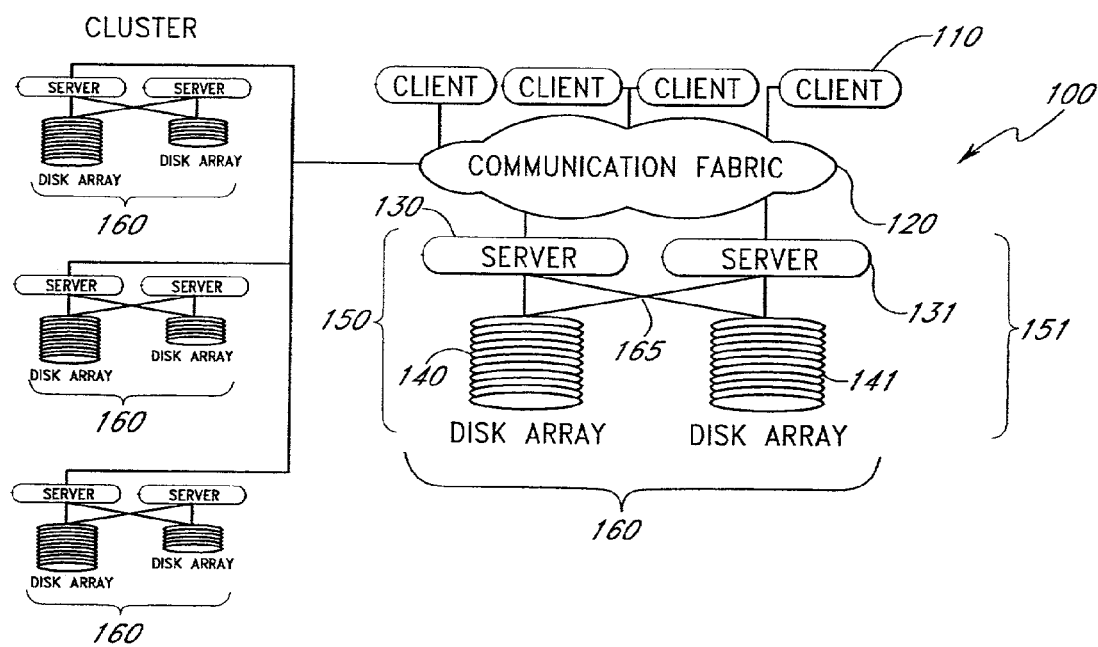
FIG. 22B illustrates another embodiment of a distributed file storage system having built in data redundancy.

FIG. 22B illustrates another embodiment of a file storage system comprising a distributed file storage system architecture. In this embodiment, two or more server nodes 150, 151 are physically or logically interconnected to form the cluster 160. File data stored on any server node is accessible to any other server in the cluster 160. The cluster 160 may also provide metadata and transaction mirroring. Furthermore, stored files may be replicated across at least two server nodes 150, 151 within the distributed file storage system 100 to provide increased redundancy or data mirroring capabilities.

One advantage achieved by the aforementioned distributed configurations is that they may provide increased data protection and/or fault tolerance. For example, if the replicated server node 150 fails or becomes unavailable, the second replicated server node 151 can handle client requests without service interruption. Another advantage achieved by using this interconnected arrangement is that alternative server node access paths 165 can be created where identical data can be read simultaneously from the two or more interconnected server nodes 150, 151. Thus, if one server node 150 in the cluster is busy and unavailable, another redundant server node 151 can service client requests to increase data throughput and accessibility. As with the single server node configuration, a plurality of clusters 160 may be present and accessible to the clients 110. Similarly, the clusters 160 can be configured to present a single disk image to the clients 110 to facilitate interaction by the end users of the distributed file storage system 100.

As shown in FIG. 22B, each disk array 140, 141 in the server nodes 150, 151 can include a variable number of disks where each server node 150, 151 has a different disk array configuration. Each disk within the disk array 140, 141 can have a different storage capacity. These features of the distributed file storage system 100 contribute to improved flexibility and scalability in configuring the server nodes 150, 151.

The variable disk configuration of the distributed file storage system 100 overcomes a limitation present in many conventional storage systems which require that upgrades to the storage system be performed in a coordinated manner where all disks in each disk array 140, 141 are replaced in unison. Additionally, many conventional storage systems, including RAID architectures, require strict conformity amongst the disk arrays within the system, as well as, conformity in disk capacity within individual disk arrays. The distributed file storage system 100 of the present invention is not limited by the restriction of uniform disk upgrades or conformity in disk capacity and can accommodate replacement or upgrades of one or more drives within each server node with drives of differing capacity. To maintain data integrity and knowledge of available storage space within the distributed file storage system 100, one of the functions of the aforementioned file system present in the servers 130, 131 is to accommodate differences in disk array capacity and disk number between the server nodes.

Figure 23:
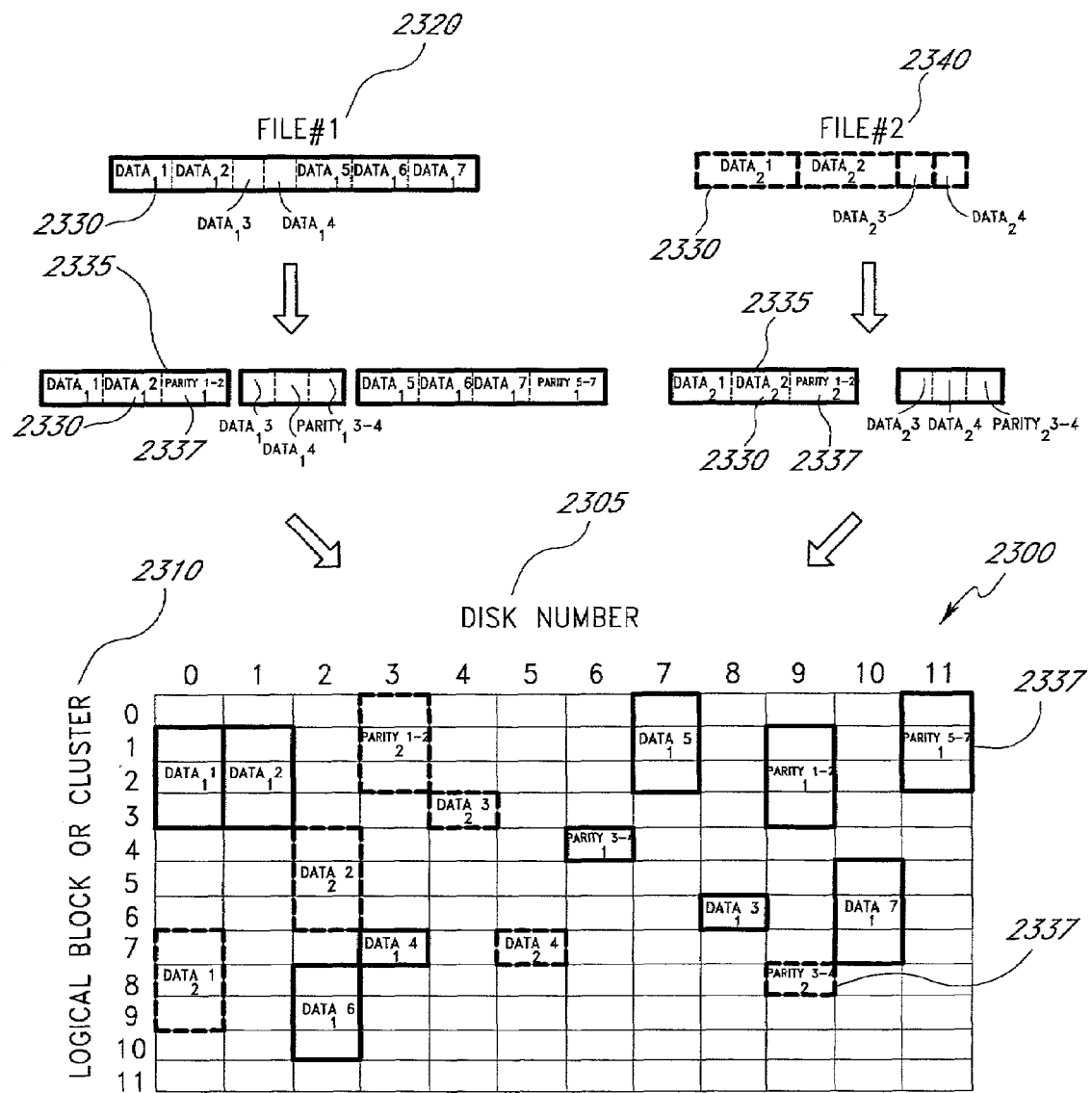
FIG. 23 illustrates a distributed file storage mechanism.

FIG. 23 illustrates the use of a distributed file storage mechanism within the disk array 140 to improve space utilization and flexibility of data placement. A space mapping configuration 2300 is illustrated for the disk array 140 where each disk 2305 is subdivided into a plurality of logical blocks or clusters 2310. For the purposes of this illustration the cluster size is shown to be fixed across all disks 2305 of the array 140, although, as will be illustrated in greater detail in subsequent figures, the cluster size can be variable within each disk 2305 and across disks 2305 within the array 140.

A first file 2320 having data to be stored on the disk array 140 is subdivided into one or more data blocks. The determination of the data block size, number, and distribution is calculated by the file system as data storage requests are received from the clients 110. Each data block 2330 is mapped or assigned to a location within the disk array 140 that corresponds to the particular disk 2305 and logical block 2310 within the disk 2305. Unlike conventional disk arrays, the block size used for data storage is variable from one block to the next within the file.

The server 130 organizes and distributes information to the disk array 140 by dividing a file into one or more data blocks 2330 that are distributed between one or more parity groups 2335. Each parity group 2335 includes a discrete number of data blocks 2330 and further includes a parity block 2337 containing parity information calculated for the data blocks 2330 contained within the particular parity group 2335. Unlike conventional systems, the size of the data blocks 2330 and parity blocks 2337 is not singularly fixed throughout the disk array 140. The collection of data blocks 2330 and parity blocks 2337 can include a number of different sizes and configurations resulting in more flexible storage of data within the disk array 140.

Using File #1 in FIG. 23 as an example, the information contained in the file is distributed in 7 data blocks corresponding to $DATA_1 1$–$DATA_1 7$. Each data block, $DATA_1 1$–$DATA_1 7$ is distributed between 3 parity groups wherein the first parity group contains $DATA_1 1$–$DATA_1 2$ the second parity group contains $DATA_1 3$–$DATA_1 4$ and the third parity group contains $DATA_1 5$–$DATA_1 7$. Furthermore, 3 parity blocks $PARITY_1 1\text{-}2$, $PARITY_1 3\text{-}4$, and $PARITY_1 5\text{-}7$ are formed, one for each parity group.

The parity groups 2335 are determined by the server 130 which assesses the incoming data to be stored in the disk array 140 and determines how the data is distributed into discrete data blocks 2330 and furthermore how the data blocks 2330 are distributed into parity groups 2335. After determining the data block and parity group distribution, the server 140 calculates the parity information for the data blocks 2330 in each parity group 2335 and associates the parity block 2337 containing this information with the appropriate parity group 2335.

The server 130 then determines how the information for each parity group 2335 is stored within the disk array 140. Each data block 2330 and parity block 2337 is distributed within the disk array 140 in an arrangement where no blocks 2330, 2337 originating from the same parity group 2335 are stored on the same disk of the disk array 140. The non-overlapping storage of data blocks 2330 and parity blocks 2337 derived from the same parity group 2335 creates the fault-tolerant data storage arrangement where any block 2330, 2337 within a parity group 2335 can be reconstructed using the information contained in the other remaining blocks of the parity group 2335. This arrangement where blocks 2330, 2337 associated with the same parity group 2335 are not be stored on the same disk 140 is important in case of a disk failure within the array 140 to insure that that lost data can be reconstructed. Otherwise, if two or more blocks associated with the same parity group 2335 are stored on the same drive, then in the event of a disk failure, data recovery can not be assured.

An example distribution of data blocks 2330 and parity blocks 2337 within the disk array 140 is shown in FIG. 23. The 7 data blocks and 3 parity blocks corresponding to the File #1 are distributed along disk numbers 0, 1, 8, 3, 7, 2 and 2110 respectively. In a similar manner, a second file 2340 is divided into 4 data blocks (and 2 parity groups) that are distributed along disk numbers 0, 2, 4, and 5 respectively. The size, order, and placement of the data blocks is pre-determined by the server 130 which assigns regions of each disk 2305, corresponding to particular logical blocks, to store data blocks of designated sizes. The parity blocks 2337 of the parity groups 2335 associated with the first file 2320 are further stored on disks 9, 6, 11 with the parity blocks 2337 of the second file 2340 stored on disks 3, 9.

The data blocks 2330 and the parity blocks 2337 need not be sequentially stored but rather can be distributed throughout the disk array 140. Using this arrangement, the distributed file storage system 100 permits the non-sequential assignment and storage of parity group information in a flexible manner that is not limited by a rigid order or placement schema. Flexible block placement in the aforementioned manner improves disk utilization within the disk array 140 and provides for accommodating variable disk capacities as will be shown in greater detail in subsequent figures.

Figure 24A:
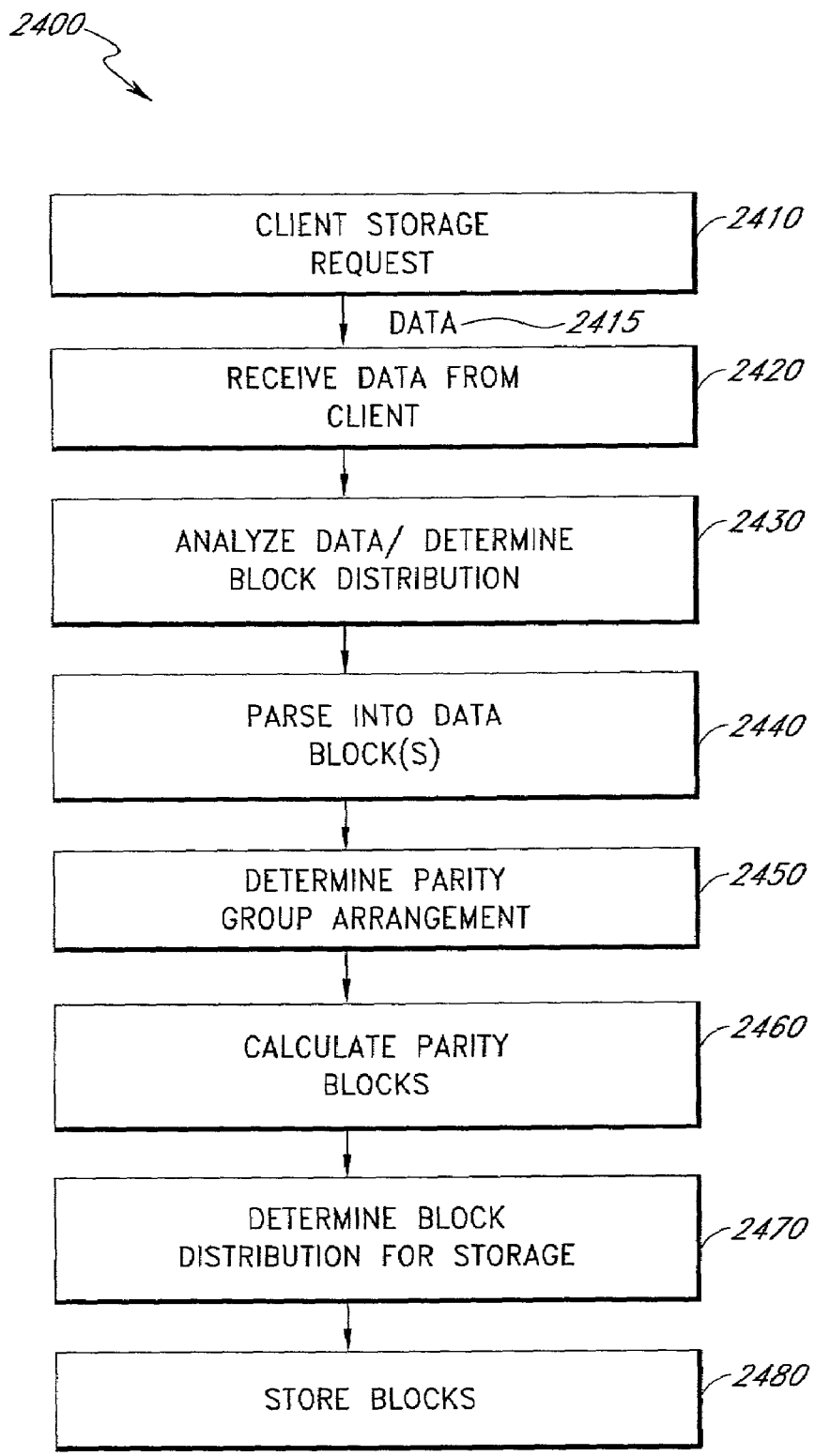
FIG. 24A illustrates a data and parity information storage method.

FIG. 24A illustrates a process 2400 for the storage of data and parity information within the distributed file storage system 100. The process 2400 commences with a data storage request 2410 issued by the client 110 to the server node 150. During this time the client 110 sends or transmits data 2415 to the server node 150 which receives and prepares the data 2420 for subsequent processing and storage. In one embodiment, the server node 150 includes hardware and/or software functionality to perform operations such as error checking, data buffering, and re-transmission requests, as needed, to insure that the data 2415 is received by the server 130 in an uncorrupted manner. Furthermore, the server node 150 is able to process simultaneous requests from a plurality of clients 110 to improve performance and alleviate bandwidth limitations in storage and retrieval operations. In one aspect, the data 2415 is transmitted through the communications fabric 120 in the form of a plurality of data packets that are automatically processed by the server node 150 to generate the data 2415 that is to be desirably stored within the disk array 140.

Upon receiving the data 2420, the server 130 analyzes the characteristics of the data 2430 to determine how the data 2415 will be distributed into one or more data blocks 2330. In one aspect, the data analysis 2430 includes identifying the content or type of data that has been sent, such as, for example, multimedia data, textual data, or other data types. Using one or more of the plurality of available disk blocks sizes, the server 130 identifies desirable block sizes and distribution mappings that are used to group the data 2415 and organize it into the data blocks 2330.

The data 2415 is then parsed into blocks 2440 according to the data analysis 2430 and the resulting blocks are further arranged into one or more parity groups 2450. The parity group arrangement determination 2450 distributes the data blocks 2330 between the parity groups 2335 and dictates the size of the parity blocks 2337 that will be associated with each parity group 2335. For example, a parity group composed of 3 data blocks having sizes of 128K, 64K, and 256K respectively will have a different associated parity block size than and parity group composed of 2 data blocks having sizes of 128K and 256K. The server 130 can therefore vary the block size as well as the parity group size in a number of different ways to achieve improved storage and distribution characteristics within the disk array 140.

In one aspect, the distributed file storage system 100 is an improvement over conventional systems by allowing both data and parity blocks to be assigned to physical disk blocks. Furthermore, the mapping of the data and parity blocks to the physical disk(s) may be performed either before or after the parity calculations thus improving storage flexibility.

Upon determining the parity group arrangement 2450, the server 130 calculates the parity blocks 2460 for each parity group 2335. As previously described, the parity block calculation 2450 creates a fault-tolerant information block which is associated with each group of data blocks 2330 within the parity group 2335. The parity block is calculated 2460 by selecting all data blocks 2330 in a parity group 2335 and performing a logical operation on the data 2415 contained therein to compute error correction information. In one embodiment, the error-correction information is determined using the logical operation, exclusive OR to generate the parity information. Using this error-correcting information the parity block 2337 can be used to restore the information contained in a particular data block 2330 or parity group 2335 that may become corrupted. Furthermore, the parity information can be used to restore the contents of entire disks 2305 within the disk array using the error correction information in conjunction with other non-corrupted data.

When the parity groups 2335 have been formed, the server 130 then determines how the data blocks 2330 and parity block 2337 for each parity group 2335 will be distributed 2470 in the disk array. Although, the data 2415 can be striped sequentially across the disks 2305 of the disk array 140, it is typically more efficient to map and distribute the blocks 2335, 2337 throughout the disk array 140 in a non-sequential manner (See FIG. 23). Mapping the data blocks 2330 in this manner requires knowledge of how the data blocks 2330 are positioned and ordered within the disk array 140. Detailed knowledge of the mapping for each data block 2330 is maintained by the server 130 using a file storage mapping structure. This structure will be discussed below in connection with FIGS. 7 and 9. Using the mapping schema determined by the server 130, the blocks 2330, 2337 of each parity group 2335 are stored 2480 in the disk array 140.

As previously indicated, the distributed file storage system 100 employs a variable parity approach where the size of the parity block 2337 is not necessarily constant. The server 130 creates parity blocks 2337 by selecting one of more data blocks 2330 for which error correction information will be computed. The size of the parity block 2337 is dependent upon the number of data blocks 2330 whose error correction information is computed and is determined by the server 130. In one aspect, the server 130 selects a parity block size that is convenient and efficient to store within the existing space of the disk array 140. The server 130 also provides for distributed placement of the parity blocks 2337 in a manner similar to that of the data blocks 2330. Thus, both data blocks 2330 and parity blocks 2337 are desirably mapped throughout the disk array 140 with the server 130 maintaining a record of the mapping.

The server 130 insures that both data blocks 2330 and parity blocks 2337 are appropriately positioned within the disk array 140 to insure some level of fault tolerance. Therefore, the server 130 desirably distributes selected data blocks and parity blocks containing error correction information for the selected data blocks on non-overlapping disks (e.g. all blocks of a parity group are on separate disks). This insures that if a disk failure does occur, that the corrupted information can be recovered using the remaining data/parity information for each parity group. Upon calculating the appropriate parity information and distribution mapping 2470, the parity blocks 2337 are stored in the disk array 2480 in a manner designated by the server 130.

Figure 24B:
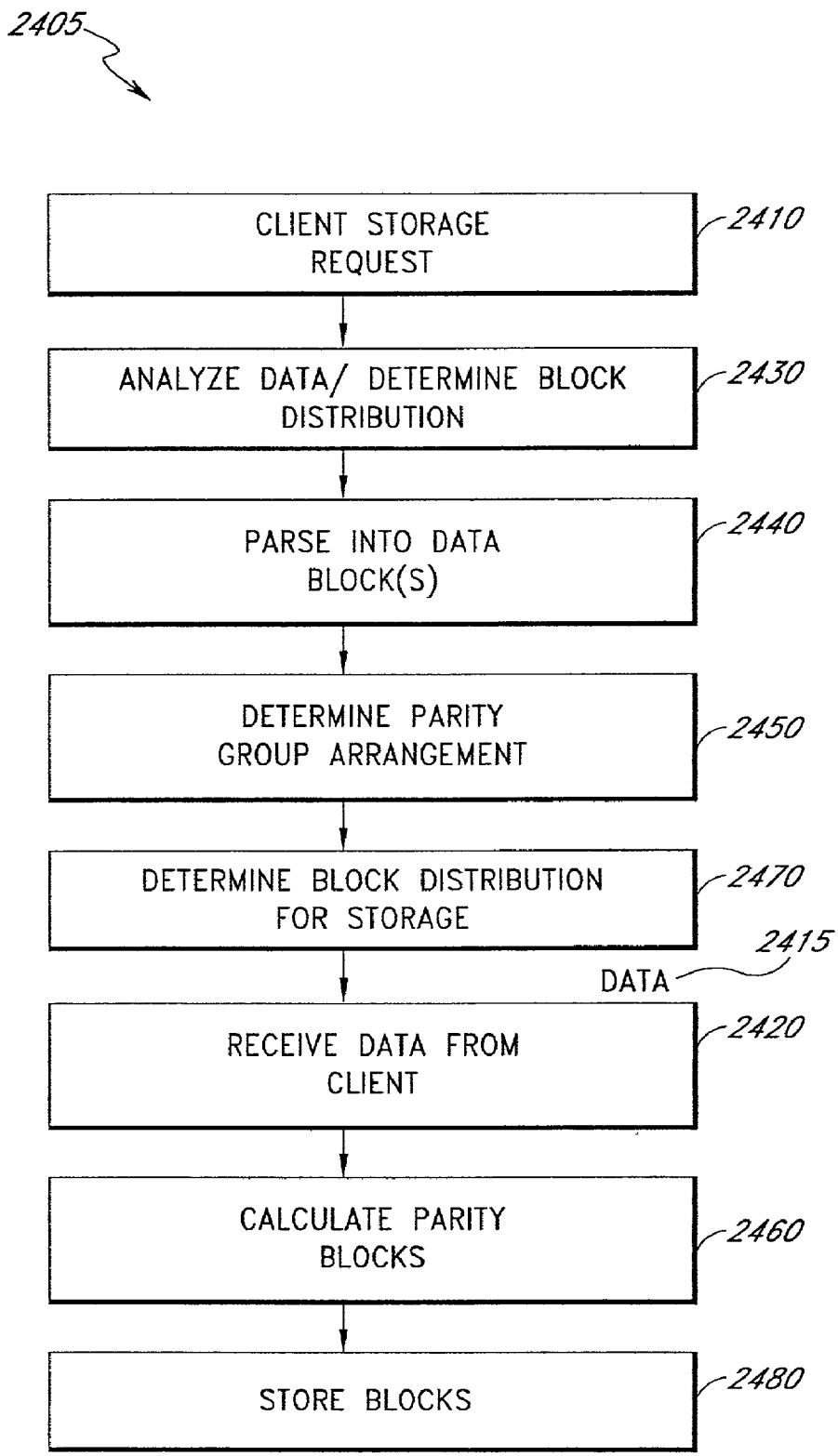
FIG. 24B illustrates another data and parity information storage method.

FIG. 24B illustrates another embodiment of a process 2405 for the storage of data and parity information within the distributed file storage system 100. As with the aforementioned data and parity information storage method 2400, the process begins with the data storage request 2410 issued by the client 110 to the server node 150. Subsequently, an analysis of the characteristics of the data 2430 is performed to determine how the data 2415 will be distributed into the one or more data blocks 2330. The data 2415 is then parsed into blocks 2440 according to the data analysis 2430 and the resulting blocks are further arranged into one or more parity groups 2450. The server 130 then determines how the data blocks 2330 and parity block 2337 for each parity group 2335 will be distributed 2470 in the disk array. At this point the client 110 sends or transmits data 2415 to the server node 150, which receives and prepares the data 2420 for subsequent processing and storage. After receiving the data 2420, the server 130 calculates the parity blocks 2460 for each parity group 2335. Once the data blocks 2330 and parity blocks 2337 have been obtained they are stored in the disk array 2480 in a manner similar to that described with reference to FIG. 24A above.

In either method of data and parity information storage 2400, 2405, the transfer of information from the client 110 may comprise both a parametric component and a data component. The parametric component defines a number of parameters used in the storage of information to the disk array 2480 and may include for example: operation definitions, file handles, offsets, and data lengths. When using the aforementioned storage methods 2400, 2405 the parameters and data need not necessarily be transferred at the same time. For example, the parameters may be transferred during the client storage request 2410 and the data may be transferred anytime thereafter in a subsequent stage of the method 2400, 2405. In one aspect, transfer of information using the parametric and data components desirably allows the distributed file storage system 100 to make decisions about how to process the incoming data prior to the actual data transfer to thereby improve the flexibility and functionality of the system.

Figure 25:
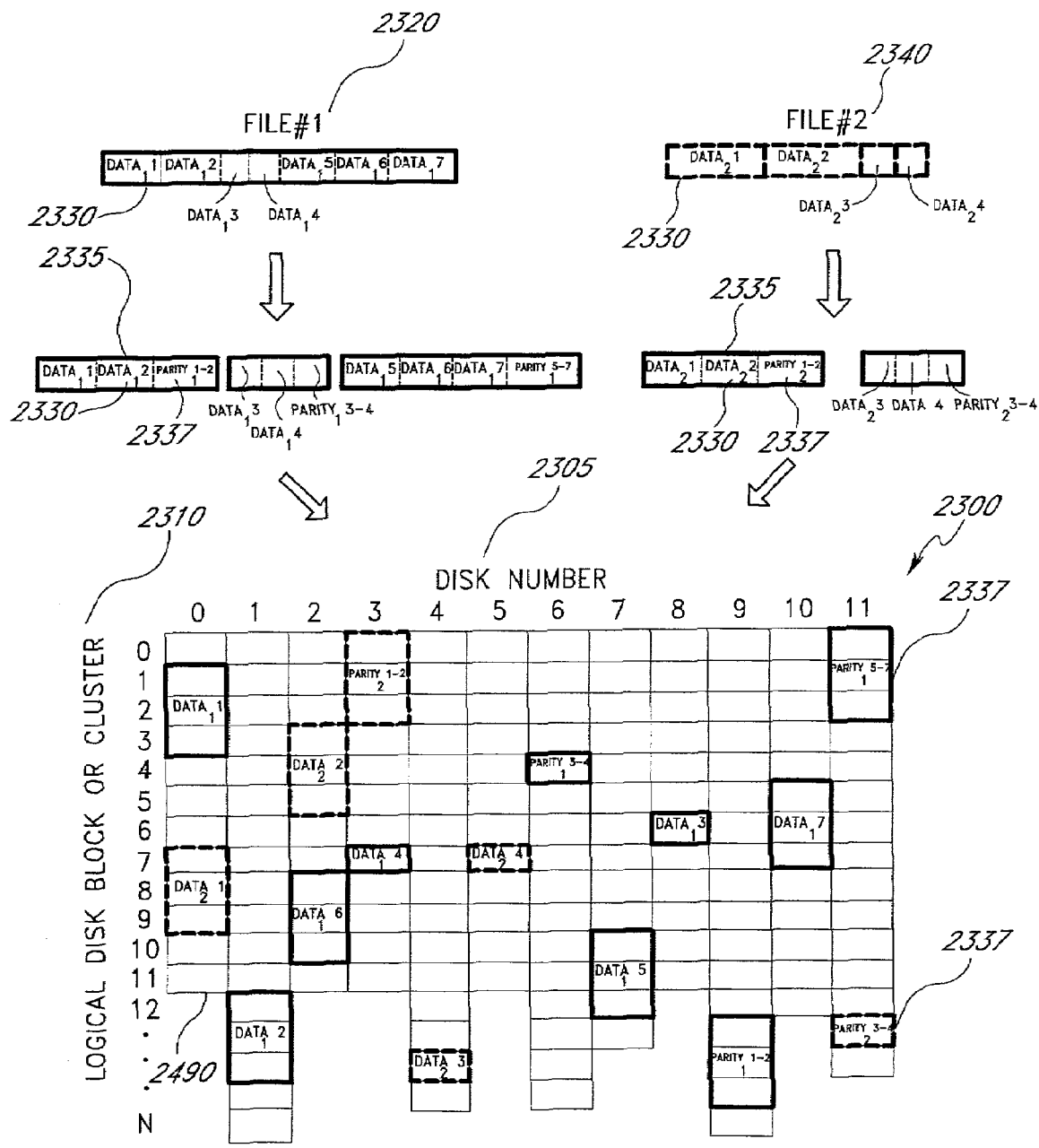
FIG. 25 illustrates another embodiment of a distributed file storage system having a variable capacity disk array.

FIG. 25 illustrates another embodiment of the distributed file storage system 100 using a variable capacity disk array. The variable capacity disk array incorporates a plurality of disks 2305 with potentially non-identical sizes whose space can be addressed and used for storing data blocks 2330 and parity blocks 2337. Unlike conventional RAID storage systems that are limited by the capacity of the smallest drive within the disk array, the variable capacity disk array can contain any number or combination of disks and is not limited to accessing an address space boundary 2490 denoted by the smallest drive in the array. Using similar methods as described previously in conjunction with FIGS. 23 and 24, the server 130 receives files 2320, 2340 and determines a parity group distribution for each file such that a plurality of data blocks 2330 and parity blocks 2337 are created. The data blocks 2330 and parity blocks 2337 are then distributed throughout the disk array 140 in such a manner so as to avoid storing more than one block 2330, 2337 from the same parity group 2335 on a single disk 2305. The server 130 stores of these blocks 2330, 2337 across all of the available disk space, and thus is able to access disk space that lies beyond the boundary 2490 defined by the smallest disk capacity (a typical storage boundary which limits conventional systems). As shown in FIG. 25, the distributed file storage system 100 stores both data blocks 2330 and parity blocks 2337 throughout the address space of each disk 2305 without boundary limitations imposed by other disks within the array 140.

In addition to improved space utilization, a number of other important features arise from the aforementioned flexible distribution of the blocks 2330, 2337. In one aspect, using variable capacity disks 2305 within the array 140 contributes to improved scalability and upgradeability of the distributed file storage system 100. For example, if the unused storage space within the array 140 fails below a desired level, one or more of the disks within the array 140 can be readily replaced by higher capacity disks. The distributed file storage system 100 implements an on-the-fly or "hot-swap" capability in which existing disks within the array 140 can be easily removed and replaced by other disks. Since each server in a cluster maintains a copy of the metadata for other servers in the cluster, servers can also be hot-swapped. Using this feature, a new higher capacity disk can be inserted into the array 140 in place of a lower capacity disk. The server 140 is designed to automatically incorporate the disk space of the newly inserted drive and can further restore data to the new drive that resided on the former smaller capacity drive. This feature of the distributed file storage system 100 provides for seamless integration of new disks into the array 140 and facilitates disk maintenance and upgrade requirements.

In addition to exchanging or swapping existing disks 2305 within the array 140, the server 130 can accommodate the addition of new disks directly into the array 140. For example, the disk array 140 containing the fixed number of disks 2305 can be upgraded to include one or more additional disks such that the total number of disk in the array is increased. The server 140 recognizes the additional disks and incorporates these disks into the addressable space of the distributed file storage system 100 to provide another way for upgrading each disk array 140.

In the examples shown above, both the swapping of disks to increase storage space and the incorporation of additional disks into the array is facilitated by the flexible block placement and addressing of disk space within the array 140. Unlike conventional systems that have a rigid architecture where the number of disks within each array is fixed and the addressable disk space is dictated by the smallest disk within the array, the distributed file storage system 100 accommodates many different disk array configurations. This flexibility is due, in part, to the manner in which the disk space is formatted, as well as, how the data is arranged and processed by the server 130.

In one aspect, the flexibility of the distributed file storage system 100 is improved through the use of parity groups 2335. In order to accommodate files with different characteristics, as well as, improve how information is distributed throughout the disk array 140, parity groups 2335 are formed with variable block numbers. The block number of the parity group is defined by the number of blocks 2330, 2337 within the group. For example, a parity group containing 4 data blocks is characterized as having a block number of 4. In a similar manner, a parity group containing a single data block is characterized as having a block number of 1. The block number of the parity group is one factor that determines the size of the parity group and additionally determines the information that will be used to form the parity block.

Figure 26A:
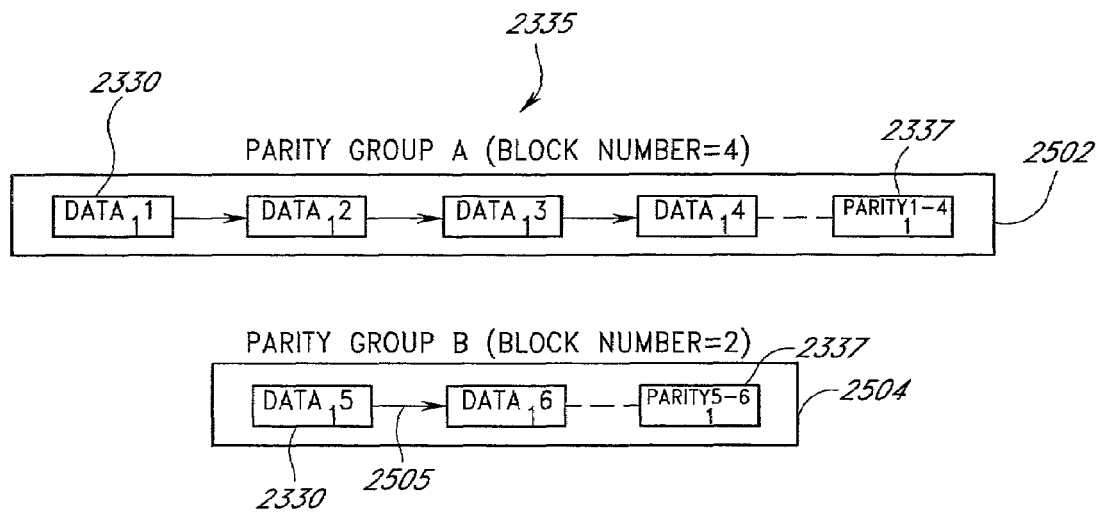
FIG. 26A illustrates an embodiment of variable block number parity groups.

FIG. 26A illustrates the formation of variable block number parity groups in the distributed file storage system 100. In the illustrated embodiment, exemplary parity groups 2502, 2504 are shown with different extents having 4 and 2 data blocks respectively. The server 130 determines the number of data blocks 2330 associated with each group 2502, 2504 and furthermore determines the distribution of each type of parity group having specific block numbers that make up the total parity group distribution in the disk array 140. This feature of the distributed file storage system 100 is discussed in connection with FIGS. 29 and 34.

Data organization and management by the server 130 is maintained using one or more data structures that contain information which identifies the size and ordering of the data blocks 2330 within each parity group 2502, 2504. In one embodiment, the ordering or sequence of the blocks 2330, 2337 is maintained through a linked list organizational schema. The linked list contains one or more pointers that act as links 2505 between each block 2330, 2337 within the parity group 2335. The links 2505 therefore allow the server 130 to maintain knowledge of the order of the blocks 2330, 2337 as they are distributed throughout the disk array 140. As blocks are written to or read from the disk array 140, the server 130 uses the links 2505 to identify the order of the blocks 2502, 2504 used for each parity group 2335.

Figure 26B:
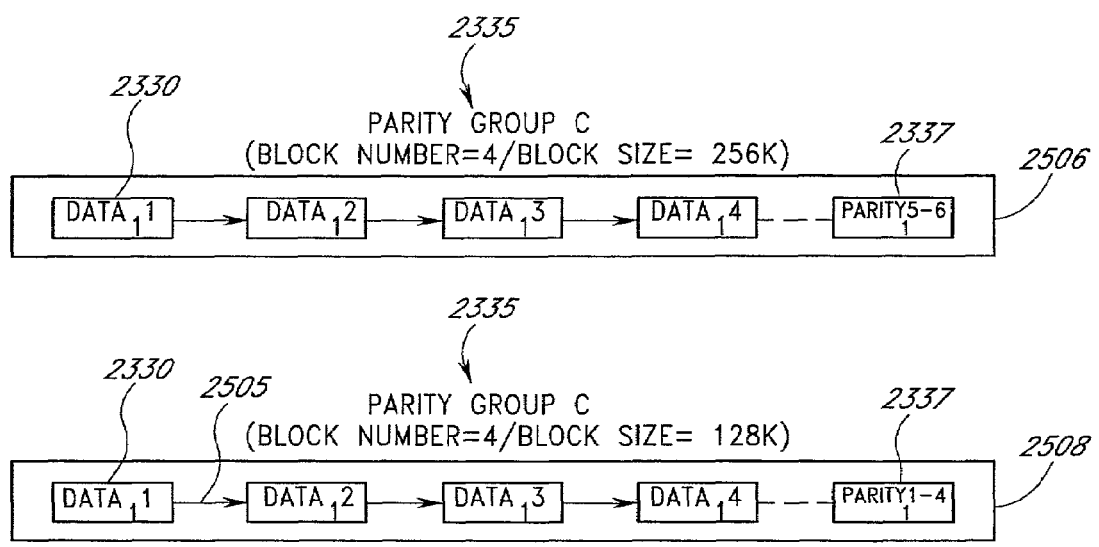
FIG. 26B illustrates an embodiment of variable size parity groups.

As shown in FIG. 26B, the distributed file storage system 100 can also allocate parity groups 2335 on the basis of block size. In the illustrated embodiment, exemplary parity groups 2506, 2508 are shown having the same block number of 4 with differing block sizes of 256K and 128K respectively. The feature of variable block size allocation within each parity group 2335 provides yet another way by which the server 130 can distribute data and information within the disk array 140 in a highly flexible and adaptable manner.

The implementation of parity groups having a plurality of different block numbers, as well as allowing for the use of different block sizes within each block, improves the ability of the server 130 to utilize available disk space within the array 140. Furthermore, using combinations of different data block and parity group characteristics allows the server to select combinations that are best suited for particular data types.

For example, large data files such as multimedia video or sound are well suited for storage using large parity groups that contain large block sizes. On the other hand, smaller files such as short text files do not have the same space requirements as the larger file types and thus do not significantly benefit from storage in a similar block size. In fact, when small files are stored in large blocks, there is the potential for wasted space, as the smaller file does not use all of the space allocated to the block. Therefore, the distributed file storage system 100, benefits from the ability to create data blocks 2330 and parity groups 2335 of variable sizes to accommodate different data types and permit their storage in a space-efficient manner.

As discussed in connection with FIGS. 14, the distributed file storage system 100 further improves the utilization of space within the disk array 140 by implementing a mechanism for reorganizing the allocation of data blocks as needed to accommodate data stored to the disk array 140. Furthermore, a redistribution function (shown in FIG. 36) can alter the composition or distribution of blocks 2330, 2337 or parity groups 2335 within the array 140 to make better use of available space and improve performance by reorganizing information previously written to the array 140.

In order to maintain coherence in the data stored to the disk array 140, knowledge of the size and ordering of each block within the parity group 2335 is maintained by the server 130. Prior to writing of data to the disk array 140, the server 130 creates a disk map that allocates all of the available space in the disk array 140 for storing particular blocks sizes and/or parity group arrangements. Space allocation information is maintained by the server 140 in a metadata structure known as a Gee Table. The Gee Table contains information used to identify the mapping and distribution of blocks within the disk array 140 and is updated as data is stored to the disks 2305.

The Gee Table stores informational groups which interrelate and reference disk blocks or other discrete space allocation components of the disk array 140. These informational groups, referred to as Gee-strings, contain disk space allocation information and uniquely define the location of files in the disk array 140. Each Gee-string is subdivided into one or more Gee-groups which is further divided into one or more Gees containing the physical disk space allocation information. The Gee-strings and components thereof are interpreted by the server 130 to define the mapping of parity groups 2335 in the disk array 140 which store information and files as will be discussed in greater detail hereinbelow.

Based on the available space within the disk array 140, the server 130 determines the type and number of parity groups 2335 that will be allocated in the array 140. The initial parity group allocation prior to data storage forms the Gee Table and directs the storage of data based on available parity groups. The Gee Table therefore serves as a map of the disk space and is updated as data is stored within the blocks 2330, 2337 of the array 140 to provide a way for determining the file allocation characteristics of the array 140. The server 130 retrieves stored files from the disk array 140 using the Gee Table as an index that directs the server 130 to the blocks 2330 where the data is stored so that they may be retrieved in a rapid and efficient manner.

FIG. 27 illustrates a portion of a Gee Table used to determine the mapping of parity groups 2335 in the disk array 140. For additional details of this architecture the reader is directed to sections which relate specifically to the implementation of the file system.

In one embodiment, space allocation in the disk array 140 is achieved using a Gee Table 2530 containing an index field 2532, a G-code field 2534, and a data field 2536. The index field 2532 is a value that is associated with a row of information or Gee 2538 within the Gee Table 2530 and is used as an index or a pointer into the array or list comprising the Gee Table 2530. Additionally, the index field 2532 uniquely identifies each Gee 2538 within the Gee Table 2530 so that it can be referenced and accessed as needed.

The G-Code field 2534 indicates the type of data that is stored in the disk space associated with each Gee 2538 and is further used to identify space allocation characteristics of the Gees 2538. During initialization of the disk array, the server 140 assigns all of the disk space within the array 140 to various parity groups 2335. These parity groups 2335 are defined by the block size for data and parity blocks 2330, 2337 and the number of data blocks within the group 2335. Identifiers in the G-Code field 2534 correspond to flags including "FREE", "AVAIL", "SPARE", "G-NODE", "DATA", "PARITY", "LINK", "CACHE-DATA", or CACHE-PARITY".

The data field 2536 stores data and information interpreted by the server 130 in a specific manner depending upon the G-code field identifier 2534. For example, this field can contain numerical values representing one or more physical disk addresses defining the location of particular blocks 2330, 2337 of the parity groups 2335. Additionally, the data field 2536 may contain other information that defines the structure, characteristics, or order of the parity blocks 2335. As will be described in greater detail hereinbelow, the information contained in the G-table 2530 is accessed by the server 130 and used to store and retrieve information from the disk array 140.

In one embodiment, the fields 2532, 2534, 2536 of the G-table 2530 map out how space will be utilized throughout the entire disk array 140 by associating each physical block address with the designated Gee 2538. Parity groups 2335 are defined by sets of contiguous Gees 2538 that are headed by the first Gee 2538 containing information that defines the characteristics of the parity group 2335. The G-Code field identifier "G-NODE" instructs the server 130 to interpret information in the data field 2536 of a particular Gee 2538 having the "G-NODE" identifier as defining the characteristics of a parity block 2335 that is defined by a G-group 2540.

A characteristic defined in the data field 2536 of the Gee 2538 having a "G-NODE" identifier includes an extent value 2542. The extent value 2542 represents the extent or size of the blocks 2330, 2337 associated with each Gee 2538 in a particular G-group 2540. The extent value 2542 further indicates the number of logical disk blocks associated with each file logical block 2330, 2337. For example, the Gee with an index of "45" contains the G-Code identifier "G-NODE" and has a value of "2" associated with the extent value. This extent value 2542 indicates to the server 130 that all subsequent data blocks and parity blocks defined in the parity group 2335 and represented by the G-group 2540 will have a size of 2 logical disk blocks. Thus, as indicated in FIG. 27, the Gees having indexes "46"–"49" are each associated with two logical addresses for drive blocks within the array 140. In a similar manner, the Gee 2538 with an index of "76" contains the G-Code identifier "G-NODE" and has an extent value of "3". This value indicates to the server 130 that the subsequent Gees "77"–"79" of the parity group are each associated with 3 physical drive block addresses.

In the preceding discussion of FIG. 27, information is organized into a single G-table however it will be appreciated that there are a number of different ways for storing the information to improve system flexibility including the use of multiple tables or data structures. The exact manner in which this information is stored is desirably designed to insure that it may be efficiently accessed. For example, in one embodiment nodes of the Gee Table 2530 can be utilized as a common storage vehicle for multiple types of metadata, including file names, identifiers (GNIDS), Gees, etc.

As discussed in connection with FIG. 29, other G-code identifiers are used during the storage and retrieval of information from the disk array 140. For example, another G-code identifier, "DATA", signifies that the data field 2536 of a particular Gee 2538 is associated with the physical address for one or more drive blocks that will store data. Likewise, the G-code identifier, "PARITY", signifies that the data field 2536 of a particular Gee is associated with the physical address for one or more drive blocks that store parity information. The parity information stored in the data blocks referenced by the "PARITY" Gee is calculated based upon the preceding "DATA" Gees as defined by the "G-NODE" Gee. Thus, as shown in the FIG. 27, the Gee 2538 having an index of "79" will store the physical address of disk blocks that contain parity information for data blocks specified by Gees having indexes "77"–"78".

Figure 28:
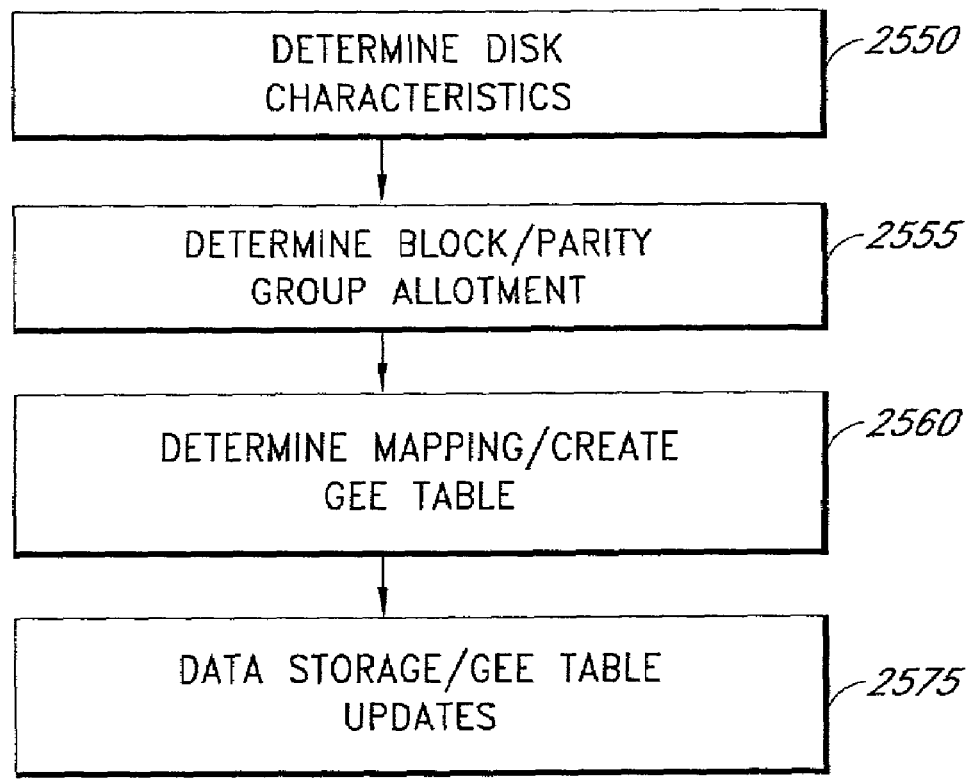
FIG. 28 illustrates a method for storing data in the distributed file storage system.

FIG. 28 illustrates a process 2448 used by the server 130 to prepare the disk array 140 for data storage. Preparation of the disk array 140 commences with the server 130 identifying the characteristics 2550 of each disk 2305 within the array 140 to determine the quantity of space available. In one embodiment, the server 130 identifies physical characteristics for the drives 2305 within the array 140. These characteristics can include: total drive number, individual drive size, sectors per disk, as well as other drive characteristics useful in determining the available space of the disk array 140. To facilitate the configuration of the array 140, the server 130 can automatically detect and recognize the presence of each disk 2305 within the array 140 and can electronically probe each disk 2305 to determine the drive characteristics. Alternatively, the server 130 can be programmed with information describing the array composition and drive characteristics without automatically determining this information from the array 140.

Upon acquiring the necessary information describing the array composition, the server 130 determines a parity group allotment 2555 to be used in conjunction with the available disk space. The parity group allotment 2555 describes a pool of available parity groups 2335 that are available for data storage within the array 140. The parity group allotment further describes a plurality of different block and/or parity group configurations each of which is suited for storing particular data and file types (i.e. large files, small files, multimedia, text, etc). During data storage, the server 130 selects from the available pool of parity groups 2335 to store data in a space-efficient manner that reduces wasted space and improves data access efficiency.

In one embodiment, the parity group allotment is determined automatically by the server 130 based on pre-programmed parity group distribution percentages in conjunction with available disk space within the array 140. Alternatively, the server 130 can be configured to use a specified parity group allotment 2555 that is provided to the server 130 directly. In another aspect, the parity groups can be allocated dynamically by the server based on file characteristics such as file size, access size, file type, etc.

Based on the allotment information and the disk space available in the array 140, the server 130 performs a mapping operation 2560 to determine how the parity groups 2335 of the allotment will be mapped to physical block addresses of drives 2305 within the array 140. The mapping operation 2560 comprises determining a desirable distribution of parity groups 2335 on the basis of their size and the available space and characteristics of the disk array 140. As the distribution of parity groups 2335 is determined by the server 130, the G-table 2530 is created and populated with Gees 2538 which associate each available parity group 2335 with the physical block addresses defining their location on one or more disks 2305 in the disk array 140. Initially, the G-table 2530 describes parity groups 2335 that contain free or available space, however, as data is stored to the disk 2575, the G-table is updated to reflect the contents of the physical disk blocks that are pointed to by the Gees 2538.

During operation of the distributed file storage system 100, the G-table 2530 is accessed by the server 130 to determine the logical addresses of files and information stored within the disk array 140. Furthermore, server 130 continually updates the G-table 2530 as information is saved to the disk array 140 to maintain knowledge of the physical location of the information as defined by the logical block addresses. The dynamically updated characteristics of the G-Table 2530 data structure therefore define and maintain the mapping of data and information in the disk array 140.

In addition to the aforementioned a priori method of parity group allocation other methods of disk preparation may also be utilized. For example, another method of disk preparation can use a set of free disk block maps to allow dynamic allocation of the parity groups. This method additionally provides mechanisms for dynamic extension of existing parity groups and includes logic to ensure that the disk does not become highly fragmented. In some instances, fragmentation of the disk is undesirable because it reduces the ability to use long parity groups when mapping and storing information to the disk.

Figure 29:
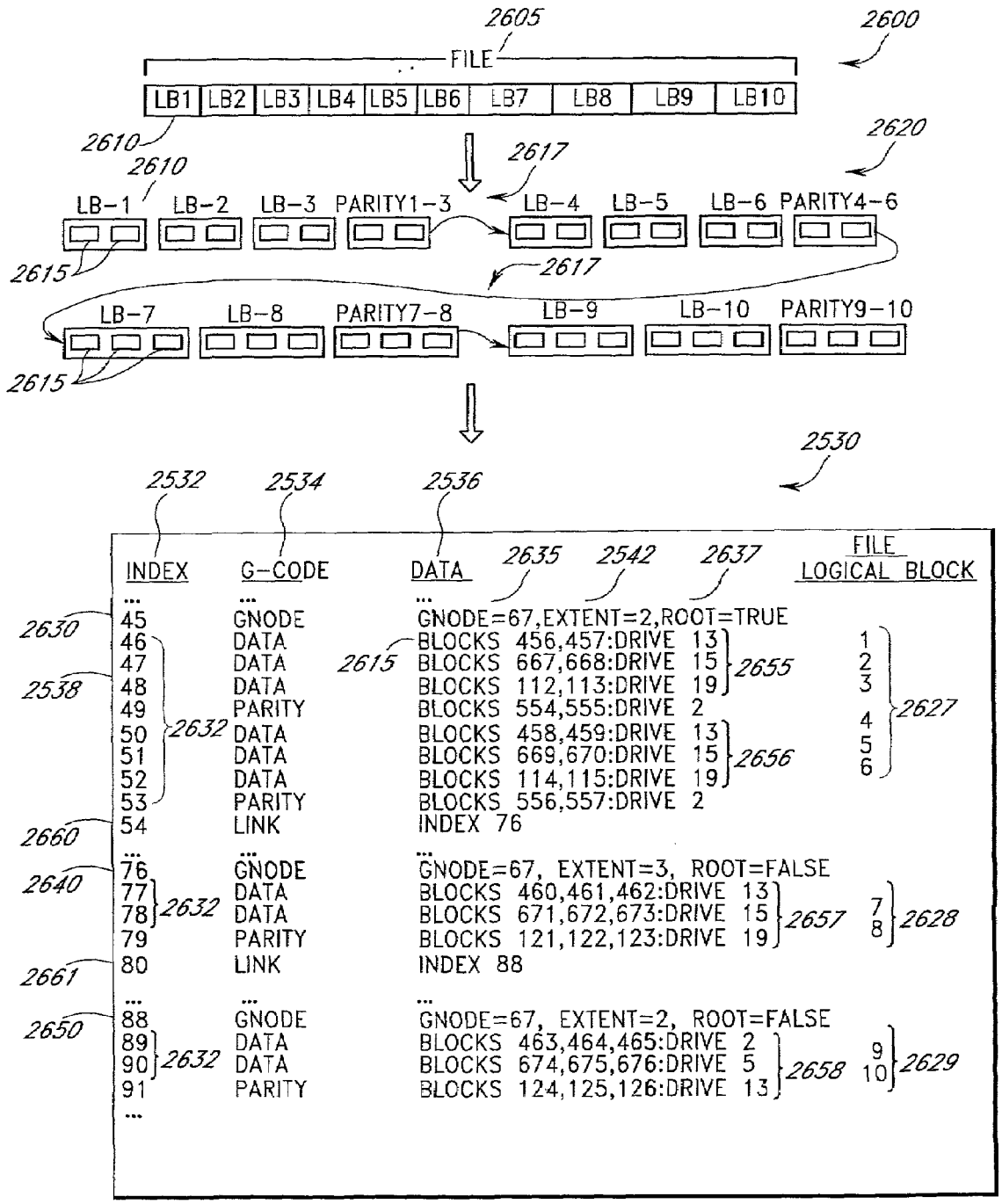
FIG. 29 illustrates another embodiment of a G-table mapping structure.

FIG. 29 illustrates one embodiment of a file storage schema 2600 that uses the aforementioned parity group arrangements 2335 and G-table 2530 to store information contained in an exemplary file 2605. The file 2605 contains information coded by an electronic byte pattern that is received by the server 130 during client storage requests. In the storage schema 2600, the file 2605 is divided into one or more file logical blocks 2610 for storage. Each file logical block 2610 is stored in a cluster of one or more disk logical blocks 2615 in the disk array 140. As previously indicated, the distributed file storage system 100 retains many of the advantages of conventional storage systems, including the distribution of files across multiple disk drives and the use of parity blocks to enhance error checking and fault tolerance. However, unlike many conventional systems, the distributed file storage system 100 does not restrict file logical blocks to one uniform size. File logical blocks of data and parity logical blocks can be the size of any integer multiple of a disk logical block. This variability of file logical block size increases the flexibility of allocating disk space and thus improves the use of system resources.

Referring to FIG. 29, the file 2605 is divided into a plurality of file logical blocks 2610, each of which contains a portion of the information represented in the file 2605. The number, size, and distribution of the file logical blocks 2610 is determined by the server 130 by selecting available disk logical blocks 2615 designated in the G-table 2530. The information contained in each file logical block 2610 is stored within the disk logical blocks 2615 and mapped using the G-table 2530. In the distributed file storage system 100, the size of each file logical block 2610 is described by the extent value 2542 which is an integer multiple in disk logical blocks 2615. For example, the logical block designated "LB-1" comprises two disk logical blocks 2615 and has an extent value of 2. In a similar manner, the logical block designated "LB-7" comprises three disk logical blocks 2615 and has an extent value of 3.

The server 130 forms parity groups 2335 using one or more file logical blocks 2615 and the associated parity block 2337. For each file 2605, one or more parity groups 2335 are associated with one another and ordered through logical linkages 2617 (typically defined by pointers) used to determine the proper ordering of the parity groups 2335 to store and retrieve the information contained in the file 2605. As shown in the illustrated embodiment, the file 2605 is defined by a parity string 2620 containing four parity groups 2610. The four parity groups are further linked by three logical linkages 2617 to designate the ordering of the logical blocks "LB-1" through "LB-10" which make up the file 2605.

The G-table 2530 stores the information defining the G-string 2620 using a plurality of indexed rows defining Gees 2538. The Gees 2538 define the characteristics of the G-strings 2620 and further describe the logical location of the associated file 2605 in the disk array 140. In the G-table 2530, the G-string 2620 is made up of the one or more Gee-groups. Each G-group is a set of contiguous Gees 2538 that all relate to a single file. For example, in the illustrated embodiment, the Gee-string 2620 includes three Gee-groups 2627, 2628, and 2629.

The first Gee in each G-group 2627–2629 is identified by the G-Code field identifier "G-NODE" and the data field 2536 of this Gee contains information that defines the characteristics of a subsequent Gee 2632 within the Gee-group 2627–2629. The data field 2536 of the first Gee in each G-group 2627–2629 further contains information that determines the ordering of the Gee-groups 2627–2629 with respect to one another. Some of the information typically found in the data field 2536 of the first Gee in each G-group 2627–2629 includes: A G-NODE reference 2635 that relates the current G-group with a file associated with a G-node at a particular index ("67" in the illustration) in the G-table 2530; the extent value 2542 that defines the size of each file logical block 2610 in terms of disk logical blocks 2615; and a root identifier 2637 that indicates if the G-group is the first G-group in the G-string. Of a plurality of G-NODE Gees 2630, 2640, 2650, only the first Gee 2630 contains an indication that it is a Root Gee, meaning that it is the first Gee of the Gee-string 2620.

Following the G-NODE Gee in a Gee-group are Gees representing one or more distributed parity groups 2655–2658. A distributed parity group is set of one or more contiguous DATA Gees followed by an associated PARITY Gee. A DATA Gee is a Gee with the G-code 2534 of "DATA" that lists disk logical block(s) where a file logical block is stored. For example, in FIG. 29, the Gees with indexes of 46–47, 50–52, 77–79 and 89–90 are all DATA Gees, and each is associated with one file logical block 2610.

A PARITY Gee is a Gee with the G-code 2534 of "PARITY." Each PARITY Gee lists disk logical block location(s) for a special type of file logical block that contains redundant parity data used for error checking and error correcting one or more associated file logical blocks 2610. A PARITY Gee is associated with the contiguous DATA Gees that immediately precede the PARITY Gee. The sets of contiguous DATA Gees and the PARITY Gees that follow them are known collectively as distributed parity groups 2655–2658.

For example, in FIG. 29, the PARITY Gee at index 49 is associated with the DATA Gees at indexes 46–48, and together they form the distributed parity group 2655. Similarly, the PARITY Gee at index 53 is associated with the DATA Gees at indexes 50–52, and together they form the distributed parity group 2656. The PARITY Gee at index 79 is associated with the DATA Gees at indexes 77–78, which together form the distributed parity group 2657, and the PARITY Gee at index 91 is associated with the DATA Gees at indexes 89–90, which together form the distributed parity group 2658.

The size of a disk logical block cluster described by a DATA Gee or a PARITY Gee matches the extent listed in the previous G-NODE Gee. In the example of FIG. 29, the G-NODE Gee 2630 of the first Gee-group 2627 defines an extent size of 2, and each DATA and PARITY Gee of the two distributed parity groups 2655, 2656 of the Gee-group 2627 lists two disk logical block locations. Similarly, G-NODE Gee 2640 of the second Gee-group 2628 defines an extent size of 3, and each DATA and PARITY Gee of the Gee-group 2628 lists three disk logical block locations. G-NODE Gee 2650 of the third Gee-group 2629 defines an extent size of 3, and each DATA and PARITY Gee of the Gee-group 2629 lists three disk logical block locations.

If a Gee-group is not the last Gee-group in its Gee-string, then a mechanism exists to link the last Gee in the Gee-group to the next Gee-group of the Gee-string using the logical linkages 2617. LINK Gees 2660, 2661 both have the G-code 2534 of "LINK" and a listing in their respective Data fields 2536 that provides the index of the next Gee-group of the Gee-string 2620. For example, the Gee with an index of 54 is the last Gee of Gee-group 2627, and its Data field 2536 includes the starting index "76" of the next Gee-group 2628 of the Gee-string 2620. The Gee with an index of 80 is the last Gee of Gee-group 2628, and its Data field 2536 includes the starting index "88" of the next Gee-group 2629 of the Gee-string 2620. Since the Gee-group 2629 does not include a LINK Gee, it is understood that Gee-group 2629 is the last Gee-group of the Gee-string 2620.

As previously indicated, the G-code 2534 of "FREE" (not shown in FIG. 29) indicates that the Gee has never yet been allocated and has not been associated with any disk logical location(s) for storing a file logical block. The G-code 2534 of "AVAIL" (not shown in FIG. 29) indicates that the Gee has been previously allocated to a cluster of disk logical block(s) for storing a file logical block, but that the Gee is now free to accept a new assignment. Two situations in which a Gee is assigned the G-code of "AVAIL" are: after the deletion of the associated file logical block; and after transfer of the file to another server in order to optimize load balance for the distributed file storage system 100.

Figure 30:
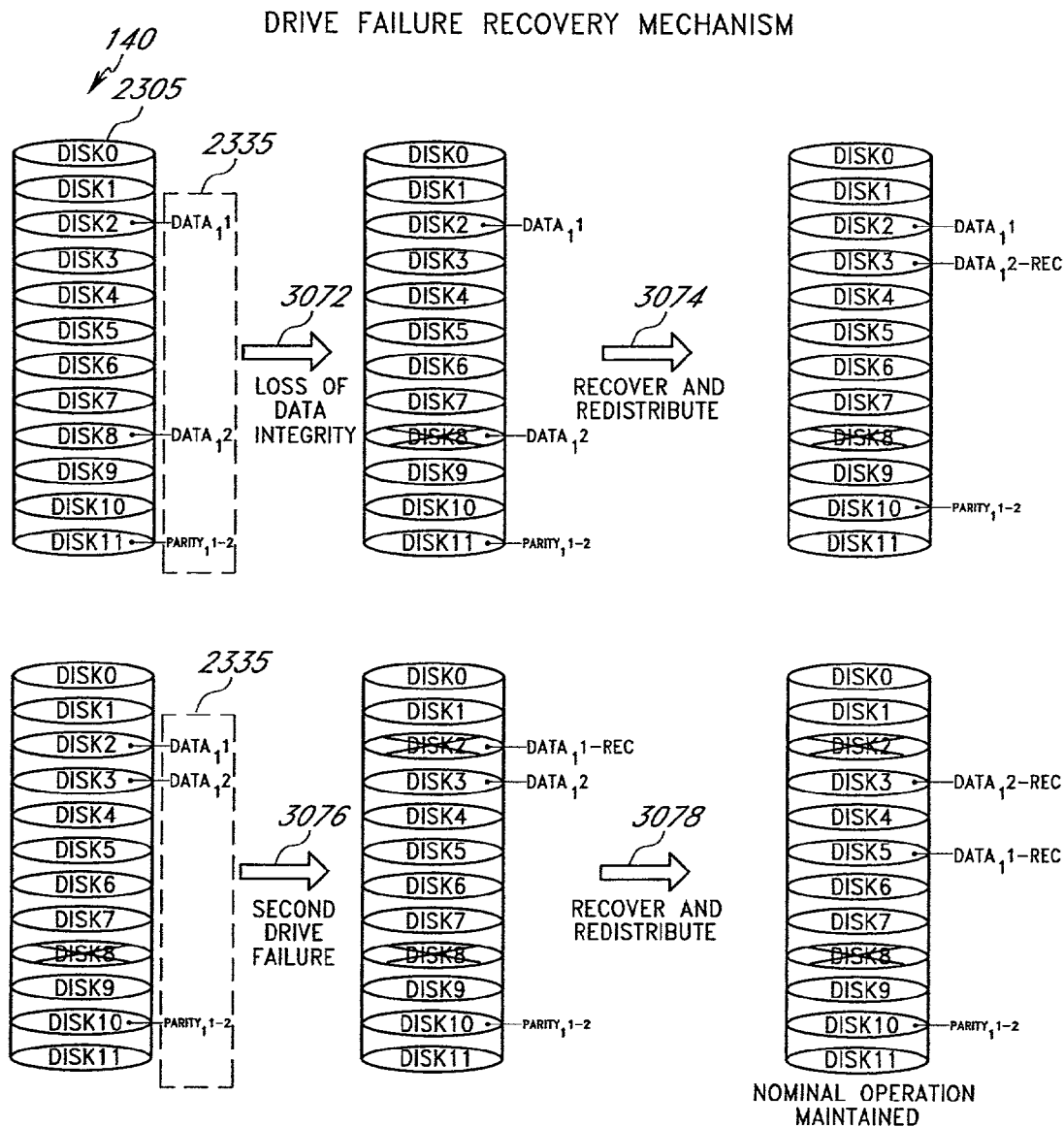
FIG. 30 illustrates one embodiment of a fault-tolerant restoration process.

FIG. 30 illustrates a fault recovery mechanism 700 used by the distributed file storage system 100 to maintain data consistency and integrity when a data fault occurs. Data faults are characterized by corruption or loss of data or information stored in one or more logical blocks 2330 of the array 140. Each data fault can be further characterized as a catastrophic event, where an entire disk 2305 fails requiring all data on the failed disk to be reconstructed. Alternatively, the data fault can be characterized as a localized event, where the disk 2305 maintains operability but one or more physical disk sectors or logical blocks become corrupted or damaged. In either instance of the data fault, the distributed file storage system 100 uses a fault-tolerant restoration process to maintain data integrity.

FIG. 30 illustrates one embodiment of a fault-tolerant restoration process used to maintain data integrity in the distributed file storage system 100. As an example of how the process operates, a loss of integrity in a data block for a single parity group is shown. It will be appreciated that this loss of integrity and subsequent recovery methodology can be applied to both instances of complete drive failure or localized data corruption. Thus, the restoration of information contained in a plurality of logical blocks can be accomplished using this process (i.e. restoring all data stored on a failed disk). Additionally, in instances where parity blocks become corrupted or lost, the information from each parity block can be restored in a similar manner to the restoration process for data blocks using the remaining non-corrupted blocks of the parity group.

In the illustrated embodiment the parity group 2335 includes two data blocks "$DATA_1 1$" and "$DATA_1 2$" and an associated parity block "$PARITY_1 1-2$" and are shown stored on "DISK 2", "DISK 8", and "DISK 11" respectively. Knowledge of the logical disk addresses for each of these blocks is maintained by the server 130 using the aforementioned G-table 2530. As previously discussed, the G-table maintains mapping and structural information for each parity group defined by the plurality of Gees 2538. The Gees further contain information including; the file descriptor associated with the blocks of the parity group 2335, the size and extent of the blocks of the parity group 2335, and the mapping to the logical disk space for each block of the parity group 2335. During routine operation, the server accesses data in the disks of the array using the G-table 2530 to determine the appropriate logical disk blocks to access.

As shown in FIG. 30, a complete disk failure is exemplified where a loss of data integrity 3072 results in the logical blocks on "DISK 8" becoming inaccessible or corrupted. During the fault tolerant restoration process the server 130 determines that the data block "$DATA_1 2$" is among the one or more blocks that must be recovered 3074. Using conventional data/parity block recovery methods, the server 130 recovers the compromised data block "$DATA_1 2$" using the remaining blocks "$DATA_1 1$" and "$PARITY_1 1-2$" of the associated parity group 2335. The recovered data block "$DATA_1 2$-REC" is then stored to the disk array 140 and contains the identical information that was originally contained in "$DATA_1 2$". Using the existing G-table mapping as a reference, the server 130 identifies a new region of disk space that is available for storing the recovered data block and writes the information contained in "$DATA_1 2$-REC" to this region. In one embodiment, space for a new parity group is allocated and the reconstructed parity group is stored in the new space. In another embodiment, the "old" parity group having 1 parity block and N data blocks where one data block is bas, is entered onto the free list as a parity group having N–1 data blocks. The server 130 further updates the G-table 2530 to reflect the change in logical disk mapping (if any) of the recovered data block "$DATA_1 2$-REC" to preserve file and data integrity in the disk array 140.

One desirable feature of the distributed file storage system 100 is that the recovered data block need not be restored to the same logical disk address on the same disk where the data failure occurred. For example, the recovered data block "$DATA_1 2$-REC" can be stored to "DISK 3" and the G-table updated to reflect this change in block position. An important benefit resulting from this flexibility in data recovery is that the disk array 140 can recover and redistribute data from a failed drive across other available space within the disk array 140. Therefore, a portion of a disk or even an entire disk can be lost in the distributed file storage system 100 and the data contained therein can be recovered and moved to other locations in the disk array 140. Upon restoring the data to other available disk space, the server 130 restores the integrity of the parity group 2335 resulting in the preservation of fault-tolerance through multiple losses in data integrity even within the same parity group without the need for immediate repair or replacement of the faulted drive to restore fault-tolerance.

As an example of the preservation of fault tolerance through more than one data fault, a second drive failure 3076 is shown to occur on "DISK 2" and affects the same parity group 2335. This disk failure occurs subsequent to the previous disk failure in which "DISK 8" is illustrated as non-operational. The second disk failure further results in the loss of data integrity for the block "$DATA_1 1$". Using the method of data recovery similar to that described above, the information contained in the data block "$DATA_1 1$" can be recovered and redistributed 3078 to another logical address within the disk array 140. The recovered data block "$DATA_1 1$-REC" is illustrated as being saved to available disk space located on "DISK 5" and is stored in a disk region free of corruption of data fault. Thus, fault tolerance is preserved by continuous data restoration and storage in available non-corrupted disk space.

The fault tolerant data recovery process demonstrates an example of how the distributed file storage system 100 handles data errors or corruption in the disk array 140. An important distinction between this system 100 and conventional storage systems is that the aforementioned data recovery process can automatically redistribute data or parity blocks in a dynamic and adaptable manner. Using block redistribution processes described above results in the distributed file storage system 100 having a greater degree of fault-tolerance compared to conventional storage systems. In one aspect, the increase in fault tolerance results from the system's ability to continue normal operation even when one or more drives experience a data loss or become inoperable.

In conventional storage systems, when a single disk failure occurs, the storage system's fault tolerant characteristics are compromised until the drive can be repaired or replaced. The lack of ability of conventional systems to redistribute data stored on the faulted drive to other regions of the array is one reason for their limited fault tolerance. In these conventional systems, the occurrence of a second drive failure (similar to that shown in FIG. 30) will likely result in the loss or corruption of data that was striped across both of the failed drives. The distributed file storage system 100 overcomes this limitation by redistributing the data that was previously stored on the faulted drive to a new disk area and updating the G-table which stores the mapping information associated with the data to reflect its new position. As a result, the distributed file storage system 100 is rendered less susceptible to sequential drive faults even if it occurs within the same parity group. Thus, the process of recovery and redistribution restores the fault-tolerant characteristics of the distributed file storage system 100 and beneficially accommodates further drive failures within the array 140.

Another feature of the distributed file storage system 100 relates to the flexible placement of recovered data. In one aspect, a recovered data block may be stored anywhere in the DFSS through a modification of the parity group associated with the data. It will be appreciated that placement of recovered data in this manner is relatively simple and efficient promoting improved performance over conventional systems.

In one embodiment, this feature of tolerance to multiple disk failures results in an improved "hands-off" or "maintenance-free" data storage system where multiple-drive failures are tolerated. Furthermore, the distributed file storage system 100 can be configured with the anticipation that if data corruption or a drive failure does occur, the system 100 will have enough available space within the array 140 to restore and redistribute the information as necessary. This improved fault tolerance feature of the distributed file storage system 100 reduces maintenance requirements associated with replacing or repairing drives within the array. Additionally, the mean time between failure (MTBF) characteristics of the system 100 are improved as the system 100 has reduced susceptibility to sequential drive failure or data corruption.

In one embodiment the distributed file storage system is desirably configured to operate in a "hands-off" environment where the disk array incorporates additional space to be tolerant of periodic data corruption or drive failures without the need for maintenance for such occurrences. Configuration of the system 100 in this manner can be more convenient and economical for a number of reasons such as: reduced future maintenance costs, reduced concern for replacement drive availability, and reduced downtime required for maintenance.

In one aspect, the fact that parity groups may be integrated with the file metadata provides a way for prioritizing recovery of the data. For example, when some file or set of files is designated as highly important, or is frequently accessed, a background recovery process can be performed on those designated files first. In the case where the file is frequently accessed, this feature may improve system performance by avoiding the need for time-consuming on-demand regeneration when a client attempts to access the file. In the case where the file is highly important, this feature reduces the amount of time where a second drive failure might cause unrecoverable data loss.

Figure 31:
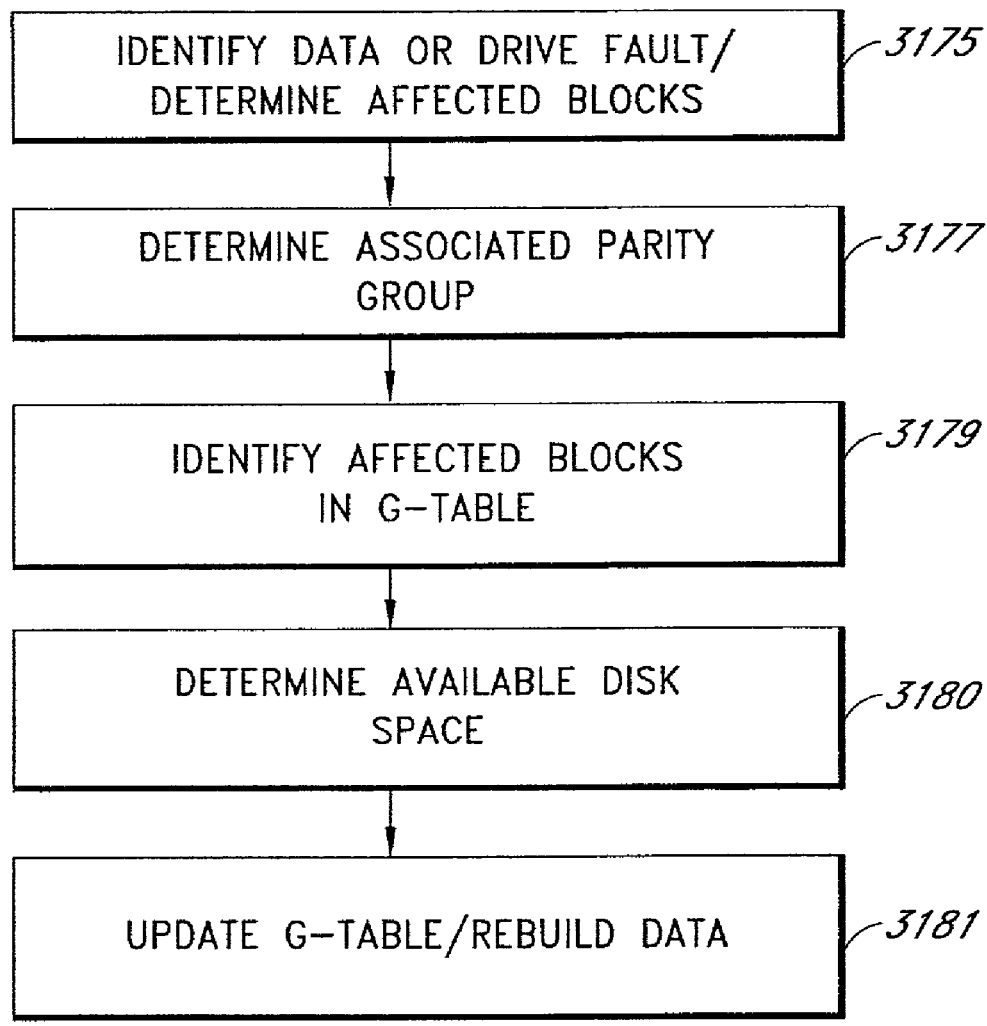
FIG. 31 illustrates a method for recovering corrupted or lost data in the distributed file storage system.

FIG. 31 illustrates one embodiment of a method 3172 for recovering corrupted or lost data resulting from one or more data faults. As discussed above and shown the previous figure, data corruption can occur as a result of a complete drive failure or data corruption can be localized and affect only a limited subset of logical storage blocks within the array. The distributed storage system identifies the presence of data corruption in a number of ways. In one aspect, the server recognizes corrupted data during storage or retrieval operations in which the one or more of the disks of the array are accessed. These operations employ error checking routines that verify the integrity of the data being stored to or retrieved from the array. These error checking routines typically determine checksum values for the data while performing the read/write operation to insure that the data has been stored or retrieved in a non-corrupted manner. In cases where the read/write operation fails to generate a valid checksum value, the read/write operation may be repeated to determine if the error was spurious in nature (oftentimes due to cable noise or the like) or due to a hard error where the logical disk space where the data is stored has become corrupted.

Data corruption may further be detected by the server 130 when one or more disks 2305 within the array 140 become inaccessible. Inaccessibility of the disks 2305 can arise for a number of reasons, such as component failure within the drive or wiring malfunction between the drive and the server. In these instances where one or more disks within the array are no longer accessible, the server 130 identifies the data associated with the inaccessible drive(s) as being corrupted or lost and requiring restoration.

During the identification of the data fault 3175, the number and location of the affected logical blocks within the disk array 140 is determined. For each logical block identified as corrupted or lost, the server 130 determines the parity group associated with the corrupted data 3177. Identification of the associated parity group 2335 allows the server 130 to implement restoration procedures to reconstruct the corrupted data using the non-corrupted data and parity blocks 2330, 2337 within the same parity group 2335.

Furthermore, the logical storage block or disk space associated with the corrupted data is identified 3179 in the G-table 2530 to prevent further attempts to use the corrupted disk space.

In one embodiment, the server 130 identifies the "bad" or corrupted logical blocks mapped within the G-table 2530 and removes the associated Gees from their respective parity groups thereby making the parity group shorter. Additionally, the server 130 can identify corrupted logical blocks mapped within the G-table 2530 and remap the associated parity groups to exclude the corrupted logical blocks.

Prior to restoring the information contained in the affected logical blocks, the server 130 determines the number and type of parity groups that are required to contain the data 3180 that will subsequently be restored. This determination 3180 is made by accessing the G-table 2530 and identifying a suitable available region within the disk array 140 based on parity group allocation that can be used to store the reconstructed data. When an available parity group is found, the server 130 updates the G-table 2530 to reflect the location where the reconstructed data will be stored. Additionally, the mapping structure of the array 140 is preserved by updating the links or references contained in Gees 2538 of the G-table 2530 to reflect the position and where the reconstructed data will be stored in relation to other parity groups of the parity string. Data is then restored 3181 to the logical disk address pointed to by the updated Gee using the remaining non-corrupted blocks of the parity group to provide the information needed for data restoration.

As previously discussed, one feature of the distributed file storage system 100 is the use of variable length and/or variable extent parity groups. Unlike conventional storage systems that use only a fixed block size and configuration when storing and striping data to a disk array, the system 100 of the present invention can store data in numerous different configurations defined by the parity group characteristics. In one embodiment, by using a plurality of different parity group configurations, the distributed file storage system 100 can improve the efficiency of data storage and reduce the inefficient use of disk space.

Figure 32A:
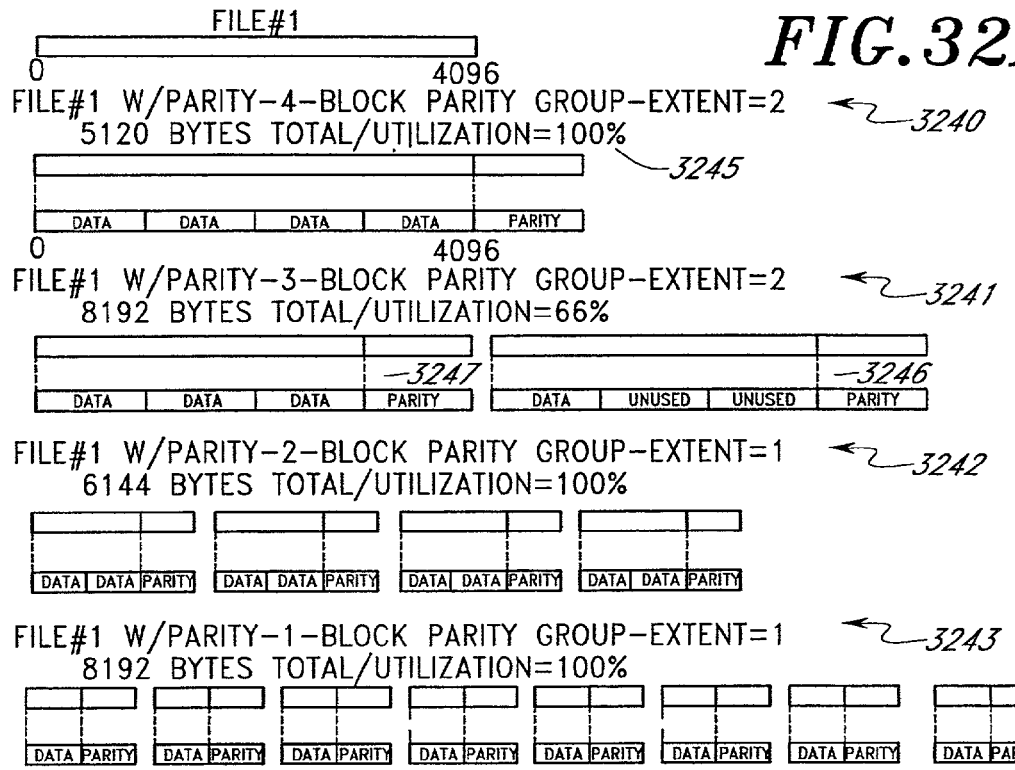
FIG. 32A illustrates one embodiment of a variably sized parity group used to store files.

FIGS. 32A, B illustrate a simplified example of the use of variably sized parity groups to store files with different characteristics. As shown in FIG. 32A, File #1 comprises a 4096 byte string that is stored in the disk array 140. As previously discussed, the server 130, selects space from the plurality of parity groups 2335 having different structural characteristics to store the data contained in File #1. In the illustrated embodiment, 4 exemplary parity strings 3240–3243 are considered for storing File #1. Each of the parity strings 3240–3243 comprises one or more parity groups 2335 that have a designated extent based on a logical disk block size of 512 bytes. The parity groups 2335 of each parity string 3240–3243 are further associated using the G-table 2530 which link the information in the parity groups 2335 to encode the data contained in File #1.

The first parity string 3240 comprises a single 4-block parity group having 1024-byte data and parity blocks. The total size of the first parity string 3240 including all data and parity blocks is 5120 bytes and has an extent value of 2. The second parity string 3241 comprises two 3-block parity groups having 1024-byte data and parity blocks. The total size of the second parity string 3241 including the data and parity blocks is 8192 bytes and has an extent value of 2. The third parity string 3242 comprises four 2-block parity groups having 512-byte data and parity blocks. The total size of the third parity string 3242 including the data and parity blocks is 6144 bytes and has and extent value of 1. The fourth parity string 3243 comprises nine 1-block parity groups having 512-byte data and parity blocks. The total size of the fourth parity string 3243 including the data and parity blocks is 8192 bytes and has an extent of 1.

Each of the parity strings 3240–3243 represent the minimum number of parity groups 2335 of a particular type or composition that can be used to fully store the information contained in File #1. One reason for the difference in parity group composition results from the different numbers of total bytes required to store the data contained in File #1. The differences in total byte numbers further result from the number and size of the parity blocks 2337 associated with each parity group 2335.

A utilization value 3245 is shown for each parity string 3240–3242 used to store File #1. The utilization value 3245 is one metric that can be used to measure the relative efficiency of storage of the data of File #1. The utilization value 3245 is determined by the total number of bytes in the parity string 3240–3242 that are used to store the data of File #1 compared to the number of bytes that are not needed to store the data. For example, in the second parity string 3241, one parity group 3247 is completely occupied with data associated with File #1 while another parity group 3246 is only partially utilized. In one aspect, the remainder of space left in this parity group 3246 is unavailable for further data storage due to the composition of the parity group 3246. The utilization value is calculated by dividing the file-occupying or used byte number by the total byte number to determine a percentage representative of how efficiently the data is stored in the parity string 3240–3243. Thus, the utilization values for the first, second, third, and fourth parity strings 3240–3243 are 100%, 66%, 100%, and 100% respectively.

In one embodiment, the server 130 determines how to store data based on the composition of the file and the availability of the different types of parity groups. As shown in FIG. 32A, of the different choices for storing File #1, the first parity string 3240 is most efficient as it has the lowest total bytes required for storage (5120 bytes total), as well as, a high utilization value (100%). Each of the other parity strings 3241–3243 are less desirable for storing the data in File #1 due to greater space requirements (larger number of total bytes) and in some cases reduced storage efficiency (lower utilization value).

Figure 32B:
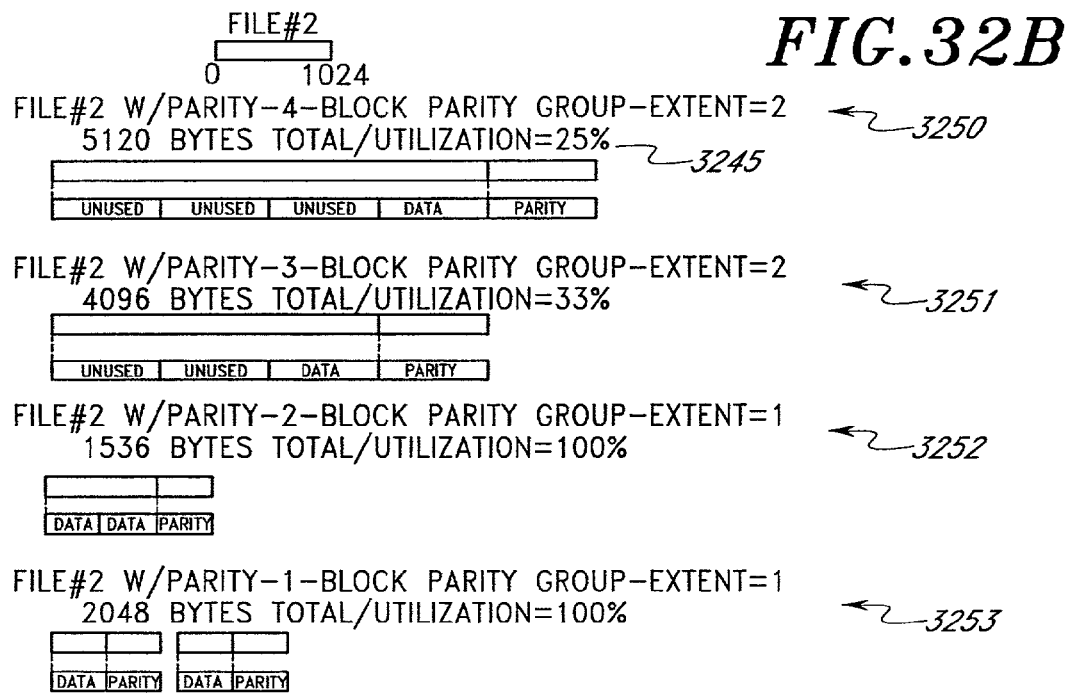
FIG. 32B illustrates another embodiment of a variably sized parity group used to store files.

FIG. 32B illustrates another simplified example of the use of variably sized parity groups to store files of differing sizes. In the illustrated embodiment the storage characteristics of a plurality of four parity strings 3250–3253 are compared for a small file comprising a single 1024 byte string. The parity strings comprise: The first parity string 3250 composed of the single parity group 2335 having 4 data blocks 2330 and 1 parity block 2337, each 1024 bytes in length; The second parity string 3251 composed of the single parity group 2335 having 3 data blocks 2330 and 1 parity block 2337, each 1024 bytes in length; The third parity string 3251 composed of the single parity group 2335 having 2 data blocks 2330 and 1 parity block 2337, each 512 bytes in length; and The fourth parity string 3253 having two parity groups 2335 each composed of the single 512-byte data block 2330 and the parity block 2337.

When storing the byte pattern contained in File #2 different storage characteristics are obtained for each parity string 3250–3253. For example, the first parity string 3250 is only partially occupied by the data of File #2 resulting in the utilization value 3245 of 25%. Similarly, the second parity string 3251 is also partially occupied resulting in the utilization value 3245 of 33%. Conversely, the third and fourth parity strings 3252–3253 demonstrate complete utilization of the available space in the parity group (100% percent utilization). Based on the exemplary parity group characteristics given above, the most efficient storage of File #2 is achieved using the third parity string 3252 where a total of 1536 bytes are allocated to the parity string with complete (100%) utilization.

The aforementioned examples demonstrate how files with differing sizes can be stored in one or more parity group configurations. In each of the above examples, the unused blocks or partially filled blocks remaining in the parity group are "zero-filled" or "one-filled" to complete the formation of the parity group and encode the desired information from the file. Furthermore, by providing a plurality of parity group configurations, improved storage efficiency can be achieved for different file sizes where less space is left unutilized within the disk array 140. It will be appreciated by one of skill in the art that many possible parity group configurations can be formed in a manner similar to those described in FIGS. 32A, B. Examples of characteristics which may influence the parity group configuration include: logical block size, extent, parity group size, parity group number, among other characteristics of the distributed file storage system 100. Therefore, each of the possible variations in parity group characteristics and distribution should be considered but other embodiments of the present invention.

Typically, one or more selected parity groups of the available configurations of parity groups provide improved storage efficiency for particular file types. Therefore, in order to maintain storage efficiency across each different file configuration a plurality of parity group configuration are desirably maintained by the server. One feature of the distributed file storage system 100 is to identify desirable parity group configurations based on individual file characteristics that lead to improved efficiency in data storage.

Figure 33:
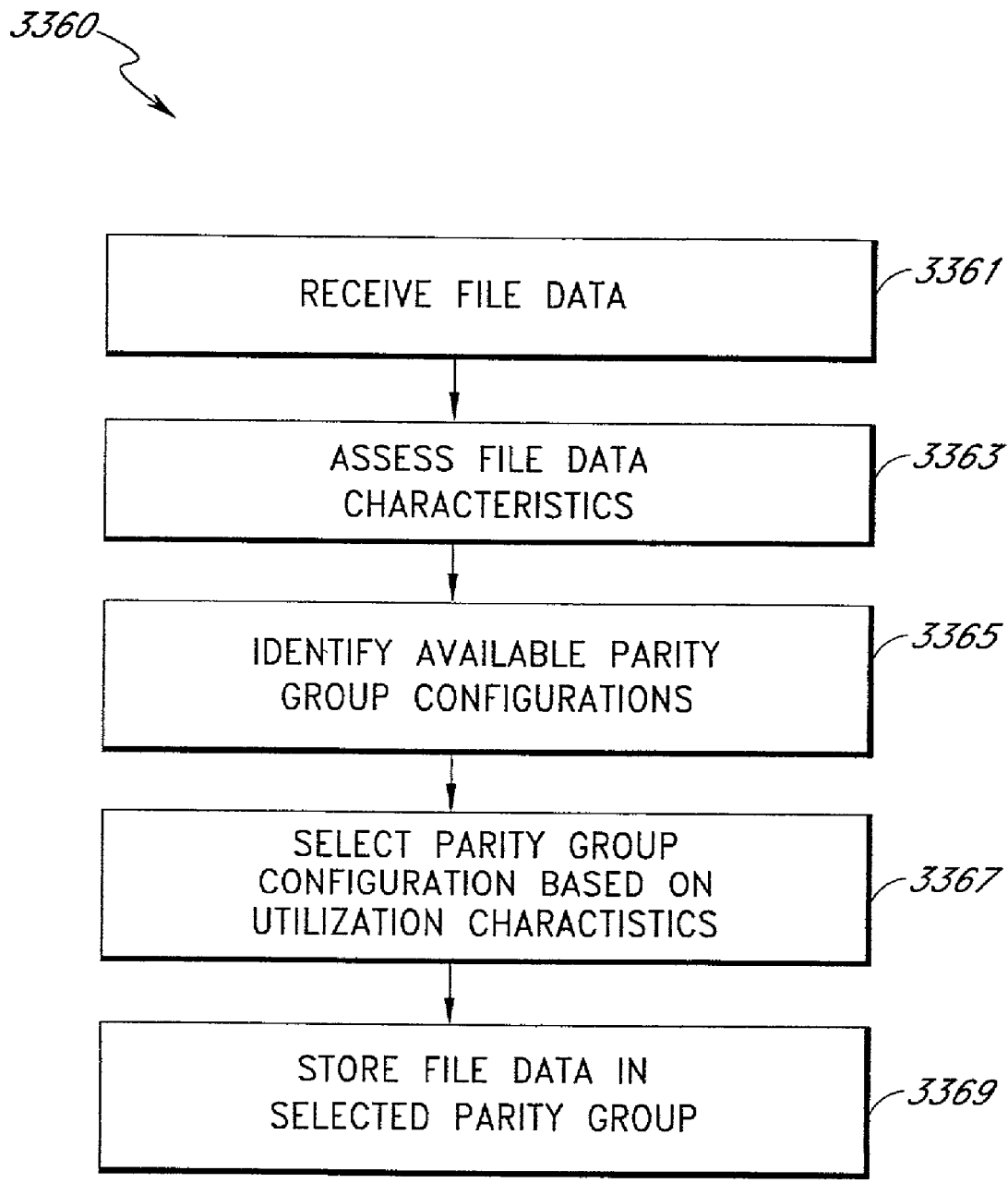
FIG. 33 illustrates a data storage process used by the distributed file storage system.

FIG. 33 illustrates one embodiment of a data storage process 3360 used by the distributed file storage system 100 to store data. This process 3360 desirably improves the efficiency of storing data to the disk array 140 by selecting parity group configurations that have improved utilization characteristics and reduce unused or lost space. In this process 3360 the server 130 receives files 3361 from the clients 110 that are to be stored in the disk array 140. The server 130 then assesses the file's characteristics 3363 to determine suitable parity string configurations that can be used to encode the information contained in the file. During the file assessment 3363, the server 130 can identify characteristics such as the size of the file, the nature of the data contained in the file, the relationship of the file to other files presently stored in the disk array, and other characteristics that are used to determine how the file will be stored in the disk array 140. Using the G-table 2530 as a reference, the server 130 then identifies 3365 available (free) parity groups that can be used to store the file to the disk array 140.

Typically, a plurality of parity group configurations are available and contain the requisite amount of space for storing the file. Using an analysis methodology similar to that described in FIGS. 32A, B, the server 130 assesses the utilization characteristics for each parity group configuration that can be used to store the file. Based on the available configurations and their relative storage efficiency, the server 130 selects a desirable parity group configuration 3367 to be used for file storage. In one embodiment, a desirable parity group configuration is identified on the basis of the high utilization value 3245 that is indicative of little or no wasted space (non-file encoding space) within the parity groups. Furthermore, a desirable parity group configuration stores the file in the parity string 2335 comprising the least number of total bytes in the parity string. Using these two parameters as a metric, the server 130 selects the desirable parity group configuration 3367 and stores the data contained in the file 3369. During file storage 3369, the G-table 2530 is updated to indicate how the file is mapped to the disk array 140 and characteristics of the G-string 2530 used to store the file are encoded in the appropriate Gees of the G-table 2530. Furthermore, the one or more Gees corresponding to the logical disk blocks where the data from the file is stored are updated to reflect their now occupied status (i.e. removed from pool of available or free disk space).

In another embodiment the distributed file storage system 100 provides a flexible method for redistributing the parity groups 2335 of the disk array 140. As discussed previously, prior to storage of information in the disk array 140 the distributed file storage system 100 creates the G-table 2530 containing a complete map of the logical blocks of each disk 2305 of the disk array 140. Each logical block is allocated to a particular parity group type and may be subsequently accessed during data storage processes when the group type is requested for data storage. During initialization of the disk array 140, the server 130 allocates all available disk space to parity groups 2335 of various lengths or sizes which are subsequently used to store data and information. As files are stored to the disk array 140, the parity groups 2335 are accessed as determined by the server 130 and the availability of each parity group type changes.

Using the plurality of different sizes and configurations of parity groups 2335 allows the server 130 to select particular parity group configurations whose characteristics permit the storage of a wide variety of file types with increased efficiency. In instances where a file is larger than the largest available parity group, the server 130 can break down the file and distribute its contents across multiple parity groups. The G-table 2530 maps the breakdown of file information across the parity groups over which it is distributed and is used by the server 130 to determine the order of the parity groups should be accessed to reconstruct the file. Using this method, the server 140 can accommodate virtually any file size and efficiently store its information within the disk array 140.

When a large quantity of structurally similar data is stored to the disk array 140, a preferential parity group length can be associated with the data due to its size or other characteristics. The resulting storage in the preferential parity group length reduces the availability of this particular parity group and may exhaust the supply allocated by the server 130. Additionally, other parity group lengths can become underutilized, as the data stored to the disk array 140 does not utilize these other parity group types in a balanced manner. In one embodiment the distributed file storage system 100 monitors the parity set distribution and occupation characteristics within the disk array 140 and can alter the initial parity set distribution to meet the needs of client data storage requests on an ongoing basis and to maintain a balanced distribution of available parity group types. The parity group monitoring process can further be performed as a background process or thread to maintain data throughput and reduce administrative overhead in the system 100.

FIGS. 34A–C illustrate a simplified parity set redistribution process useful in maintaining availability of parity groups 2335 within the disk array 140. Redistribution is handled by the server 130, which can update sets of Gees of the G-table 2530 to alter their association with a first parity group into an association with a second parity group. Furthermore, other characteristics of the data and parity blocks within a parity group can be modified, for example, to change the size or extent of each block. By updating the G-table 2530, the server 140 provides a parity group balancing functionality to insure that each type or configuration of parity group is available within the disk array 140.

FIG. 34A illustrates an exemplary parity group distribution for the disk array 140 prior to storage of data from clients 110. The parity group distribution comprises four types of parity groups corresponding to a 4-block parity group 3480, a 3-block parity group 3481, a 2-block parity group 3482, and a 1-block parity group 3483. In configuring the distributed file storage system 100 there is an initial allocation 3491 of each type of parity group 3480–3483. For example, in the illustrated embodiment, 10000 groups are allocated for each type of parity group 3480–3483. Each parity group 3480–3483 further occupies a calculable percentage of a total disk space 3485 within the disk array 140 based on the size of the parity group. Although the parity group distribution is illustrated as containing four types of parity groups, it will be appreciated by one of skill in the art that numerous other sizes and configurations of parity groups are possible. (e.g. 8, 10, 16, etc.) In one embodiment, the number of blocks within the parity group 2335 can be any number less than or equal to the number of disks within the disk array 140. Furthermore, the parity groups 2335 may be distributed across more than one disk array 140 thus allowing for even larger parity group block numbers that are not limited by the total number of disks within the single disk array 140.

As disk usage occurs 3487, parity groups 3480–3483 become occupied with data 3490 and, of the total initial allocation of parity groups 3491, a lesser amount remain as free or available parity groups 3492. FIG. 34B illustrates parity group data occupation statistics where of the original initially allocated parity groups 3491 for each parity type, a fraction remain as free or available 3492 for data storage. More specifically: The occupation statistics for the 4-block parity group comprise 2500 free vs. 7500 occupied parity groups, the occupation characteristics for the 3-block parity group comprise 7500 free vs. 2500 occupied parity groups, the occupation characteristics for the 2-block parity group comprise 3500 free vs. 6500 occupied parity groups, and the occupation characteristics for the 1-block parity group comprise 500 free vs. 9500 occupied parity groups.

During operation of the distributed file storage system 100, free parity groups can become unevenly distributed such that there are a greater proportion of free parity groups in one parity group length and a lesser proportion of free parity groups in another parity group length. While this disparity in distribution does not necessarily impact the performance or effectiveness of storing data to the disk array 140, the server 130 monitors the availability of each parity group 3480–3483 to insure that no single parity group type becomes completely depleted. Depletion of a parity group is undesirable as it reduces the choices available to the server 130 for storing data and can potentially affect the efficiency of data storage. As shown in FIG. 34B, the 3-block parity group 3481 possess a greater number of free parity groups 3492 compared to any of the other parity groups 3480, 3482, 3483 while the 1-block parity group 3483 possess the smaller number of free parity groups and may be subject to complete depletion should data storage continue with a similar parity group distribution characteristics.

To prevent parity group depletion, the server 130 can redistribute or convert 3494 at least a portion of one parity group into other parity group lengths. As shown in FIG. 34C, the server 130 converts a portion of the 3-block parity group 3481 into the 1-block parity group 3483. The resulting conversion redistributes the number of parity groups within the disk array 140 by reducing the number of parity groups of a first parity group type (3-block parity) and generates an additional quantity of parity groups of the second parity group type (1-block parity). Redistribution in this manner beneficially prevents the complete depletion of any parity group and thus preserves the efficiency of data storage by insuring that each parity group is available for data storage.

In one embodiment, parity group redistribution is performed by updating one or more Gees of the G-table 2530 to reflect new parity group associations. As previously discussed, each parity group 2335 is assigned using a data structure linking associated Gees. The redistribution process updates these data structures to redefine the parity group associations for the logical blocks of the disk array 140. Thus, the server 130 can rapidly perform parity group distribution without affecting existing occupied parity groups or significantly degrading the performance of the distributed file storage system 100.

Figure 35A:
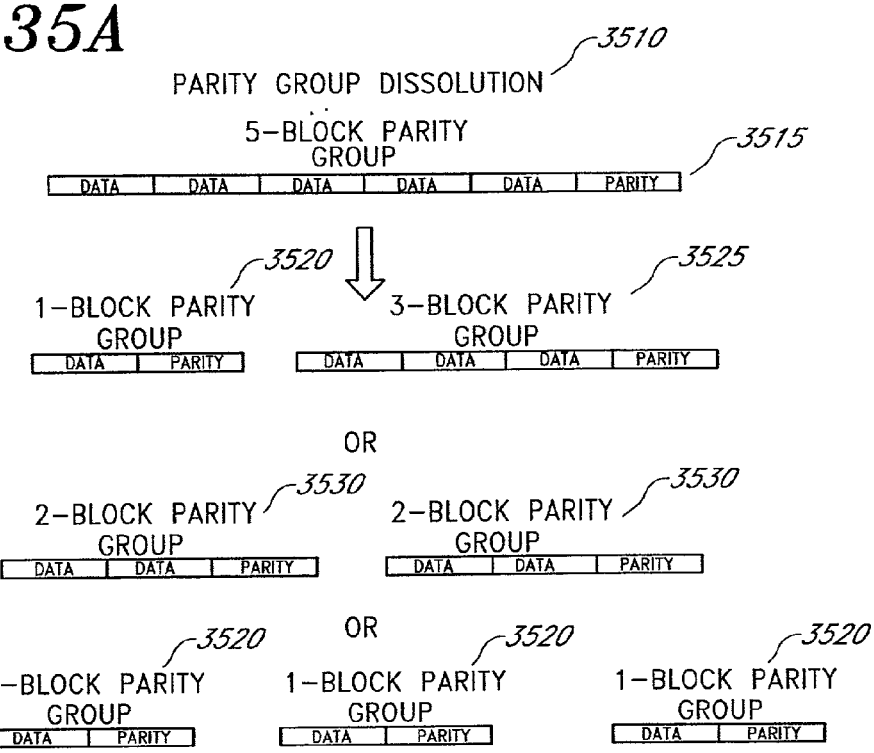
FIG. 35A illustrates one embodiment of a parity group dissolution process.

FIGS. 35A, B illustrate two types of parity group redistribution processes 3500 that are used by the system 100 to maintain parity group availability in the disk array 140. A first redistribution process known as parity group dissolution 3510 converts a larger parity group into one or more smaller parity groups. As shown in FIG. 35A, a 5-block parity group 3515 can be converted into two smaller parity groups 3515 consisting of a 1-block parity group 3520 and a 3-block parity group 3525. The 5-block parity group 3515 can also be converted into two 2-block parity groups 3530 or alternatively three 1-block parity groups 3520.

Figure 35B:
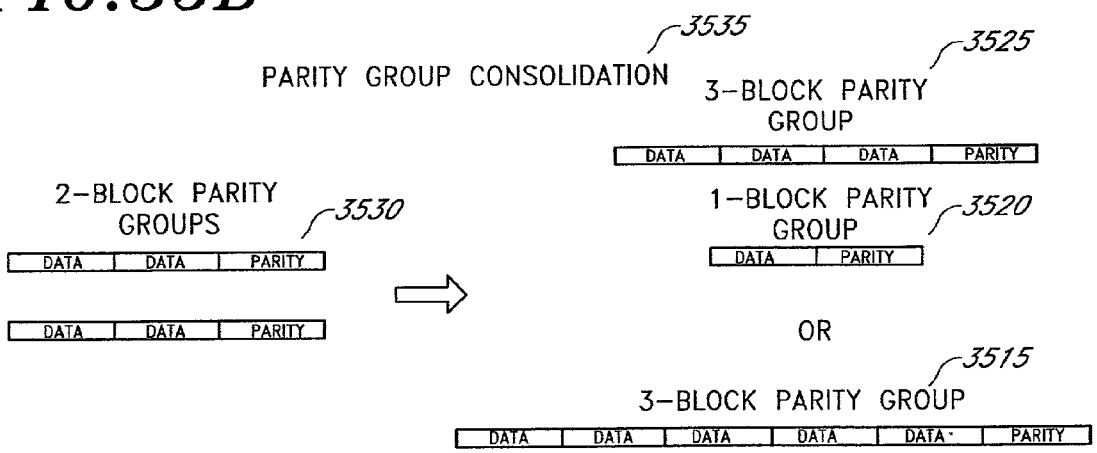
FIG. 35B illustrates one embodiment of a parity group consolidation process.

A second redistribution process 3500 known as parity group consolidation 3535 (shown in FIG. 35B) converts two or more smaller parity groups into one or more larger parity groups. For example, two 2-block parity groups 3530 can be combined to form the single 5-block parity group 3515. Alternatively, the two 2-block parity groups 3530 can be combined to form a 3-block parity group 3525 and a 1-block parity group 3525.

It will be appreciated that numerous combinations of parity group dissolution 3510 and consolidation 3535 exist. These redistribution processes 3500 are advantageously used to modify the existing parity group configurations to accommodate the demands of the system 100 as it is populated with information. Using these processes 3500 improves the performance and efficiency of storing data in the system 100. Consistency and knowledge of the parity group distribution is maintained using the G-table 2530 which is updated as the modifications to the parity groups are made. These processes 3500 can further be performed using both occupied and unoccupied parity groups or a combination thereof to further improve the flexibility of the distributed storage system 100.

Figure 36:
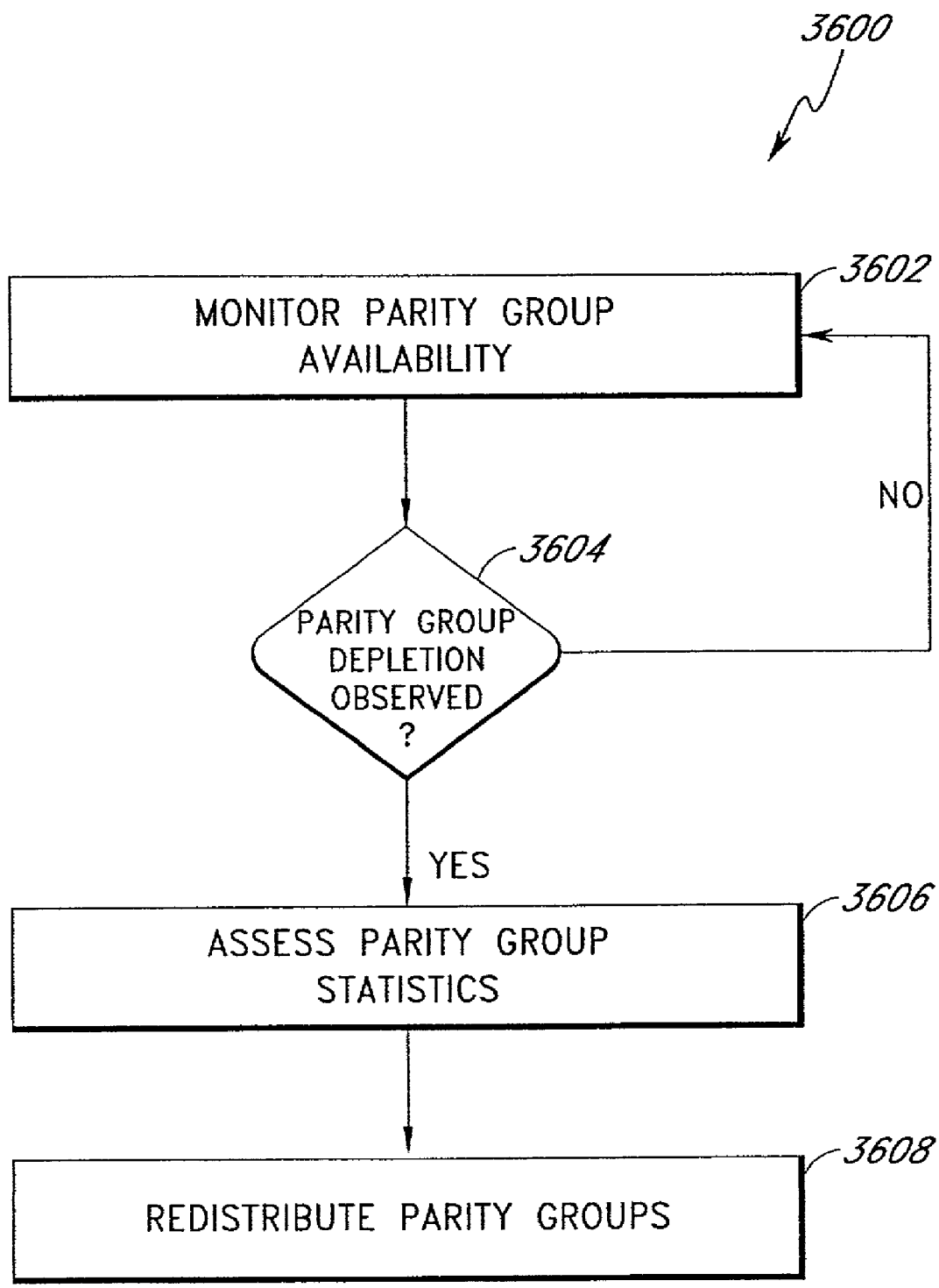
FIG. 36 illustrates a parity group monitoring process.

FIG. 36 illustrates a process 3600 used by the server 130 to monitor parity group availability and perform parity group redistribution as needed. This process 3600 is important in maintaining a desirable quantity of each type of parity group so that files can be stored with improved storage efficiency. In the illustrated embodiment, the process 3600 commences with a monitoring function that determines parity group availability 3602. The monitoring function 3602 can be performed continuously or at periodic time intervals to insure available parity groups remain balanced within the disk array 140. Using the G-table 2530 as a reference, the monitoring function 3602 rapidly assesses the current status of data occupation within the array 140. More specifically, the monitoring function 3602 can determine the availability of each type of parity group and determine the number of free or available groups using the mapping information of the G-table 2530.

As a particular type of parity group is depleted 3604, indicated by a reduction in the number of free parity groups for the particular group type, the server 130 proceeds to assess the parity group statistics 3606 for each parity group defined within the G-table 2530. The assessment of parity group statistics 3606 comprises determining both the free and available parity group statistics using the G-table 2530 as a reference. In determining how to increase the quantity of free parity groups for a depleted parity group type, the server 130 assesses which other parity groups contain available or free parity groups that have not be used to store data. This assessment is made based upon the parity group usage statistics which, for example, indicate free parity groups, occupied parity group, disk space occupation, frequency of access or utilization, among other statistics that can be collected while the distributed file storage system 100 is in operation.

In one embodiment, the server 130 continually collects and stores usage statistics so as to provide up-to-date and readily available statistical information that can be used to determine how redistribution of available parity groups should proceed. Additionally, these statistics can be acquired from the G-table 2530 where the server 130 calculates the usage statistics based upon the current contents of the G-table 2530.

Upon acquiring the parity group statistics 3606, the server 130 calculates a suitable re-distribution 3608 of the parity groups. The re-distribution 3608 desirably takes into account factors such as, for example, the number and type of parity groups 2335 within the disk array 140, the availability of unoccupied parity groups within each parity group type, the frequency of usage or access of each parity group type, among other considerations that can be determined using the parity group statistics. During parity group redistribution 3608, one or more different parity groups can be used as a source for supplementing the depleted parity group set. The overall effect of redistribution 3608 is to balance the free or available parity groups of each type so that no one single parity group is depleted.

Parity group redistribution in the aforementioned manner is facilitated by the use of the G-table 2530 mapping structure. Using the G-table 2530, parity groups can be readily assigned and re-assigned without significant overhead by modifying the contents of appropriate Gees. This method of disk space allocation represents a significant improvement over conventional disk storage methods such as those used in RAID architectures. In conventional RAID architectures, the rigid nature of disk space allocation prevents optimizing data storage in the manner described herein. Furthermore, the parity group redistribution feature of the distributed file storage system 100 provides an effective method to monitor and maintain optimized disk storage characteristics within the array to insure efficient use of available disk space.

In addition to redistributing free or available space within the disk array 140, the distributed file storage system 100 also features a method by which occupied parity groups can be modified and re-configured into other parity group types. One benefit realized by re-configuring occupied parity groups is that unnecessary space allocated to a particular parity group in which data is stored may be reclaimed for use and converted to available or free storage space. Furthermore, re-configuration of occupied parity groups can be used to de-fragment or consolidate the information stored in the disk array 140 enabling the information contained therein to be accessed more efficiently.

Figure 37:
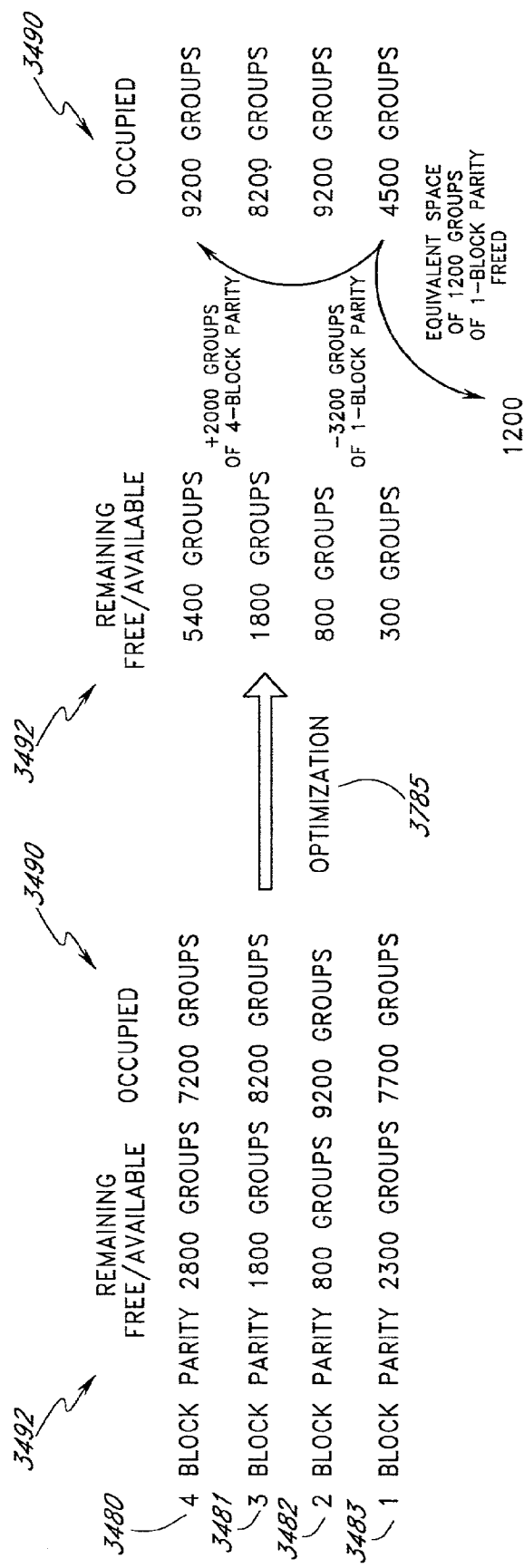
FIG. 37 illustrates a parity group optimization/de-fragmentation process.

FIG. 37 illustrates one embodiment of a parity group optimization/de-fragmentation routine used to re-configure data within the disk array 140. Parity group occupation statistics are shown for different parity lengths including: a 1-block parity group having 2800 free parity groups and 7200 occupied parity groups, a 2-block parity group having 1800 free parity groups and 8200 occupied parity groups, a 3-block parity group having 800 free parity groups and 9200 occupied parity groups, and a 4-block parity group having 2300 free parity groups and 7700 occupied parity groups.

When the server 130 performs an optimization routine 3785, one or more of the parity groups can be re-configured into another type of parity group. For example, as shown in the illustration, a portion of the 1-block parity groups corresponding to 3200 groups can be consolidated into 2000 groups of 4-block parity. In the consolidated parity groups, the original information contained in the 1-block parity group is retained in a more compact form in the 4-block parity groups. The resulting 4-block parity groups require less parity information to maintain data integrity compared to an equivalent quantity of information stored in a 1-block parity configuration. In the illustrated embodiment, the residual space left over from the optimization routine corresponds to approximately 1200 groups of 1-block parity and can be readily converted into any desirable type of parity group using G-table updating methods.

The aforementioned optimization routine can therefore beneficially re-allocate occupied logical disk blocks into different parity group configurations to reclaim disk space that might otherwise be lost or rendered inaccessible due to the manner in which the data is stored in the parity groups. As with other parity group manipulation methods provided by the distributed file storage system 100, the process of optimizing parity groups is readily accomplished by rearrangement of the mapping assignments maintained by the G-table 2530 and provides a substantial improvement in performance compared to conventional storage systems. In conventional systems, data restriping is a time consuming and computationally expensive process that reduces data throughput and can render the storage device unavailable while the restriping takes place.

Like conventional storage systems, the distributed file storage system 100 provides complete functionality for performing routine data and disk optimization routines such as de-fragmentation of logical block assignments and optimization of data placement to improve access times to frequently accessed data. These processes are efficiently handled by the system 100, which can use redundant data access to insure availability of data disk optimization routines take place.

The distributed file storage system 100 further provides adaptive load balancing characteristics that improve the use of resources including servers 130 and disk arrays 140. By balancing the load between available resources, improved data throughput can be achieved where client requests are routed to less busy servers 130 and associated disk arrays 140. Load-dependent routing in this manner reduces congestion due to frequent accessing of a single server or group of servers. Additional details of these features can be found in those discussions relating to adaptive load balancing and proactive control of the DFSS 100.

In one embodiment, frequently accessed data or files are automatically replicated such that simultaneous requests for the same information can be serviced more efficiently. Frequently accessed data is identified by the servers 130 of the distributed file storage system 100, which maintain statistics on resource usage throughout the network. Furthermore, the servers 130 can use the resource usage statistics in conjunction with predictive algorithms to "learn" content access patterns. Based on these access patterns frequently accessed content can be automatically moved to server nodes 150 that have high bandwidth capacities capable of serving high numbers of client requests. Additionally, less frequently accessed material can be moved to server nodes 150 that have higher storage capacities or greater available storage space where the data or files can be conveniently stored in areas without significant bandwidth limitations.

Figure 38:
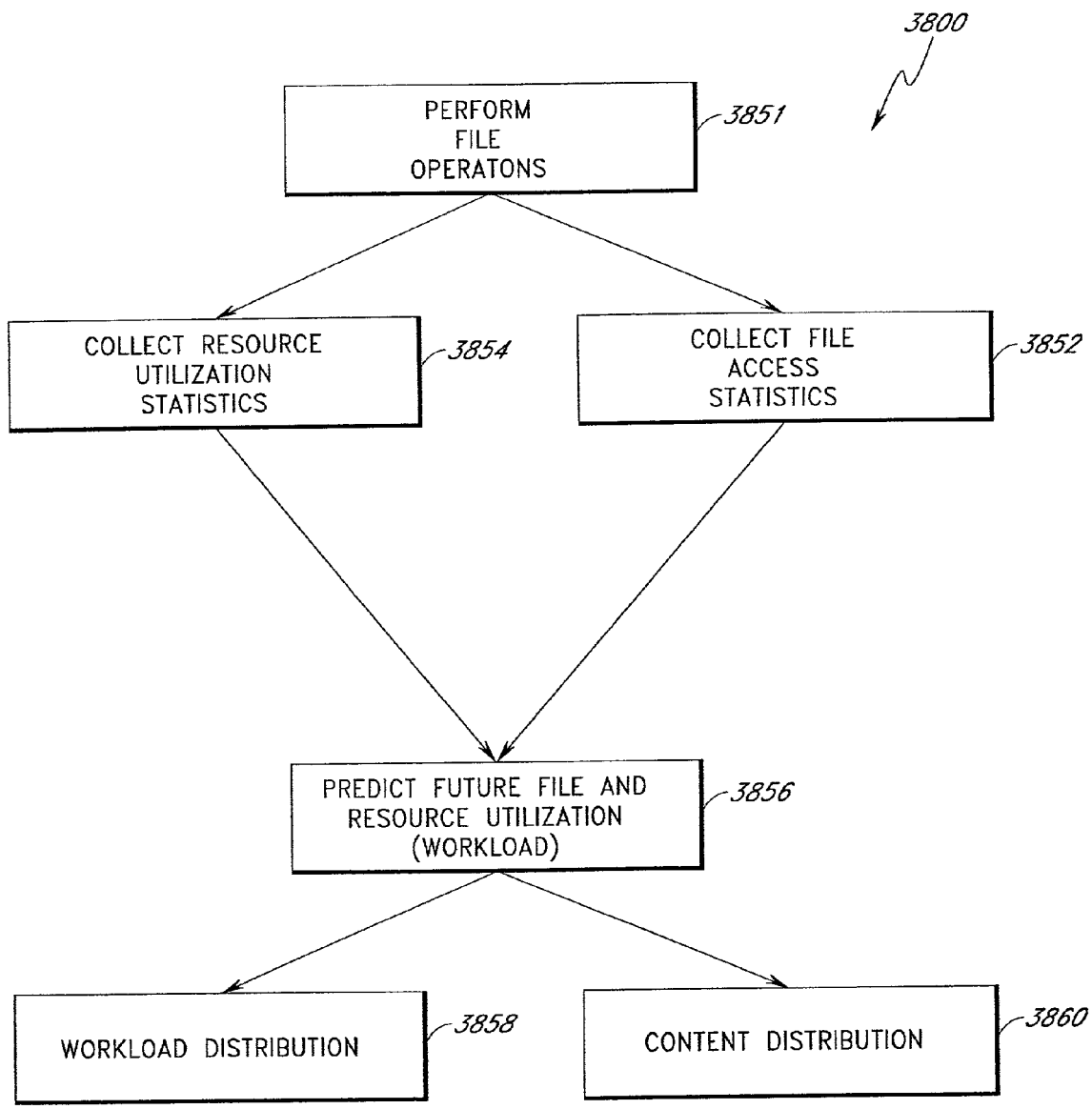
FIG. 38 illustrates a load balancing method used by the distributed file storage system.

FIG. 38 illustrates one embodiment of a load balancing method 3800 used in conjunction with the distributed file storage system 100 to provide improved read/write performance. In the load balancing method 3800, file operations are performed 3851 and file access statistics are continuously collected 3852 by the servers 130. These statistics include information describing file access frequencies, file size characteristics, file type characteristics, among other information. Resource utilization statistics are also collected 3854 and contain information that characterize how data is stored within the distributed file storage system 100. The resource utilization statistics identify how each disk array 140 is used within the system 100 and may contain statistics that reflect the amount of free space within the array, the amount of used space within the array, the frequency of access of a particular disk within the disk array, the speed of servicing client requests, the amount of bandwidth consumed servicing client requests and other statistics that characterize the function of each disk array 140 within the distributed file storage system 100. The resource utilization statistics can also be used to evaluate the statistics across multiple disk arrays to determine how each disk array compares to other disk arrays within the distributed file storage system 100. This information is useful in identifying bandwidth limitations, bottlenecks, disk arrays overloads, and disk array under utilization.

Using either the resource utilization statistics 3854, the file access statistics 3852, or a combination thereof, the one or more servers 130 of the distributed file storage system 100 predict future file and resource utilization characteristics 3856. In one embodiment, the future file and resource utilization characteristics 3856 describe a predicted workload for each of the disk arrays within the distributed file storage system 100. The predicted workload serves as a basis for determining how to best distribute the workload 3858 among available servers and disk arrays to improve access times and reduce bandwidth limitations. Furthermore, the predicted workload can be used to distribute files or content 3860 across the available disk arrays to balance future workloads.

An additional feature of the distributed file storage system 100 is the ability to perform "hot upgrades" to the disk array 140. This process can involve "hot-swapping" operations where an existing disk within the array is replaced (typically to replace a faulted or non-operational drive). Additionally, the "hot upgrade" process can be performed to add a new disk to the existing array of disks without concomitant disk replacement. The addition of the new disk in this manner increases the storage capacity of the disk array 140 automatically and eliminates the need to restrict access to the disk array 140 during the upgrade process in order to reconfigure the system 100. In one embodiment, the server 130 incorporates the additional space provided by the newly incorporated disk(s) by mapping the disk space into existing unused/available parity groups. For example, when a new drive is added to the disk array 140, the server 130 can extend the length or extent of each available parity group by one. Subsequently, parity group redistribution processes can be invoked to optimize and distribute the newly acquired space in a more efficient manner as determined by the server 130. In one embodiment, when there are more newly added logical disk blocks than can be accommodated by addition to the unused parity groups, at least some of the unused parity groups are split apart by the dissolution process to create enough unused parity groups to incorporate the newly added logical disk blocks.

Load Balancing

One approach to adaptive or active load balancing includes two mechanisms. A first mechanism predicts the future server workload, and a second mechanism reallocates resources in response to the predicted workload. Workload prediction can have several aspects. For example, one aspect includes past server workload, such as, for example, file access statistics and controller and network utilization statistics. The loading prediction mechanism can use these statistics (with an appropriate filter applied) to generate predictions for future loading. For example, a straightforward prediction can include recognizing that a file that has experienced heavy sequential read activity in the past few minutes will likely continue to experience heavy sequential read access for the next few minutes.

Predictions for future workload can be used to proactively manage resources to optimize loading. Mechanisms that can be used to reallocate server workload include the movement and replication of content (files or objects) between the available storage elements such that controller and storage utilization is balanced, and include the direction of client accesses to available controllers such that controller and network utilization is balanced. In one embodiment, some degree of cooperation from client machines can provide effective load balancing, but client cooperation is not strictly needed.

Embodiments of the invention include a distributed file server (or servers) comprising a number of hardware resources, including controllers, storage elements such as disks, network elements, and the like. Multiple client machines can be connected through a client network or communication fabric to one or more server clusters, each of which includes of one or more controllers and a disk storage pool.

File system software resident on each controller can collect statistics regarding file accesses and server resource utilization. This includes information of the access frequency, access bandwidth and access locality for the individual objects stored in the distributed file, the loading of each controller and disk storage element in terms of CPU utilization, data transfer bandwidth, and transactions per second, and the loading of each network element in terms of network latency and data transfer bandwidth.

The collected statistics can be subjected to various filter operations, which can result in a prediction of future file and resource utilization (i.e. workload). The prediction can also be modified by server configuration data which has been provided in advance, for example, by a system administrator, and explicit indications regarding future file and/or resource usage which may be provided directly from a client machine.

The predicted workload can then be used to move content (files, objects, or the like) between storage elements and to direct client accesses to controllers in such a manner that the overall workload is distributed as evenly as possible, resulting in best overall load balance across the distributed file storage system and the best system performance.

The predicted workload can be employed to perform client network load balancing, intra-cluster storage load balancing, inter-node storage load balancing, intra-node storage capacity balancing, inter-node storage capacity balancing, file replication load balancing, or the like.

Client network load balancing includes managing client requests to the extent possible such that the client load presented to the several controllers comprising a server cluster, and the load presented to the several client network ports within each is evenly balanced. Intra-cluster storage load balancing includes the movement of data between the disks connected to a controller cluster such that the disk bandwidth loading among each of the drives in an array, and the network bandwidth among network connecting disk arrays to controllers is balanced. For example, intra-cluster storage load balancing can be accomplished by moving relatively infrequently accessed files or objects. Intra-cluster storage load balancing advantageously achieves uniform bandwidth load for each storage sub-network, while also achieving uniform bandwidth loading for each individual disk drive.

Inter-node storage load balancing comprises the movement of data between drives connected to different controller clusters to equalize disk access load between controllers. This can often cost more than intra-node drive load balancing, as file data is actually copied between controllers over the client network. Intra-node storage capacity balancing comprises movement of data between the disks connected to a controller (or controller pair) to balance disk storage utilization among each of the drives.

Inter-node storage capacity balancing comprises movement of data between drives connected to different controllers to equalize overall disk storage utilization among the different controllers. This can often cost more than intra-node drive capacity balancing, as file data is actually be copied between controllers over the network. File replication load balancing comprises load balancing through file replication as an extension of inter-node drive load balancing. For example, high usage files are replicated so that multiple controller clusters include one or more that one local (read only) copy. This allows the workload associated with these heavily accessed files to be distributed across a larger set of disks and controllers.

Based on the foregoing, embodiments of the present invention include a distributed file storage system that proactively positions objects to balance resource loading across the same. As used herein, load balancing can include, among other things, capacity balancing, throughput balancing, or both. Capacity balancing seeks balance in storage, such as the number of objects, the number of Megabytes, or the like, stored on particular resources within the distributed file storage system. Throughput balancing seeks balance in the number of transactions processed, such as, the number of transactions per second, the number of Megabytes per second, or the like, handled by particular resources within the distributed file storage system. According to one embodiment, the distributed file storage system can position objects to balance capacity, throughput, or both, between objects on a resource, between resources, between the servers of a cluster of resources, between the servers of other clusters of resources, or the like.

The distributed file storage system can proactively position objects for initial load balancing, for example, to determine where to place a particular new object. While existing server loading is a factor used in the determination, other data can be used to help predict the access frequency of the new object, such as, for example, file extensions, DV access attributes, or the like. For example, a file extension indicating a streaming media file can be used to predict a likely sequential access to the same.

The distributed file storage system actively continues load balancing for the existing objects throughout the system using load balancing data. For capacity load balancing, large objects predicted to be infrequently accessed, can be moved to servers, which for example, have the lower total percent capacity utilizations. Movement of such files advantageously avoids disrupting throughput balancing by moving predominantly infrequently accessed files. For throughput balancing, objects predicted to be frequently accessed can be moved to servers, which for example, have the lower total percent transaction utilizations. In one embodiment, smaller objects predicted to be frequently accessed can be moved in favor of larger objects predicted to be frequently accessed, thereby advantageously avoiding the disruption of capacity balancing.

According to one embodiment, one or more filters may be applied during initial and/or active load balancing to ensure one or a small set of objects are not frequently transferred, or churned, throughout the resources of the system.

The distributed file storage system can comprise resources, such as a server or server, which can seek to balance the loading across the system by reviewing a collection of load balancing data from itself, one or more of the other servers in the system, or the like. The load balancing data can include object file statistics, server profiles, predicted file accesses, historical statistics, object patterns, or the like. A proactive object positioner associated with a particular server can use the load balancing data to generate an object positioning plan designed to move objects, replicate objects, or both, across other resources in the system. Then, using the object positioning plan, the resource or other resources within the distributed file storage system can execute the plan in an efficient manner.

According to one embodiment, the generation of the positioning plan can be very straightforward, such as, for example, based on object sizes and historical file access frequencies. Alternatively, the generation of the plan can be quite complex, based on a large variety of load balancing information applied to predictive filtering algorithms, the output of which is a generally more accurate estimate of future file accesses and resource usage, which results in more effective object positioning. Another embodiment can include adaptive algorithms which track the accuracy of their predictions, using the feedback to tune the algorithms to more accurately predict future object access frequencies, thereby generating effective object positioning plans.

According to one embodiment, each server pushes objects defined by that server's respective portion of the object positioning plan to the other servers in the distributed file storage system. By employing the servers to individually push objects based on the results of their object positioning plan, the distributed file storage system provides a server-, process-, and administrator-independent automated approach to object positioning, and thus load balancing, within the distributed file storage system.

Figure 39:
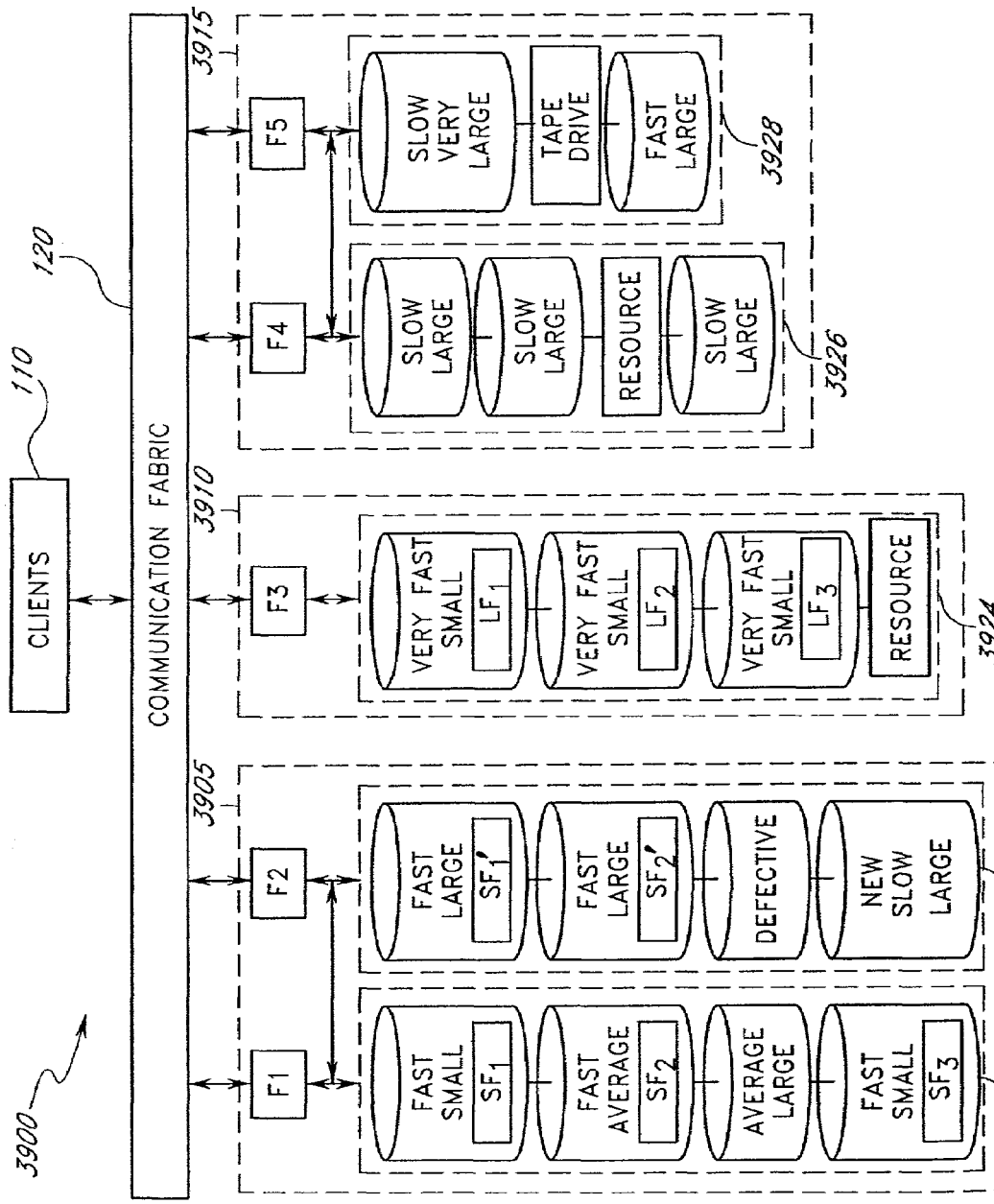
FIG. 39 depicts a block diagram of an exemplary embodiment of servers and disk arrays of a distributed file storage system, which highlights the proactive object positioning of aspects of an exemplary embodiment of the invention.
Figure 40:
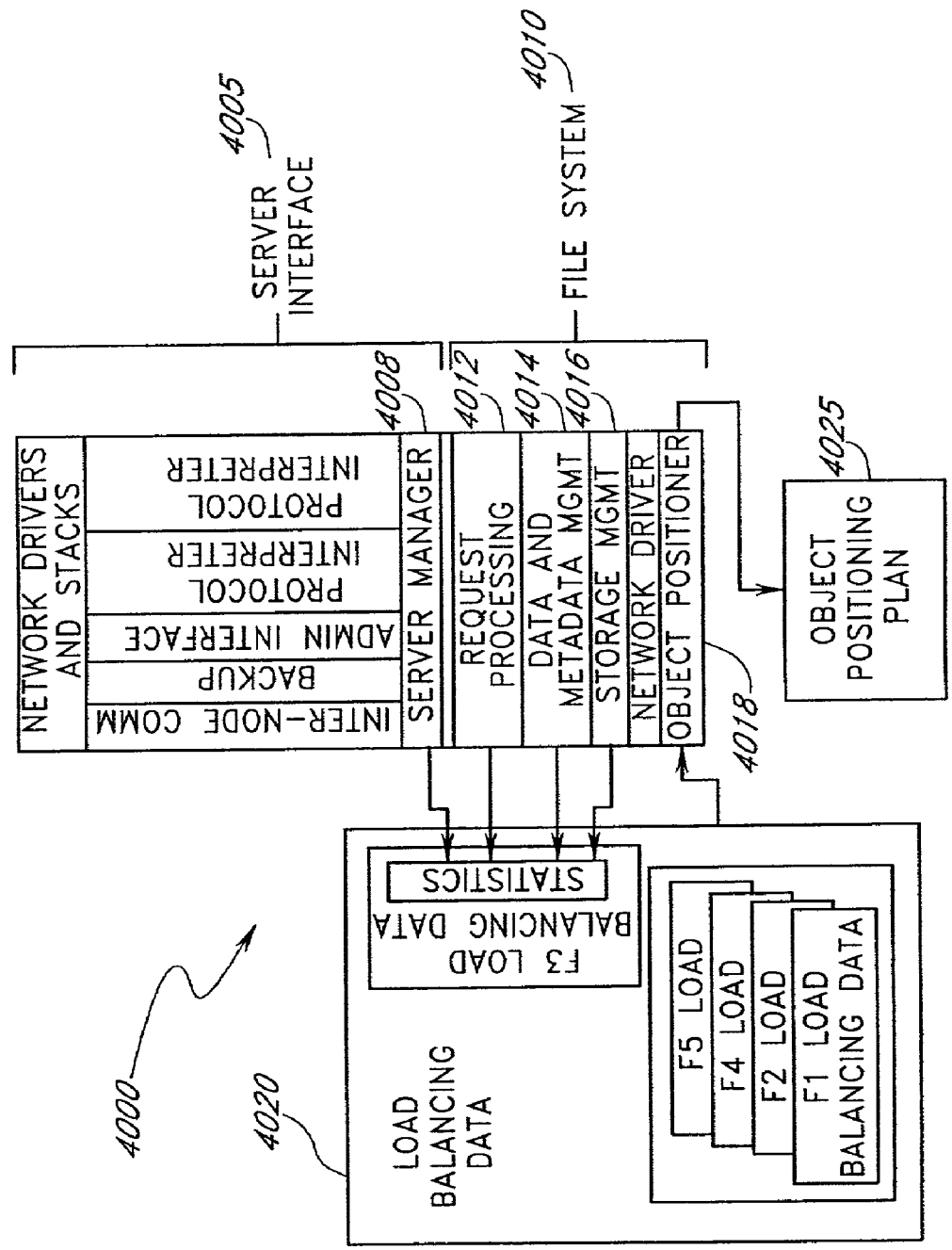
FIG. 40 depicts a block diagram of an exemplary server of FIG. 39, according to aspects of an exemplary embodiment of the invention.

To facilitate a complete understanding of exemplary load balancing aspects of the invention, this part of the detailed description describes the invention with reference to FIGS. 39–41, wherein like elements are referenced with like numerals throughout.

FIG. 39 depicts an exemplary embodiment of servers and disk arrays of a distributed file storage system (DFSS) 3900, disclosed for the purpose of highlighting the distributed proactive object positioning aspects of an exemplary embodiment of the invention. A skilled artisan will recognize FIG. 39 is not intended to limit the large number of potential configurations of servers and disk arrays encompassed by the foregoing distributed file storage system 100 disclosed with reference to FIG. 1. As shown in FIG. 39, the DFSS 3900 comprises five nodes formed into three clusters 3905, 3910, and 3915. Cluster 3905 includes a first node comprising server F1 and a disk array 3920, and a second node comprising server F2 and a disk array 3922. Cluster 3910 includes one node comprising server F3 and a disk array 3924. Additionally, cluster 3915 includes a first node comprising server F4 and a disk array 3926, and a second node comprising server F5 and a disk array 3928.

According to one embodiment, each of the servers F1, F2, F3, F4, and F5 comprises software, hardware, and communications similar to the servers 130–135 disclosed with reference to FIGS. 1 and 2. For example, server F1 communicates with each drive of the disk array 3920. Additionally, server F1 forms part of cluster 3905. According to one embodiment, at least some of the objects stored on a disk array within a cluster, are stored, and are thereby accessible, on other disk arrays within the cluster. For example, server F1 can be configured to communicate with each drive of the disk array 3922. Server F1 also communicates with one or more of the other servers of the DFSS 3900. Moreover, the servers F1, F2, F3, F4, and F5 include software and hardware systems which employ some or all of the features of the distributed file storage system 100, such as, for example, the disclosed use of metadata structures for object organization, metadata and data caching, and the like.

FIG. 39 also shows exemplary self-explanatory attributes of each of the drives of the disk arrays 3920–3928. For example, the drives of the disk array 3920 include two high speed drives having small storage capacity, e.g., "FAST, SMALL," one drive having high speed and average storage capacity, e.g., "FAST, AVERAGE," and one drive having average speed and large storage capacity, e.g., "AVERAGE, LARGE." Additionally, FIG. 39 shows servers F3 and F4 providing access to a resource, such as, for example, a printer, scanner, display, memory, or the like. A skilled artisan will recognize from the disclosure herein that the speed of a drive includes its ordinary meaning as well as a measure of the data rate, or the like, of read or write operations.

According to one embodiment, the DFSS 3900 includes proactive object positioning. For example, each server F1–F5 of the DFSS 3900 proactively positions objects, such as files, directories, or the like, based on a desire to balance or optimize throughput, capacity, or both. According to one embodiment, the foregoing balancing and optimization can advantageously occur at multiple levels within the DFSS 3900. For example, the DFSS 3900 can advantageously seek to optimize the placement and structure of objects within and between disks of the disk arrays, between the servers of a cluster and between servers of other clusters.

Load Balancing within and between the Drives of the Disk Arrays

Similar to the embodiments disclosed with reference to FIGS. 1 and 5, the DFSS 3900 provides the server F1 with the ability to adjust the file logical block size and the distribution of files across multiple drives using, for example, the Gee Table 320. Thus, the server F1 can adjust or choose the layout of particular files within a disk, using, for example, larger file logical block sizes for larger files, or the like, thereby creating efficient storage of the same. Moreover, the server F1 can adjust or choose the layout of particular files across varying numbers of disks, thereby matching, for example, performance of drives within the disk array 3920 with attributes of particular files.

For example, FIG. 39 shows the placement of two files within the DFSS 3900, e.g., streamed file "SF" and large file "LF." According to the exemplary embodiment, file "SF" comprises a file which is to be streamed across computer networks, such as, for example, the Internet. As shown in FIG. 39, file SF is stored in the disk array 3920 using a distributed parity group of three blocks, e.g., two data blocks, "$SF_1$," and "$SF_2$," and one parity block "$SF_3$." Similar to the foregoing description of distributed file storage system 100, the DFSS 3900 advantageously allows files to modify the number of drives in the distributed parity group for a variety of reasons, including to take advantage of attributes of a disk array. Thus, when it is determined that it is desirable to store file SF on only fast disk drives, the distributed parity group can be chosen such that file SF is stored on the fastest drives of disk array 3920 in equally shared portions. A skilled artisan will recognize from the disclosure herein that the servers advantageously balance the desire to employ the faster drives of a particular disk array, against the desire to reduce the overhead associated with using smaller parity groups. For example, according to some embodiments, use of only two disks of five disks means that half of the data stored is overhead parity data.

FIG. 39 also shows that in the disk array 3922, file SF', a copy of file SF, can be stored according to the attributes of the disk array 3922, e.g., file SF' is stored using a distributed parity group of two because the disk array 3922 has only two fast drives. Moreover, FIG. 39 shows file LF stored in the disk array 3924. According to the exemplary embodiment, file LF is stored is using distributed parity groups of three blocks, thereby fully taking advantage of all three very fast drives.

Thus, the server F1 advantageously and proactively can adjust the placement and structure of objects, such as files, within and between drives of the disk array 3920. A skilled artisan will recognize that such proactive placement is outside the ability of conventional data storage systems. For example, as disclosed with reference to FIGS. 14–16, the DFSS 3900 advantageously includes a directory and file handle lookup process which allows the clients 110 to find files without first knowing which server is currently storing the file. Thus, when one of the servers of the DFSS 3900 repositions an object to balance load, capacity, or the like, the clients 110 can use the lookup process to find the repositioned object in its new location.

Load Balancing between Servers of a Cluster

As disclosed in the foregoing, one embodiment of the DFSS 3900 seeks to balance the loading and capacity between servers of a cluster. As disclosed with reference to the embodiments of FIGS. 1 and 13–14, the clients 110 request data from a file through the use of the file handle 1300, which according to one embodiment, includes the server identification 1320. Thus, the DFSS 3900 can advantageously alter the server identification 1320 of the file handle 1300 for a particular file, thereby changing the read or write request from being processed by, for example, server F1 to, for example, server F2. A skilled artisan will recognize a wide number of reasons for making the foregoing alteration of the file handle 1300, including the availability of F1, the load of F1 versus F2, or the like. In addition, the DFSS 3900 can alter the file handle 1300 based on comparisons of server load balancing data, to set up read-only copies of heavily accessed files, or the like, as discussed below.

Load Balancing between Servers of other Clusters

Load balancing between servers differs from load balancing between drives in, among other things, load balancing between servers involves balancing through the movement or creation of additional copies of objects, while load balancing between drives involves the movement of data blocks.

One embodiment of the DFSS 3900 comprises servers F1–F5 each having access to load balancing data from itself and each of the other servers. According to one embodiment, each server uses the load balancing data to generate an object positioning plan, and then pushes objects defined by their respective portion of the plan, to other servers in the DFSS 3900. The foregoing implementation provides a distributed and server-independent approach to object positioning within the DFSS 3900. It will be understood by a skilled artisan from the disclosure herein that resources, or groups of resources, can gather load balancing data, such as, for example, each, some, or all clusters, each, some, or all servers, or the like.

According to one embodiment, the load balancing data of a particular server can include a wide variety of statistical and attribute data relating to the architecture and performance of the respective server and disk array. Additional statistical information can be maintained relating to the historical object access frequencies and patterns. This statistical information can be applied to a filtering function to predict future object frequencies and patterns.

The load balancing data can include relatively static information, such as, for example, the number of servers for a given cluster and the number of drives connected to each server. Moreover, for each server, the load balancing data can include an indication of the number and type of interfaces available to the server, performance statistics of the server, amount of available memory, an indication of the health of the server, or the like. For each drive, the load balancing data can include an indication of the layout of the drive, such as track information, cylinder information, or the like, capacity and performance information, performance statistics, an indication of the health of the drive, or the like. Additionally, the load balancing data can include an indication of the performance and the health of storage network configurations, client network configurations, or the like. The relatively static load balancing data can be considered the "profile" of the resources associated therewith.

Other relatively static information can include an indication of the quality of service being demanded by the clients 110 from a particular server, such as, for example, server F1 and its associated disk array 3920 can be configured to provide data availability with little or no downtime, thereby allowing the server to support Internet hosting applications or the like. Additionally, the foregoing relatively static statistical or attribute information can change occasionally, such as, for example, when a drive is replaced or added, a server is reconfigured, the quality of service is changed, or the like.

According to yet another embodiment, the load balancing data can also include relatively dynamic information, such as, for example, throughput information like the number of read or write input/output operations per second (IOPS). For example, the dynamic information can include server throughput for each server, such as, for example, client transactions per second, client megabytes per second, disk transaction per second, disk megabytes per second, or the like. The foregoing server throughput information can include read, write, or both operations for each client interface of the particular server. The server throughput data also includes dynamic information such as the cache hit ration, errors, or the like, of each particular server. The dynamic information can also include disk throughput for each disk, such as, for example, an indication of the amount of metadata capacity that is being utilized, the amount of data capacity utilized, read, write, or both transactions per second, read, write, or both megabytes per second, errors or the like.

In addition to the foregoing data, the load balancing data includes object statistic information, such as, for example, the last access time and the access frequency for each object. According to one embodiment, the measurement of access frequency can be filtered using one or more filtering weights designed to emphasize, for example, more recent data over more historical data.

According to one embodiment, each server may include file statistical information in the load balancing data, comprising additional information for the more heavily accessed, and potentially smaller, objects. For example, the file statistical information can include an indication of access frequency for, for example, the last ten (10) minutes, one (1) hour, twenty-four (24) hours, or the like. Moreover, the file statistical information can include average read block size, average write block size, access locality, such as a indication of randomness or sequentialness for a given file, histogram data of accesses versus day and time, or the like. According to one embodiment, the indication of randomness can include randomness rating, such as, for example, a range from 0 and 1, where 0 corresponds to primarily randomly accessed file and one corresponds to a primarily sequentially accessed file, or vice versa.

Based on the above, the load balancing data for a given server can include virtually any information, performance or attribute statistic, or the like that provides insight into how objects, such as files and directories, should be created, reconfigure, moved, or the like, within the DFSS 3900. For example, a skilled artisan can include additional information useful in the prediction of file access frequencies, such as, for example, the time of day, the file size, the file extension, or the like. Moreover, the additional information can include hints corresponding to dynamic volume access attributes, such as, for example, block size, read/write information, the foregoing quality of service guarantees or the randomness/sequentialness of file access.

According to one embodiment, the load balancing data can include a Least Recently Used (LRU) stack and/or a Most Recently Used (MRU) stack, advantageously providing insight into which objects can be used for balancing capacity, throughput, or both, within the DFSS 3900. For example, according to one embodiment, the LRU stack tracks the objects that are rarely or infrequently accessed, thereby providing information to the servers about which objects can be mostly ignored for purposes of throughput balancing, and are likely candidates for capacity balancing. The MRU stack tracks the objects that are more frequently accessed, thereby providing information to the servers about which objects are highly relevant for throughput balancing. According to one embodiment, the servers F1–F5 can employ the MRU stack to determine the objects, on which the servers should be tracking additional performance statistics used in more sophisticated load balancing or sharing solutions, as discussed in the foregoing.

A skilled artisan will recognize from the disclosure herein that the MRU and LRU stacks can be combined into a single stack or other structure tracking the frequency of access for some or all of the objects of the servers F1–F5. A skilled artisan will also recognize from the disclosure herein that the time frame chosen for determining frequency of use for a given object affects the throughput and capacity balancing operations. For example, if the time frame is every twelve hours, the number of objects considered to be frequently accessed may be increased as compared to a time frame of every half-second. According to one embodiment, the DFSS 3900 uses an adaptive time frame of ten (10) minutes to twenty-four (24) hours.

Although the load, balancing data is disclosed with reference to its preferred embodiment, the invention is not intended to be limited thereby. Rather, a skilled artisan will recognize from the disclosure herein a wide number of alternatives for the same. For example, the load balancing data can include detailed performance statistics similar to those disclosed above. On the other hand, the load balancing data can include only a few data points providing only a rough sketch of the throughput and capacity on a particular server. Moreover, the server may track access frequency using information contained in the G-Node of an object, such as, for example, the last access time, or "atime," field.

FIG. 40 illustrates a block diagram of an exemplary server 4000, such as the servers F1–F5 of FIG. 39, according to aspects of an exemplary embodiment of the invention. As shown in FIG. 40, the server 4000 include a server interface 4005, a server software or file system 4010, load balancing data 4020, and an object positioning plan 4025. The server interface 4005 passes data access requests from, for example, the clients 110, to the file system 4010. The server interface 4005 includes a server manager 4008, which collects client access statistics, such as transactions per second per client, per port, and per server, and megabytes per second per client, per port, and per server. The server system 4010 includes several layers that participate in statistics collection. For example, the server system 4010 includes a request processing layer 4012, a data/metadata management layer 4014, and a storage management layer 4016. The request processing layer 4012 collects the statistics related to accesses to specific files. The data/metadata management layer 4014 collects drive resource and capacity utilization information. The storage management layer 4016 collects statistics related to transactions per second and megabytes per second for each storage network interface and drive.

FIG. 40 also shows that each server 4000, such as the servers F1–F5 of FIG. 39, includes a proactive object positioner 4018, according to aspects of an exemplary embodiment of the invention. According to one embodiment, the positioner 4018 comprises a set of rules, a software engine, or the like, employing logic algorithms to some or all of the load balancing data 4020 to generate the object positioning plan 4025.

As disclosed in the foregoing, the servers F1, F2, F3, F4, and F5, each share their respective load balancing data with one another. Thus, the load balancing data 4020 comprises load balancing data from the particular server, in this example, server F3, and the load balancing data from each of the other servers, F1–F2 and F4–F5. According to one embodiment, a server transmits its load balancing data at predetermined time intervals. According to another embodiment, each server determines when a significant change or a time limit has expired since the last broadcast of its load balancing data, and then broadcasts the same.

As shown in FIG. 40, each server 4000 includes the proactive object positioner 4018, which accepts as an input, the load balancing data of the some or all of the servers, and generates as an output, the object positioning plan 4025. According to one embodiment, the proactive object positioner 4018 for a given server generates a plan for that server. The server then attempts to push objects found in the plan to the other servers in the DFSS 3900 to balance throughput, capacity, or both. According to another embodiment, the proactive object positioner 4018 for a given server generates the plan 4025, which is relevant to all servers. In such a case, the server attempts to push only its objects from the plan 4025 to other servers. Thus, each server in the DFSS 3900 acts independently to accomplish the plan 4025 of the entire DFSS 3900, thereby advantageously providing a distributed and balanced approach that has no single point of failure and needing, if any, only minimal supervision.

As discussed in the foregoing, the object positioner 4018 corresponding to each server in the DFSS 3900 can generate the positioning plan 4025 to position objects to balance capacity, throughput, or both.

Positioning to Balance Capacity, such as the Number or Size of Objects

According to one embodiment, the proactive object positioner 4018 for each server can instruct its server to balance the number of objects stored on some or each disk array of the DFSS 3900. For example, as disclosed with reference to FIG. 5, each server has a predefined amount of memory for caching the G-nodes of the objects stored on the disk array associated with that server. By balancing the number of objects related to a particular server, the DFSS 3900 advantageously avoids having more G-node data for a server than can be stored in that server's G-node memory cache.

According to one embodiment, the proactive object positioner 4018 for each server can instruct its server to balance the size of objects stored on some or each disk array of the DFSS 3900. For example, if a particular server is associated with a disk array having a large number of small objects stored therein, the server can exceed that server's G-node memory cache. Therefore, each proactive object positioner 4018 can instruct its server to push objects such that the size of objects accessible by each server is balanced. For example, the servers can evenly distribute the number of small objects, the number of medium-sized objects, and the number of large objects between servers. By balancing the size of objects related to a particular server, the DFSS 3900 reduces the chances of having more G-node data for a server than can be stored in that server's G-node memory cache.

According to yet another embodiment, the proactive object positioner 4018 for each server can instruct its server to optimize the number of free and used data blocks when the servers in the DFSS 3900 have a large average object size. In such case, the number of G-nodes and the G-node memory cache will not likely be a performance issue, although number of used versus free data blocks will likely be an issue. While used versus free data blocks need not be entirely uniform across servers, maintaining a certain level of unused block capacity for each server provides flexibility in throughput balancing and new object creation, thereby enhancing the performance of the overall DFSS 3900.

Positioning to Balance throughput, such as the Access Frequency of Objects

According to one embodiment, the proactive object positioner 4018 generates the positioning plan 4025 to position objects based on, for example, predicted access frequencies of the same. As discussed above, prediction may comprise historical data, and may comprise a number of other data and factors as well. The positioner 4018 can advantageously use objects predicted to be infrequently accessed for capacity balancing to avoid upsetting any throughput balancing already in place. For example, when the positioner 4018 determines to balance the capacity among resources of the DFSS 3900, such as, for example, a drive, disk array, or server, the positioner 4018 can move objects that are of little significance to the throughput of the resource, such as, for example, those objects predicted to be least accessed. Thus, as the positioner 4018 balances the capacity through objects predicted to be, or found to be least recently accessed, the respective throughput of the resources will not be substantially affected. According to one embodiment, each server tracks the objects predicted to be infrequently used by maintaining in their load balancing data, an LRU stack of, for example, pointers to the G-Nodes of the objects predicted to be infrequently accessed.

Additionally, the positioner 4018 can generate the positioning plan 4025 to move objects predicted to be infrequently accessed from faster drives to slower drives. For example, if the large file LF from FIG. 39 were predicted to be infrequently accessed, storage of file LF on the fastest drives of the DFSS 3900, for example, the drives of the disk array 3924, would be inefficient. Thus, the proactive object positioner 4018 determines that the large file LF predicted to be infrequently accessed can be advantageously stored on the slow, large drives of the disk array 3926 of server F4. A skilled artisan will recognize that movement of the file LF to servers F4 is not expected to substantially affect the throughput of servers F3 and F4, outside of the processes for moving the file LF.

Additionally, the proactive object positioner 4018 can use the MRU stack in a server's load balancing data to instruct an overburdened server to take actions to offload some of the access from itself to those servers with less throughput. For example, the positioner 4018 can generate instructions to move the objects predicted to be heavily accessed to other servers, thereby moving the entire throughput load associated therewith, to the other servers. Also, positioner 4018 can generate instructions to create copies of objects predicted to be heavily accessed on other servers, thereby sharing the throughput load with the other servers For example, according to one embodiment, the server F1 includes the streamed file SF predicted to be heavily accessed, which in this example may include extremely popular multimedia data, such as, for example, a new video or music release, a major news story, or the like, where many clients are requesting access of the same. Moreover, according to this embodiment, the server F1 is being over-utilized, while the server F3 is being under-utilized. Thus, the object positioner 4018 recognizes that the movement of the file SF to the server F3 may simply overload the server F3. According to one embodiment, the proactive object positioner 4018 can instruct the server F1 to push, for example, read-only copies of the file SF to the server F3. Moreover, a skilled artisan will recognize from the disclosure herein that the server F1 can then return to a requesting client, a file handle 1300 for the file SF designating server F3, and the client will then generate requests to server F3, instead of server F1. Accordingly, the over utilization of server F1 is advantageously decreased while the under utilization of server F3 is advantageously increased, thereby balancing the throughput across the DFSS 3900.

According to yet another embodiment, the proactive object positioner 4018 can generate instructions to move objects to match the attributes of resources available to a particular server, thereby potentially decreasing the response time of the DFSS 3900. For example, as illustrated in the foregoing embodiment, the object positioner 4018 can instruct the server F1 to push the file SF predicted to be heavily accessed, to the server F3 having very fast disk drives, even when the server F1 is not being over-utilized. Moreover, as discussed above, the positioner 4018 can instruct the server F3 to store the file in distributed parity groups matching the number of very fast drives.

According to one embodiment, one or more of the servers can include specific software and hardware solutions, such as dedicated digital signal processors, which can add additional horse power to the generation of the object positioning plan 4025. For example, load balancing can be performed by an external client connected to the DFSS 3900.

FIG. 41 depicts the object positioning plan 4025 of server F3 of FIG. 39, according to aspects of an exemplary embodiment of the invention. As shown in FIG. 41, the plan 4025 includes instructions to push an object, and instructions on how to handle subsequent client requests for access to that object. According to one embodiment, a server that pushes an object tells clients seeking access to the object that the object has been moved. The pushing server can maintain a cache of objects that it recently pushed, and when feasible, the pushing server will supply the requesting client with the location, or server, where the object was moved, thereby providing direct access to the object for the client.

As shown in FIG. 41, the plan 4025 calls for server F3 to push the large file LF to server F4 for storage thereon, thereby freeing the fastest drives in the DFSS 3900 to store more objects predicted to be more heavily accessed. Moreover, the plan 4025 includes an indication that server F3 will return an indication of staleness for any clients still caching the file handle of file LF designating server F3. The plan 4025 also indicates that if server F1 requests, server F3 will accept and store a copy of the streamed file SF and return an indication of file creation to server F1, such as, for example, the file handle of server F3's copy of file SF. Thus, the DFSS 3900 uses a pushing approach to ensure server independence in proactively placing objects.

Based on the foregoing disclosure related to FIGS. 39–41, a skilled artisan will recognize the vast scalability of the DFSS 3900. For example, adding or removing hardware components such as drives, resources, or even servers, simply causes updated, or sometimes additional, load balancing information to be broadcast to the other servers. Each server then can immediately generate new positioning plans to take full advantage of the new components or configuration of the DFSS 3900. Each server then pushes their respective objects throughout the DFSS 3900, thereby efficiently balancing the throughput, capacity, or both, of the same.

Although the foregoing invention has been described in terms of certain preferred embodiments, other embodiments will be apparent to those of ordinary skill in the art from the disclosure herein. For example, the DFSS 3900 may advantageously push new file handles to clients, such as, for example, file handles including information on the location of an object. According to another embodiment, the DFSS 3900 can advantageously allow servers who have pushed objects to other servers, to automatically suggest new file handles to requesting clients. However, this approach can have the drawback that the file handle stored by the old server can itself be outdated, for example, when the new server subsequently pushed the same object to yet another server. Thus, according to one embodiment, servers return indications of staleness for objects they not longer have stored on their respective disk arrays.

In addition, a skilled artisan will recognize from the disclosure herein that many of the balancing ideas can be implemented in conventional non-distributed file storage systems. For example, the method of moving infrequently accessed files to balance capacity so as not to upset balanced load can be incorporated into conventional data storage systems.

Data Flow Architecture

Each server 130–135 in the DFSS 100 includes storage controller hardware and storage controller software to manage an array of disk drives. For example, the servers 130–131 each manage data on the disk arrays 140 and 141. A large number of disk drives can be used, and the DFSS 100 can be accessed by a large number of client machines 110. This potentially places a large workload on the servers 130–135. It is therefore desirable that the servers 130–135 operate in an efficient manner to reduce the occurrence of bottlenecks in the storage system.

Prior art approaches for storage servers tend to be software intensive. Specifically, a programmable CPU in the server becomes involved in the movement of data between the client and the disks in the disk array. This limits the performance of the storage system because the server CPU becomes a bottleneck. While prior approaches may have a certain degree of hardware acceleration, such as XOR parity operations associated with RAID, these minimal acceleration techniques do not adequately offload the server CPU.

Figure 42:
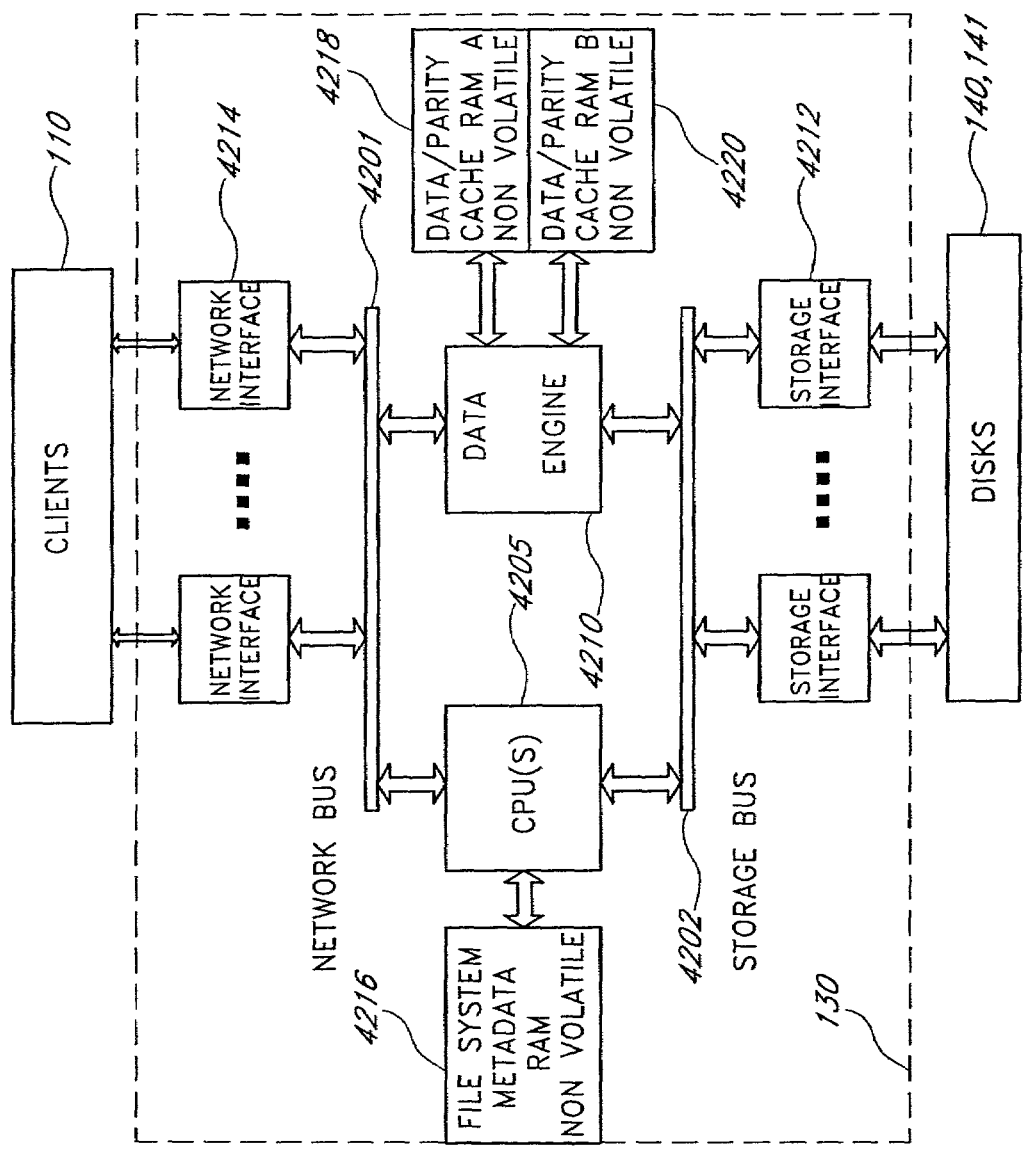
FIG. 42 is a block diagram of a server that provides efficient processing of data transfers between one or more client computers and one or more disk drives. 10

FIG. 42 shows an architecture for a server, such as the server 130, that reduces loading on a CPU 4205 of the server 130. As shown in FIG. 42, the clients 110 communicate (over the network fabric 120, not shown) with one or more network interfaces 4214. The network interfaces 4214 communicate with a first I/O bus 4201 shown as a network bus. The network bus communicates with the CPU 4205 and with a data engine 4210. A first data cache 4218 and a second data cache 4220 are provided to the data engine 4210. A metadata cache 4216 is provided to the CPU 4205. The CPU 4205 and the data engine 4210 also communicate with a second I/O bus 4202 shown as a storage bus. One or more storage interfaces 4212 also communicate with the second bus 4202.

The storage interfaces 4212 communicate with the disks 140, 141. In one embodiment, the first I/O bus 4201 is a PCI bus. In one embodiment, the second I/O bus 4202 is a PCI bus. In one embodiment, the caches 4216, 4218, and 4220 are non-volatile. In one embodiment, the network interfaces 4214 are Fibre Channel interfaces. In one embodiment, the storage interfaces 4212 are Fibre Channel interfaces. The data engine 4210 can be a general-purpose processor, a digital signal processor, a Field Programmable Gate Array (FPGA), other forms of soft or hard programmable logic, a custom ASIC, etc. The network interface controllers 4214, 4212 can support Fibre Channel, Ethernet, Infiniband, or other high performance networking protocols.

The architecture shown in FIG. 42 allows data to be efficiently moved between the client machines 110 and disks 140–141 with little or no software intervention by the CPU 4205. The architecture shown in FIG. 42 separates the data path from the control message path. The CPU 4205 handles control, file system metadata, and housekeeping functions (conceptually, the CPU 4205 can be considered as a control engine). Actual file data passes through the data engine 4210.

Control messages (e.g. file read/write commands from clients) are routed to the CPU 4205. The CPU 4205 processes the commands, and queues data transfer operations to the data engine 4210. The data transfer operations, once scheduled with the data engine 4210 can be completed without further involvement of the CPU 4205. Data passing between the disks 140, 141 and the clients 110 (either as read or write operations) is buffered through the data cache 4218 and/or the data cache 4220. In one embodiment, the data engine 4210 operates using a data flow architecture that packages instructions with data as the data flows through the data engine 4210 and its associated data caches.

The data engine 4210 provides a separate path for data flow by connecting the network interfaces 4214 and the storage interfaces 4212 with the data caches 4218, 4220. The data engine 4210 provides file data transfers between the network interface 4214 and the caches 4218, 4220 and between the storage interface 4212 and the caches 4218, 4220. As an example of the data path operation, consider a client file read operation. A client read request is received on one of the network interfaces 4214 and is routed to the CPU 4205. The CPU 4205 validates the request, and determines from the request which data is desired. The request will typically specify a file to be read, and the particular section of data within the file. The CPU 4205 will use file metadata in the cache 4216 to determine if the data is already present in one of the data caches 4218, 4220, or if the data must be retrieved from the disks 140, 141. If the data is in the data cache 4218, 4220, the CPU 4205 will queue a transfer with the network interfaces 4214 to transfer the data directly from the appropriate data cache 4218, 4220 to the requesting client 110, with no further intervention by the CPU 4205. If the data is not in the data caches 4218, 4220, then the CPU 4205 will queue one or more transfers with the storage interfaces 4212 to move the data from the disks 140, 141 to the data caches 4218, 4220, again without further intervention by the CPU 4205. When the data is in the data caches 4218, 4220, the CPU 4205 will queue a transfer on the network interfaces 4214 to move the data to the requesting client 110, again without further intervention by the CPU 4205.

One aspect of the operation of the data engine 4210 is that the CPU 4205 schedules data movement operations by writing an entry onto a queue in the network interfaces 4214 or into a queue in the storage interfaces 4212. The data engine 4210 and the network and storage interfaces 4214, 4212 are connected by busses 4201, 4202. The busses 4201, 4202 each include an address bus and a data bus. In one embodiment, the network or storage interfaces 4214, 4212 perform the actual data movement (or sequence of data movements) independently of the CPU 4205 by encoding an instruction code in the address bus that connects the data engine to the interface. The instruction code is set up by the host CPU 4205 when the transfer is queued, and can specify that data is to be written or read to one or both of the cache memories 4218, 4220. In addition, the instruction code can specify that an operation such as a parity XOR operation or a data conversion operation be performed on the data while it is in transit through the data engine 4210. Because instructions are queued with the data transfers, the host CPU can queue hundreds or thousands of instructions in advance with each interface 4214, 4212, and all of these instructions can be can be completed asynchronously and autonomously.

As described above, once a data movement operation has been queued, the data engine 4210 offloads the CPU 4205 from direct involvement in the actual movement of data from the clients 110 to the disks 140, 141, and vice-versa. The CPU 4205 schedules network transfers by queuing data transfer operations on the network interfaces 4214 and the storage interfaces 4212. The interfaces 4214 and 4212 then communicate directly with the data engine 4210 to perform the data transfer operations. Some data transfer operations involve the movement of data. Other data transfer operations combine the movement of data with other operations that are to be performed on the data in transit (e.g., parity generation, data recovery, data conversion, etc.).

The processing modules in the data engine 4210 can perform five principal operations, as well as a variety of support operations. The principal operations are:
1) read from cache
2) write to cache
3) XOR write to cache
4) write to one cache with XOR write to other cache
5) write to both caches A typical client file read operation would proceed as follows in the server 130:
(1) The file read command is received from the client
(2) The CPU 4205 authenticates client access and access permissions. The
CPU 4205 also does metadata lookups to locate the requested data in cache or on disk.
(3) If data is not in cache, a disk read transaction is queued by sending instructions to the storage interfaces 4212.
(4) The storage interfaces 4212 mode data from disk to the data caches 4218, 4220.
(5) The CPU 4205 queue a data-send transaction to the network interfaces 4214.
(6) The network interfaces 4214 send the data to the client, completing the client read operation.

Figure 43:
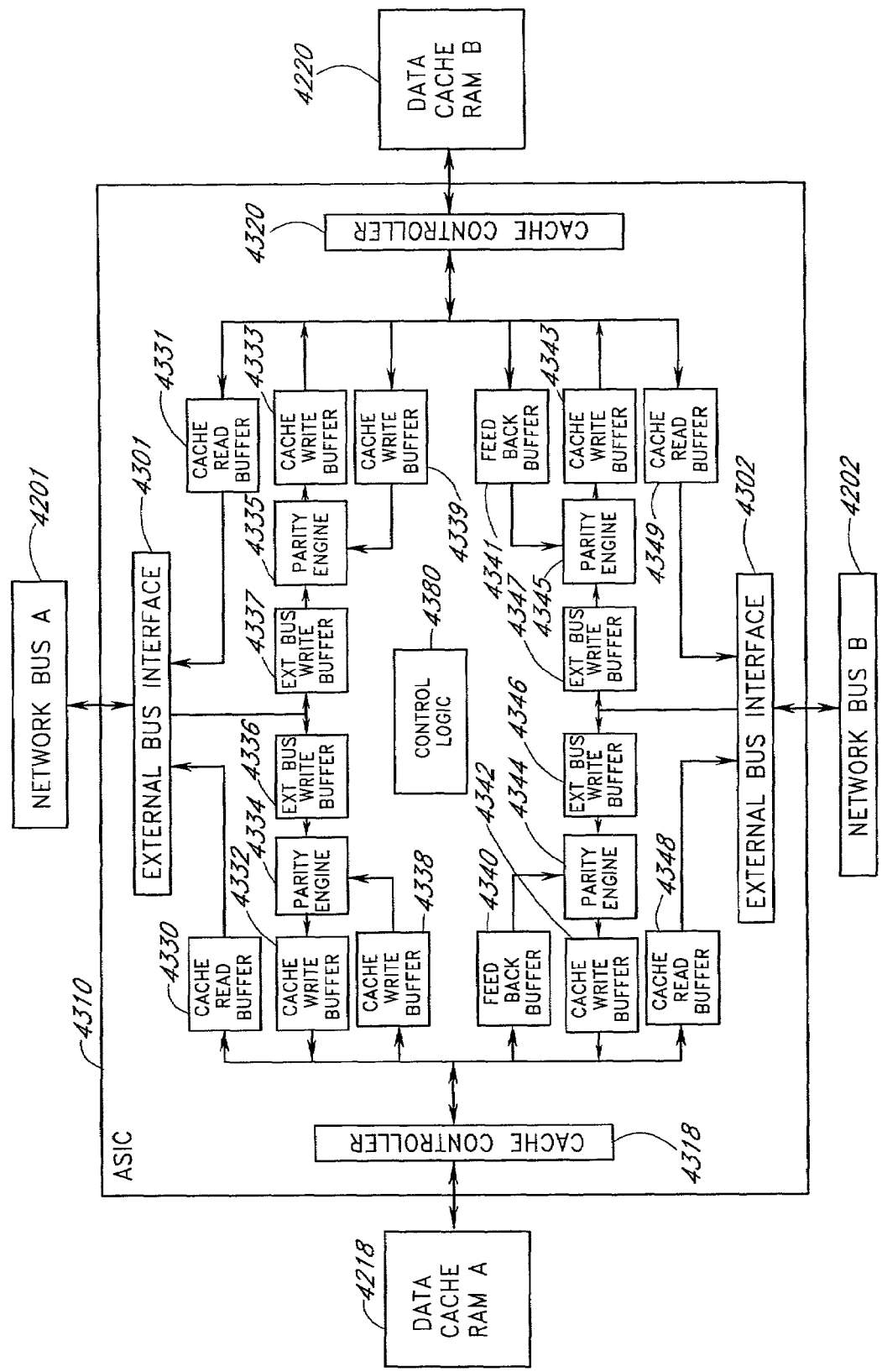
FIG. 43 is a block diagram of a data engine.

FIG. 43 is a block diagram of the internal structure of an ASIC 4310 that is one example of a hardware embodiment of the data engine 4210. The ASIC 4310 provides the capability for autonomous movement of data between the network interfaces 4214 and data caches 4218, 4220, and between the storage interfaces 4212 and the data caches 4218, 4220. The involvement of the CPU 4205 is often just queuing the desired transfer operations. The ASIC 4310 supports this autonomy by combining an asynchronous data flow architecture, a high-performance data path than can operate independently of the data paths of the CPU 4205, and a data cache memory subsystem. The ASIC 4310 also implements the parity generation functions used to support a RAID-style data protection scheme.

The data ASIC 4310 is a special-purpose parallel processing system that is data-flow driven. That is, the instructions for the parallel processing elements are embedded in data packets that are fed to the ASIC 4310 and to the various functional blocks within the ASIC 4310.

In one embodiment, the ASIC 4310 has four principal interfaces: a first data cache interface 4318, a second data cache interface 4320, a first bus interface 4301, and a second bus interface 4302. Other versions of the ASIC 4310 can have a different number of interfaces depending on performance goals.

Data from the first data cache interface 4318 is provided to a cache read buffer 4330, to a feedback buffer 4338, to a feedback buffer 4340 and to a cache read buffer 4348. Data from the second data cache interface 4320 is provided to a cache read buffer 4331, to a feedback buffer 4339, to a feedback buffer 4341 and to a cache read buffer 4349.

Data is provided from the bus interface 4301 through a write buffer 4336 to a parity engine 4334. Data is provided from the parity engine 4334 through a cache write buffer 4332 to the cache interface 4318. Data is provided from the feedback buffer 4338 to the parity engine 4334.

Data is provided from the bus interface 4302 through a write buffer 4346 to a parity engine 4344.

Data is provided from the parity engine 4344 through a cache write buffer 4342 to the cache interface 4318. Data is provided from the feedback buffer 4340 to the parity engine 4344.

Data is provided from the bus interface 4301 through a write buffer 4337 to a parity engine 4335. Data is provided from the parity engine 4335 through a cache write buffer 4333 to the cache interface 4320. Data is provided from the feedback buffer 4339 to the parity engine 4335.

Data is provided from the bus interface 4302 through a write buffer 4347 to a parity engine 4345. Data is provided from the parity engine 4345 through a cache write buffer 4343 to the cache interface 4320. Data is provided from the feedback buffer 4341 to the parity engine 4345.

Data is provided from the cache read buffers 4348, 4349 to the bus interface 4202. Data is provided from the cache read buffers 4330, 4331 to the bus interface 4201.

Data transfer paths are provided between the cache interface 4218 and the bus interface 4301 and 4302. Similarly, data transfer paths are provided between the cache interface 4220 and the bus interfaces 4301 and 4302. A control logic 4380 includes, in each of these data path, a processing engine that controls data movement between the respective interfaces as well as operations that can be performed on the data as it moves between the interfaces. The control logic 4380 is data-flow driven as described above.

Figure 44:
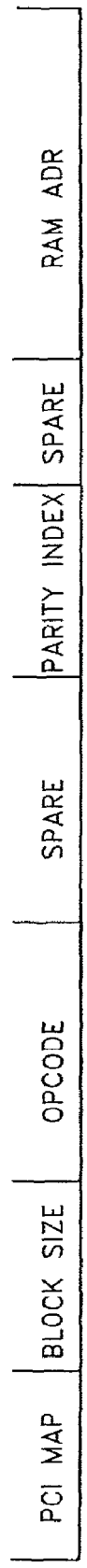
FIG. 44 is a map of data fields in a 64-bit data transfer instruction to the data engine for use with a 64-bit PCI bus.

In one embodiment, the bus 4201 is a PCI bus, the bus 4202 is a PCI bus, and data-transfer commands for the data engine are contained in PCI addresses on the respective buses. FIG. 44 is a map 4400 of data fields in a 64-bit data transfer instruction to the data engine for use with a 64-bit PCI bus. A cache address is coded in bits 0–31. A parity index is coded in bits 35–50. An opcode is coded in bits 56–58. A block size is coded in bits 59–61. A PCI device address is coded in bits 62–63. Bits 32–34 and 51–55 are unused.

The block size is used to select the extent of a block addressed by the parity index. This is the number of consecutive 16 kilobyte blocks that make up the parity block addressed by the parity index. In one embodiment, the block size is three bits, interpreted as follows:

| | |
|---|---|
| block size = 0 | parity block = 16 k |
| block size = 1 | parity block = 32 k |
| block size = 2 | parity block = 64 k |
| block size = 3 | parity block = 128 k |
| block size = 4 | parity block = 256 k |
| block size = 5 | parity block = 512 k |
| block size = 6 | parity block = 1024 k |
| block size = 7 | parity block = 2048 k |

In one embodiment, the bus interface 4301 is a PCI interface and the bus interface 4302 is a PCI interface. Each of these PCI interfaces includes a read control to control reads from the caches 4218 and 4220. The read control reads data from the respective output buffers 4330, 4331, 4348, and 4349 as needed. On completion of a PCI transaction, the output buffer is cleared. Each PCI interface also includes a write control to control writes to the input buffers. The write control adds an address word to the start of a data stream and control bits to each word written to the input buffer. In the case where parity is generated and data is saved, the write control: determines which cache 4218, 4220 gets the data; assigns parity to the other cache (that is, the cache that does not receive the data); and adds control bits to the data stream. Address words are typically identical for the various input buffers, but added control bits will be different for each input buffer. For parity generation, or regeneration of lost data, the data in transit is stored in one of the feedback buffers 4338, 4339, 4341, or 4340. The feedback buffer is cleared on completion of a data stream operation.

As described above, each data block written to an input buffer has address and control bits inserted into the data stream. The control bits are as follows:
- bit 0: identifies a word as an address/control word or a data word
- bit 1: set to tag last word in a data stream
- bit 2: enable/disable XOR (enable/disable parity operations)
- bit 3: for an address word, specifies type of addressing as either:
  - index addressing (for parity and regeneration data)
  - direct addressing (for normal data)

For operations that include an XOR operation, the XOR destination is a "parity block" in cache (e.g., in the cache 4218 or the cache 4220). When a parity block is addressed the address is calculated from a combination of: the parity index field from the PCI address word; the lower bits of the PCI address bus (the number depending on the block size); and the block size field from the PCI address word. Once the ASIC 4310 calculates the parity block address for the first PCI data word, this address is incremented for each subsequent data word.

The parity block address can be generated from the PCI address word using one of two methods. The first method is to concatenate the parity index with the lower bits of the PCI address word. The second method is to sum the parity index with the lower bits of the PCI address word. In either method, data is typically aligned to a natural boundary (e.g., 16 k blocks to a 16 k boundary, 32 k blocks to a 32 k boundary, etc.).

The CPU 4205 queues network transaction requests to the network interfaces 4214 and storage transaction requests to the storage interfaces 4212. In one embodiment, the network bus 4201 is a memory-mapped bus having an address word and one or more data words (such as, for example, a PCI bus) and queuing a storage transaction request involves sending an address word and one or more data words to a selected network interface 4214. In one embodiment, the address word includes opcode bits and address bits as shown in FIG. 44. The data words provide information to the selected network interface 4214 regarding what to do with the data at the specified address (e.g., where to send the data and to notify the CPU 4205 when the data has been sent). In one embodiment, the selected network interface 4214 views the data engine 4210 (e.g., the ASIC 4310) as simply a memory to use for retrieving and storing data using addresses in the address word included in the network transaction request. In such an embodiment, the network interface 4214 does not know that the data engine 4210 is interpreting various bits of the address word as opcode bits and that the data engine 4210 is performing operations (e.g., parity operations) on the data.

The storage interfaces 4212 operate with the data engine 4210 (e.g., the ASIC 4310) in a similar manner. The storage interfaces 4212 view the data engine 4210 as a memory (e.g., a simple cache). The storage interfaces 4212 communicate with the disks 140, 141 to retrieve data from the disks and write data to the disks. The data engine 4210 takes care of assembling parity groups, computing parity, recovering lost data, etc.

"Hiding" the parity calculations in the data engine 4210 offloads the parity workload from the CPU 4205, thereby giving the CPU 4205 more time for metadata operations. Moreover, using a portion of the memory-mapped bus address word allows the CPU 4205 to send commands to the data engine 4210, again offloading data operations from the CPU 4205. The commands are associated with the data (by virtue of being associated with the address of the data). The network interfaces 4214 and the storage interfaces 4212 (which, themselves are typically network-type interfaces such as Fibre Channel interfaces, SCSI interfaces, InfiniBand interfaces, etc.) are unaware of the opcode information buried in the address words. This allows standard "off-the-shelf" interfaces to be used.

In one embodiment, the CPU 4205 keeps track of the data stored in the data caches 4218 and 4220, thus allowing the server 130 to service many client requests for file data directly from the caches 4218 and 4220 to the network interfaces 4214, without the overhead of disk operations.

Although the foregoing description of the invention has shown, described and pointed out novel features of the invention, it will be understood that various omissions, substitutions, and changes in the form of the detail of the apparatus as illustrated, as well as the uses thereof, may be made by those skilled in the art without departing from the spirit of the present invention. Consequently the scope of the invention should not be limited to the foregoing discussion but should be defined by the appended claims.

What is claimed is:

1. A computer network file system, comprising:
first metadata managed primarily by a first file server operably connected to a network fabric, wherein said first metadata comprises at least one Gnid-string and first file location information, said first file location information comprising a disk identifier and at least one server id; and
second metadata managed primarily by a second file server operably connected to the network fabric, said second metadata comprising second file location information, said second file location information comprising at least one server identifier, said first metadata and said second metadata configured to allow a requestor to locate files stored by said first file server and files stored by said second file server in a directory structure that spans said first file server and said second file server.

2. The computer network file system of claim 1, wherein a one-to-one correspondence exists between said at least one Gnid-string and a directory owned by said first file server.

3. The computer network file system of claim 1, wherein said Gnid-string comprises a collection of gnids.

4. The computer network file system of claim 3, wherein each of said gnids comprises information for locating a specified gnode.

5. The computer network file system of claim 4, wherein said information for locating a specified gnode comprises a pointer to said specified gnode.

6. The computer network file system of claim 4, wherein said specified gnode comprises file attributes for a file corresponding to said gnode.

7. The computer network file system of claim 6, wherein said file attributes include at least one of a file id, a file access time, a file creation time, and a file modification time.

8. The computer network file system of claim 4, wherein said specified gnode comprises information for locating a first gee of a plurality of gees corresponding to said gnode.

9. The computer network file system of claim 8, wherein said plurality of gees comprises gnode gees and data gees.

10. The computer network file system of claim 9, wherein each of said gnode gees comprises information to specify an extent.

11. The computer network file system of claim 9, wherein each of said data gees comprises information to specify a first logical disk block and information to specify a disk that contains said first logical block.

12. The computer network file system of claim 8, wherein said plurality of gees further comprises parity gees.

13. The computer network file system of claim 12, wherein each of said parity gees comprises information regarding location of parity data for one or more preceding data gees in said plurality of gees.

14. The computer network file system of claim 8, wherein a parity group comprises a first set of one or more data gees and an associated parity gee.

15. The computer network file system of claim 14, wherein each data gee identifies a block of data and said parity gee identifies a parity block.

16. The computer network file system of claim 15, wherein each block of data and parity in said parity group is stored on a separate disk drive such that no single disk drive contains data from two blocks said parity group.

17. The computer network file system of claim 14, wherein a size of a first parity group is independent of a size of a second parity group.

18. A method for storing data in a computer network, comprising:
creating first file system metadata on a first file server operably connected to a network fabric, wherein said first file system metadata comprises at least one Gnid-string and describes at least files and directories stored by said first file server;
creating second file system metadata on a second file server connected to said network fabric, said second file system metadata describing at least files and directories stored by said second file server, said first file system metadata and said second file system metadata comprising directory information that spans said first file server and said second file server, said directory information configured to allow a reguestor to find a location of a first file catalogued in said directory information without prior knowledae as to a server location of said first file.

19. The method of claim 18, wherein a correspondence exists between said at least one Gnid-string and a directory corresponding to said first file server.

20. The method of claim 18, wherein said Gnid-string comprises a collection of gnids.

21. The method of claim 20, wherein each of said gnids comprises information for locating a specified gnode.

22. The method of claim 21, wherein said information for locating a specified gnode comprises a pointer to said specified gnode.

23. The method of claim 21, wherein said specified gnode comprises file attributes for a file corresponding to said gnode.

24. The method of claim 23, wherein said file attributes include at least one of a file id, a file access time, a file creation time, and a file modification time.

25. The method of claim 21, wherein said specified gnode comprises information for locating a first gee of a plurality of gees corresponding to said gnode.

26. The method of claim 25, wherein said plurality of gees comprises gnode gees and data gees.

27. The method of claim 26, wherein each of said gnode gees comprises information to specify a logical block extent.

28. The method of claim 26, wherein each of said data gees comprises information to specify a first logical disk block and information to specify a disk that contains said first logical block.

29. The method of claim 28, further comprising defining a plurality of parity gees.

30. The method of claim 29, wherein each of said parity gees comprises information regarding location of parity data for one or more preceding data gees in said plurality of gees.

* * * * *

UNITED STATES PATENT AND TRADEMARK OFFICE
CERTIFICATE OF CORRECTION

PATENT NO. : 7,054,927 B2  Page 1 of 1
APPLICATION NO. : 10/060920
DATED : May 30, 2006
INVENTOR(S) : Ulrich et al.

It is certified that error appears in the above-identified patent and that said Letters Patent is hereby corrected as shown below:

On Title Page, item 75
Column 1, First Page, line 7, delete "George W. Priester," and insert therefore, -- Wilbur George Priester, --

On Title Page, item 75
Column 1, First Page, line 8, delete "Westminister," and insert therefore, -- Westminster, --.

Column 11, line 19 (Approx.), delete ""M", "O", "P"" and insert therefore,

-- "M", "N", "O", "P" --.

Column 88, line 2, in Claim 18, delete "reguestor" and insert therefore,

-- requestor --.

Column 88, line 4, in Claim 18, delete "knowledae" and insert therefore,

--knowledge --.

Signed and Sealed this

Ninth Day of January, 2007

JON W. DUDAS
*Director of the United States Patent and Trademark Office*